United States Patent [19]

Suzuki et al.

[11] Patent Number: 4,747,154
[45] Date of Patent: May 24, 1988

[54] IMAGE DATA EXPANDING AND/OR CONTRACTING METHOD AND APPARATUS

[75] Inventors: Kazufumi Suzuki, Kawasaki, Japan; Katsura Kawakami, Cheshire, United Kingdom; Shigeo Shimazaki, Kawasaki, Japan; Yuetsu Ochiai, Sagamihara, Japan; Etsuko Hirokami, Tokyo, Japan; Hiroaki Kotera, Kawasaki, Japan

[73] Assignee: Matsushita Electric Industrial Co., Ltd., Osaka, Japan

[21] Appl. No.: 655,690

[22] Filed: Sep. 28, 1984

[30] Foreign Application Priority Data

| Sep. 29, 1983 | [JP] | Japan | 58-182110 |
| Oct. 6, 1983 | [JP] | Japan | 58-187882 |
| Oct. 14, 1983 | [JP] | Japan | 58-192755 |
| Oct. 14, 1983 | [JP] | Japan | 58-192757 |
| May 21, 1984 | [JP] | Japan | 59-102143 |
| Jul. 27, 1984 | [JP] | Japan | 59-157821 |

[51] Int. Cl.$^4$ .............................. G06K 9/42
[52] U.S. Cl. ..................... 382/47; 364/200; 364/900
[58] Field of Search .......... 382/47, 44; 358/287; 340/731, 741; 364/518, 582, 200 MS File, 900 MS File

[56] References Cited

U.S. PATENT DOCUMENTS

| 3,811,110 | 5/1974 | Inose et al. | 382/46 |
| 4,275,450 | 6/1981 | Potter | 382/47 |
| 4,283,724 | 8/1981 | Edwards | 340/731 |
| 4,381,547 | 4/1983 | Ejiri | 382/47 |
| 4,394,693 | 7/1983 | Shirley | 358/287 |
| 4,490,786 | 12/1984 | Nakatani | 364/200 |
| 4,569,081 | 2/1986 | Mintzer et al. | 358/287 |
| 4,598,283 | 7/1983 | Tung et al. | 340/731 |
| 4,602,346 | 7/1986 | Kawakami et al. | 382/47 |

Primary Examiner—Leo H. Boudreau
Assistant Examiner—Joseph Mancuso
Attorney, Agent, or Firm—Spencer & Frank

[57] ABSTRACT

An apparatus for expanding or contracting image data includes an input for storing the image data to be processed, a first barrel shifter for shifting the output data of the input register, a control register for storing a mapping pattern which indicates a position of the image data bits to be extracted in the expansion mode or which indicates the number of times when the image data are to be copied, an expansion and contraction circuit for expanding or contracting the image data by referring to the mapping pattern, and a second barrel register for shifting the output image data of the expansion and contraction circuit before the data are loaded in an output data register.

12 Claims, 62 Drawing Sheets

EXPANSION

FIG. 12

| | | |
|---|---|---|
| 121 | X1 X2 X3 X4 X5 X6 X7 X8 X'1 X'2 X'3 X'4 X'5 X'6 X'7 X'8 ~52 | 127 / 5 |
| 122 | X6 X7 X8 X'1 X'2 X'3 X'4 X'5 | 128 / 5 |
| 123 | 1 0 1 1 0 1 0 1 ~58 | 5 |
| 124 | X6 X8 X'1 X'3 X'5 | 129 |
| 125 | Y1 Y2 Y3 Y4 Y5 Y6 Y7 Y8  ~57 | 2 |
| 126 | Y1 Y2 X6 X8 X'1 X'3 X'5 Y8  ~57 | 7 |
| | | 129 |
| 131 | X'1 X'2 X'3 X'4 X'5 X'6 X'7 X'8 X1 X2 X3 X4 X5 X6 X7 X8 | 5 |
| 132 | X'6 X'7 X'8 X1 X2 X3 X4 X5 | |
| 133 | 1 0 1 1 0 1 0 1 | 5 |
| 134 | X'6 X'8 X1 X3 X5 | |
| 135 | Y1 Y2 X6 X8 X'1 X'3 X'5 X'6 X'8 X1 X3 X5 | 12 |
| 136 | X'8 X1 X3 X5 | 4 |
| 141 | X1 X2 X3 X4 X5 X6 X7 X8 X'1 X'2 X'3 X'4 X'5 X'6 X'7 X'8 ~52 | 5 |
| 142 | X6 X7 X8 X'1 X'2 X'3 X'4 X'5 | |
| 143 | 1 0 1 1 0 1 0 1 | 5 |
| 144 | X6 X8 X'1 X'3 X'5 | 129 |
| 145 | X'8 X1 X3 X5 X6 X8 X'1 X'3 X'5  ~57 | 9 |
| 146 | X'5 | 1 |

FIG.18

| i | VALUE OF PRECEDING STAGE + $\frac{m}{n}$ | RESULT | PART EXCEEDING ONE | $P_i$ |
|---|---|---|---|---|
| 1 | $\left(1-\frac{5}{16}\right)+\frac{5}{8}$ | $\frac{21}{16}$ | $\frac{5}{16}$ | 1 |
| 2 | $\frac{5}{16}+\frac{5}{8}$ | $\frac{15}{16}$ | | 0 |
| 3 | $\frac{15}{16}+\frac{5}{8}$ | $\frac{25}{16}$ | $\frac{9}{16}$ | 1 |
| 4 | $\frac{9}{16}+\frac{5}{8}$ | $\frac{19}{16}$ | $\frac{3}{16}$ | 1 |
| 5 | $\frac{3}{16}+\frac{5}{8}$ | $\frac{13}{16}$ | | 0 |
| 6 | $\frac{13}{16}+\frac{5}{8}$ | $\frac{23}{16}$ | $\frac{7}{16}$ | 1 |
| 7 | $\frac{7}{16}+\frac{5}{8}$ | $\frac{17}{16}$ | $\frac{1}{16}$ | 1 |
| 8 | $\frac{1}{16}+\frac{5}{8}$ | $\frac{11}{16}$ | | 0 |

FIG. 22

| P ⇒ | p₀ | p₁ | p₂ | p₃ | p₄ | p₅ | p₆ | p₇ | |
|---|---|---|---|---|---|---|---|---|---|
| | 1 | 0 | 1 | 0 | 0 | 0 | 1 | 0 | |
| 7 X⇒ | x₀ | x₁ | x₂ | x₃ | x₄ | x₅ | x₆ | [x₇] | 0 |
| 6 | x₀ | x₁ | x₂ | x₃ | x₄ | x₅ | x₆ | | |
| 5 | x₀ | x₁ | x₂ | x₃ | x₄ | [x₅] | x₆ | | 0 |
| 4 | x₀ | x₁ | x₂ | x₃ | [x₄] | | x₆ | | 0 |
| 3 | x₀ | x₁ | x₂ | [x₃] | | | x₆ | | 0 |
| 2 | x₀ | x₁ | x₂ | | | | x₆ | | |
| 1 | x₀ | [x₁] | x₂ | | | | x₆ | | 0 |
| 0 | x₀ | x₂ | x₆ | | | | | | |
| | x₀ | x₂ | x₆ | | | | | | |
| Y ⇒ | y₀ | y₁ | y₂ | y₃ | y₄ | y₅ | y₆ | y₇ | |
| i/j | 0 | 1 | 2 | 3 | 4 | 5 | 6 | 7 | |

FIG. 28

| P ⇒ | p₀ | p₁ | p₂ | p₃ | p₄ | p₅ | p₆ | p₇ |
|---|---|---|---|---|---|---|---|---|
| | 1 | 0 | 1 | 0 | 0 | 0 | 1 | 0 |

| | | | | | | | | | |
|---|---|---|---|---|---|---|---|---|---|
| 7 X ⇒ | $x_0$ | $x_1$ | $x_2$ | $x_3$ | $x_4$ | $x_5$ | $x_6$ | $\boxed{x_7}$ | 0 |
| 6 | $x_0$ | $x_1$ | $x_2$ | $x_3$ | $x_4$ | $x_5$ | $x_{67}$ | | |
| 5 | $x_0$ | $x_1$ | $x_2$ | $x_3$ | $x_4$ | $\boxed{x_5}$ | $x_{67}$ | | 0 |
| 4 | $x_0$ | $x_1$ | $x_2$ | $x_3$ | $\boxed{x_{45}}$ | $x_{67}$ | | | 0 |
| 3 | $x_0$ | $x_1$ | $x_2$ | $\boxed{x_{345}}$ | $x_{67}$ | | | | 0 |
| 2 | $x_0$ | $x_1$ | $x_{2345}$ | $x_{67}$ | | | | | |
| 1 | $x_0$ | $\boxed{x_1}$ | $x_{2345}$ | $x_{67}$ | | | | | 0 |
| 0 | $x_{01}$ | $x_{2345}$ | $x_{67}$ | | | | | | |
| | $x_{01}$ | $x_{2345}$ | $x_{67}$ | | | | | | |

| Y ⇒ | y₀ | y₁ | y₂ | y₃ | y₄ | y₅ | y₆ | y₇ |
|---|---|---|---|---|---|---|---|---|
| i/j | 0 | 1 | 2 | 3 | 4 | 5 | 6 | 7 |

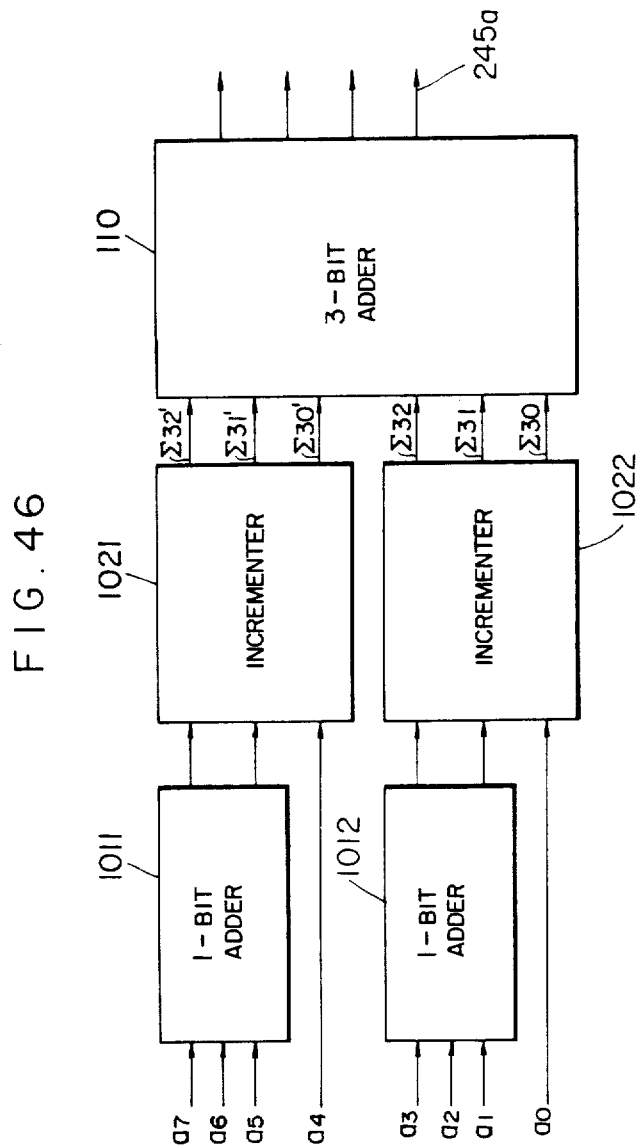
F I G. 46

F I G. 50A
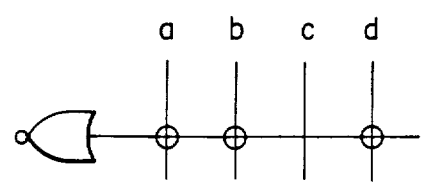
F I G. 50B
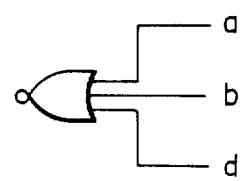

IMAGE DATA EXPANDING AND/OR CONTRACTING METHOD AND APPARATUS

BACKGROUND OF THE INVENTION

The present invention relates to a method for expanding and/or contracting image information or data as well as an apparatus for carrying out the method.

The development of storage or memory devices whose capacity is more and more increased has been accompanied by the development of an increasing number of apparatuses which are capable of processing image data rather straightforwardly without resorting to a coding procedure, image data such as hand-written characters, graphic patterns, or the like. In this industrial field, a great demand exists for processing capability such as expansion or contraction of the image data at an increased speed.

The concept of expansion (or extension) and contraction (or compression) of image information or data (hereinafter referred to as image data) will now be briefly described.

It is assumed that image data X, which include a string of n picture elements or pixels $X_1, X_2, \ldots, X_n$ arrayed one-dimensionally on lattice points, as shown in FIG. 1, is to be contacted to image data Z, which include m pixels $Z_1, Z_2, \ldots, Z_m$. In the case of the illustrated example, n=8 and m=5. Transformation (mapping) of the data X to Z can be realized in the manner illustrated in FIG. 2, in which $24a, 24b, \ldots, 24h$ represent the lattice points which are located closest to a straight line 23 having a slope m/n=5/8. The individual pixels $X_1, X_2, \ldots, X_n$ of the original image data 21 are transformed to the individual pixels $Z_1, Z_2, \ldots, Z_5$ of the output data 22 which are located on the left side to the corresponding lattice points $24a, 24b, \ldots, 24h$. It will be seen that the pixels $X_1$ and $X_2$ are, respectively, transformed into the output pixel $Z_1$, while the original pixels $X_6$ and $X_7$ are, respectively, transformed into the output pixel $Z_4$. For convenience' sake, the output pixel $Z_1$ is assumed to be constituted by the original pixel $X_1$, with $Z_4$ being constituted by $X_6$.

Expansion corresponds to the reverse of the contraction mentioned above. In other words, expansion may be considered as the reverse of contraction in which the original image data is replaced by the output data while the latter is replaced by the former. FIG. 3 illustrates the manner in which the original image data 25 of $X_1, \ldots, X_5$ are expanded to the output data 26 of $Z_1, Z_2, \ldots Z_8$.

Heretofore, the expansion or contraction of image data has been arithmetically determined for each of the pixels, as mentioned below. Namely, in the case of the contraction illustrated in FIG. 2, the expression for transformation of a pixel $X_i$ of the original image data 21 into a pixel $Z_j$ of the output data 22 is, by way of example, given by $$Z_j \leftarrow X_i$$

$$j \leftarrow [\tfrac{m}{n} i + 0.5]$$

where [a] represents the maximum integer which does not exceed a.

In the case of expansion as illustrated in FIG. 3, the expression for transformation of $X_i$ into $Z_i$ is, for example, given by $$Z_j \leftarrow X_i$$

$$[\tfrac{n}{m} j + 0.5] \rightarrow i$$

Since the expression for transformation has to be calculated for each of the pixels, the hitherto known method is disadvantageous in that high efficiency can not be attained in the transformation processing. In this connection, reference should be made to FIG. 4. When a two-dimensional image 41 composed of $n_y$ pixels in the vertical direction and $n_x$ pixels in the horizontal direction is to be transformed into a two-dimensional image 42 which is composed of $m_y$ pixels in the vertical direction and $m_x$ pixels in the horizontal direction, it will be seen that the manner in which the transformation of $n_x$ pixels to $m_x$ pixels in the horizontal or rowwise direction can be carried out is independent of the location of the pixel in the vertical or columnwise direction. The same holds true for the transformation of $n_y$ pixels to $m_y$ pixels in the vertical or columnwise direction. Accordingly, by storing the procedure for transformation determined upon transformation of the pixels on the first row or column, the succeeding transformation can be carried out by referring to the stored procedure without a necessity for any renewed calculation. However, in the prior art, the calculation was repeated anew at every transformation, so that much time was required in accomplishing the transformation.

SUMMARY OF THE INVENTION

Accordingly, an object of the present invention is to eliminate the shortcomings of the prior art and provide a method and apparatus which are capable of performing image expansion and/or contraction at a significantly increased speed.

In view of the above object, there is provided according to an aspect of the invention an image data expanding and/or contacting apparatus which comprises a first register for storing original image data, a first barrel shifter for shifting the original image data, a register for storing a mapping pattern, an expansion and contraction circuit for expanding or contracting the original image data under the control of the mapping pattern to thereby produce output data, a second barrel shifter for shifting the output data, and a register for storing the output data.

According to another aspect of the invention, the image expanding and/or contracting apparatus may comprise a register for storing a mapping pattern which is referred to upon expansion or contraction of image data, and a memory for storing original image data, wherein expansion or contraction of the original image data is performed by referring to the mapping pattern which indicates extraction of data bits or pixels for the contraction of the image and indicates the number of times when a pixel is to be copied for the expansion of the image data.

According to another aspect of the invention there is provided an image data contracting method, wherein at least a reference mask pattern consisting of binary data $P_1, P_2, \ldots, P_n$ is prepared for image data $x_1, x_2, \ldots, x_n$ to be contracted (where n is an integer $\geq 2$). The image data $x_1, x_2, \ldots, x_n$ to be contracted is moved within a matrix including n rows and n columns in the direction from the n-th row toward the first row. When the reference mask pattern $P_i$ (where i is an integer in the range of $1 \leq i \leq n$) has a first value, the image data $x_i$ located at a position $(a_{i,i})$ of the matrix is discarded, while image data (x) located at A position $(a_{i,j})$ (where $i+n \leq j \leq n$) of the matrix is moved to a position $(a_{i-1, j-1})$ of the matrix. When the reference mask pattern $(P_i)$ has a second value, the image data (x) located at a position $(a_i, a_{j-1})$ of the matrix is moved to the position $(a_{i-1, j-1})$ of the matrix.

According to still another aspect of the invention, there is provided an image data contracting circuit which includes a matrix consisting of n rows and n columns (where n is an integer in range of $n \geq 2$), data transmitting means disposed at positions $(a_{k,l})$ (where k and l are integers, respectively, defined by $2 \leq k \leq n$ and $k > l \geq 1$) of the matrix, and data selecting means disposed at positions $(a_{m,q})$ (where m and q are integers, respectively, defined by $1 \leq m \leq n$ and $n \geq q \geq m$) of the matrix. When the image data $x_1, x_2, \ldots, x_n$ to be contracted are moved from the n-th row toward the first row, the data transmitting means disposed at the n-th row sends out image data x so that the image data x can be inputted to the data transmitting means or the data selecting means disposed on the (n−1)-th row, while the data transmitting means disposed on the r-th row (where r is an integer in a range of $2 \leq r \leq n-1$) sends out the image data x so that the image data x can be inputted to the data transmitting means or the data selecting means disposed on the (r−1)-th row. The data selecting means disposed on the n-th row determines whether the image data $x_n$ to be contracted is to be discarded or not in dependence on a control signal which corresponds to the reference mask pattern, while the data selecting means disposed at the position $(a_{m-1, q-1})$ of the matrix determines in dependence on the control signal corresponding to the reference mask pattern whether the image data x outputted from the data selecting means disposed at the position $(a_{m,q})$ of the matrix or the image data x outputted from the data transmitting means or the data selecting means disposed at the position $(a_{m, q-1})$ of the matrix is to be received as the input data.

According to a further aspect of the invention, there is provided an image data contracting method, wherein at least a reference mask pattern of binary data $P_1, P_2, \ldots, P_n$ is prepared for image data $x_1, x_2, \ldots, x_n$ to be contracted (where n is an integer $\geq 2$). The image data $x_1, x_2, \ldots, x_n$ to be contracted is moved within a matrix of n rows and n columns from the n-th row toward the first row, during which a logical ORing operation is performed on the image data $x_i$ located at a position $(a_{i,i})$ of the matrix, provided that the reference mask pattern $P_i$ (where i is an integer in the range of $1 \geq i \geq n$) is of a first value, wherein the result of the operation is moved to a position $(a_{i-1, i-1})$ of the matrix, while image data x located at a position $(a_{i,j})$ of the matrix (where j is an integer in the range of $i+1 \geq j \geq a$) and a position $(a_{i,u})$ (where u is an integer in the range of $1 \leq u < i-2$) are moved, respectively, to positions $(a_{i-1, j-1})$ and $(a_{i-1, u})$ of the matrix. When the reference mask pattern $P_i$ is of a second value, the image data x located at a position $(a_{i,v})$ (where v is an integer in the range $1 \leq v \leq n$) in moved to a position $(a_{i-1, v})$.

According to a further aspect of the invention, there is provided an image data contracting circuit which comprises a matrix A having n rows and n columns where n is an integer $\geq 2$, data transmission means disposed at positions $(a_{k,l})$ of the matrix A (where k and l are integers given by $3 \leq k < n$ and $1 \leq k-1$), and first data selecting means disposed at positions $(a_{m,q})$ of the matrix A (where m and q are integers given by $1 \leq m \leq n$ and $q \geq m$), and second data selecting means disposed at positions $(a_{m,m-1})$, but excluding a position of $a_{1,0}$) of the matrix A. When the image data $x_1, x_2, \ldots, x_n$ to be contracted is moved from the n-th row of the matrix A toward the first row, the data transmitting means disposed on the k-th row of the matrix A sends out the image data x so that the image data x can be inputted to the data transmitting means or the second data selecting means disposed on the k−1-th row of the matrix A. The first data selecting means disposed on the n-th column responds to a control signal corresponding to the reference mask pattern to thereby determine whether the image data $x_n$ to be contracted is to be discarded or not, while the first data selecting means disposed at the position $a_{m,q}$ excepting a position in the n-th column of the matrix A responds to the control signal corresponding to the reference mask pattern to thereby determine whether the output image data x of the first data selecting means disposed at the position $(a_{m+1, q+1})$ of the matrix A or the output data x of the first or second data selecting means disposed at the position $(a_{m+1, q})$ of the matrix A is to be inputted. Further, the second data selecting means disposed at a position $(a_{m,m-1})$ of the matrix A adds arithmetic means to the first data selecting means disposed at the position $(a_{m,q})$ of the matrix A, wherein the arithmetic means performs an arithmetic operation on the output image data of the second data selecting means disposed at a position $(a_{m+1, m})$ of the matrix A and the output image data of the data transmitting means disposed at the position $(a_{m-1, m-1})$ of the matrix A. The second data selecting means responds to the control signal corresponding to the reference mask pattern to thereby determine whether the output image data of the data transmitting means disposed at the position $(a_{m-1, m-1})$ of the matrix A or the output image data of the arithmetic means included in the second data selecting means is to be inputted.

According to a still further aspect of the invention, there is provided an image data expanding method, wherein a reference mask pattern of binary data $P_m$ (where m is an integer $\geq 1$) is prepared for the image data $x_1, x_2, \ldots, x_n$ to be expanded (where n is an integer $\geq 1$). When the image data $x_1, x_2, \ldots, x_n$ to be expanded are moved within a matrix A having at least l rows and l' columns (where l and l' are integers in the respective ranges of $1 \geq 2$ and $l' \geq 2$) in the direction from the first row toward the l-th row, when the reference mask $P_i$ is of a first value (where i is an integer defined by $1 \leq i < l$), the image data x located at a position $(a_{i,j})$ (where j is an integer in the range of $i \leq j < l$) is moved to a position $(a_{i+1, j+1})$ of the matrix A, while the image data x located at a position $(a_{i,k})$ of the matrix A (where k is an integer in the range of $1 \leq k \leq i$) is moved to a position $(a_{1+1, k})$. When the reference mask $P_i$ is of a second value, the image data x located at a position $a_{i,p}$ (where p is an integer in the range $1 \leq p \leq l$) is moved to the position $(a_{i+1, p})$ of the matrix A.

According to still another aspect of the invention, there is provided an image data expanding apparatus which comprises a matrix A having at least l rows an l' columns (where l and l' are integers in the respective ranges of $1 \geq 2$ and $l' \geq 2$), data transmitting means disposed at positions $(a_{q,r})$ of the matrix A (where q and r are integers given by $2 \leq q \leq l$ and $q < r$), data selecting means disposed at positions $(a_{s,t})$ (where s and t are integers given by $1 < s \leq l$ and $s \leq t \leq l'$) and at a position in the first row, wherein when the image data $x_1, \ldots,$ $x_n$ to be expanded (where n is an integer in the range of $n \geq 1$) are moved from the first row toward the l-th row, the data selecting means disposed at the position in the first row responds to a control signal corresponding to a reference mask pattern $p_1$ to input one of the image data $x_{u-1}$, and $x_u$ to be expanded (where u is an integer in the range of $1 \leq u \leq n$, and, when $u \leq 1$, $x_0$ is fixed to zero), while the data selecting means disposed at the position $(a_{s,t})$ of the matrix A responds to the control signal corresponding to a reference mask pattern $P_s$ to input the image data (x) from the data selecting means disposed at one of the position $(a_{x-l,t-1})$ and $(a_{s-1,t})$, and the data transmitting means disposed at the position $(a_{q,r})$ of the matrix A inputs, the image data x from the data transmitting means or the data selecting means disposed at the position $(a_{q-1,r})$.

Further, there is provided according to an aspect of the invention an image expanding and/or contracting apparatus which comprises storage means for storing image data, a first register for storing a mapping pattern which indicates positions of the image data to be extracted upon contraction of the image and indicates the number of times of copying the image data upon expansion of the image data, and a second register for storing the last pixel data of a pixel data string generated through the expansion or contraction processing.

According to another aspect of the invention, there is provided an image expanding and/or contracting apparatus which includes storage means for storing image data, a first register for storing a mapping pattern which indicates positions of the image data to be extracted upon contraction of the image data and indicates the number of times of copying the image data upon expansion of the image data, an arithmetic circuit for extracting the last pixel data of a pixel data string generated through the expansion or contraction processing, and a second register for storing the last pixel data.

BRIEF DESCRIPTION OF THE DRAWINGS

The present invention will be more apparent upon consideration of the following detailed description taken in conjunction with the accompanying drawings, in which:

FIG. 12 shows a sequence chart for illustrating stepwise the process of contracting image data according to the invention;

FIGS. 18 and 19 shows respectively a process chart and a flow chart for illustrating the process of determining arithmetically a mapping pattern according to the present invention;

FIG. 22 is a view for illustrating a method for contracting data according to an embodiment of the present invention;

FIG. 28 is a view for illustrating the data contracting method according to an embodiment of the invention;

FIGS. 46, 47 and 48 are views for illustrating the circuit arrangement and operation of the binary data counting circuit employed in the arithmetic unit shown in FIG. 45;

FIGS. 50A and 50B illustrate respectively the symbol used in the decoder 246 shown in FIG. 49.

DESCRIPTION OF THE PREFERRED EMBODIMENTS

Figure 1:
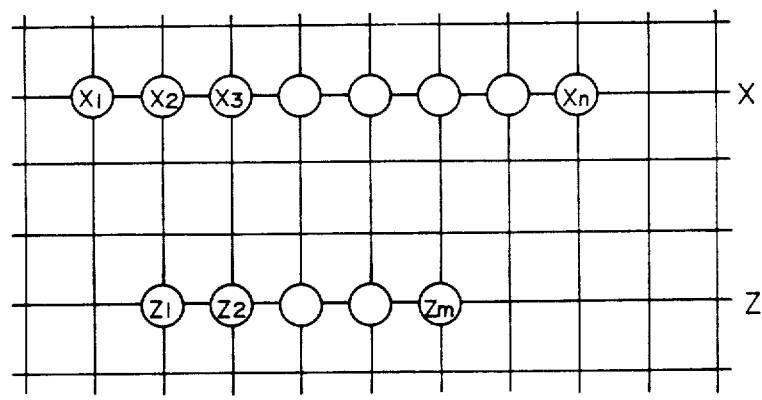
FIG. 1 is a view for illustrating the concept of expansion and contraction of an image.

Now, the invention will be described in detail in conjunction with preferred embodiments thereof by referring to the drawings.

The concept of expansion and contraction of an image with the aid of a mapping pattern, namely, a reference mask pattern, will first be elucidated or a control pattern. The mapping pattern is a vector which includes components "0" and/or "1" and designates positions or locations at the elements of original image data which are to be extracted in the case of the contraction while indicating the number of times at which the individual elements are to be copied.

In the case of the example of contraction illustrated in FIG. 2, the mapping pattern P is represented as follows:

$$P = (P_1, P_2, P_3, P_4, P_5, P_6, P_7, P_8)$$
$$= (1, 0, 1, 1, 0, 1, 0, 1)$$

A logical product of the above mapping pattern and the original image data X is determined for each of the elements to thereby obtain the output data Z by extracting the elements of the original image data X which correspond to "0" of the mapping pattern. More particularly, since $$P = (1, 0, 1, 1, 0, 1, 0, 1) \text{ and}$$
$$X = (X_1, X_2, X_3, X_4, X_5, X_6, X_7, X_8),$$

$$(P_i \cdot X_i) = (X_1, 0, X_3, X_4, 0, X_6, 0, X_8)$$

Thus, the output data Z is given as follows;

$$Z = (X_1, X_3, X_4, X_6, X_8)$$

Figure 3:
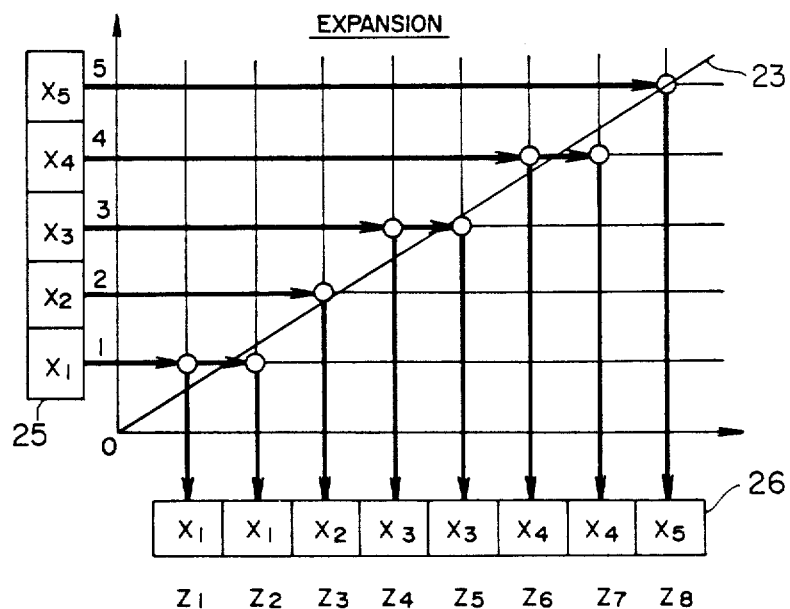
FIG. 3 is a view for illustrating a method for expanding image data.

Similarly, in the case of the expansion illustrated in FIG. 3, the mapping pattern is given by $$P = (1, 0, 1, 1, 0, 1, 0, 1)$$

as in the case of the contraction. By referring to the above pattern as of the leftmost element or bit, the original image data corresponding to "1" is renewed, while the original image data corresponding to "0" is copied. More particularly, on the assumption that $$P = (1, 0, 1, 1, 0, 1, 0, 1) \text{ and}$$
$$X = (X_1, X_2, X_3, X_4, X_5),$$

the output data Z are given by $$Z = (X_1, X_1, X_2, X_3, X_3, X_4, X_4, X_5)$$

Figure 4:
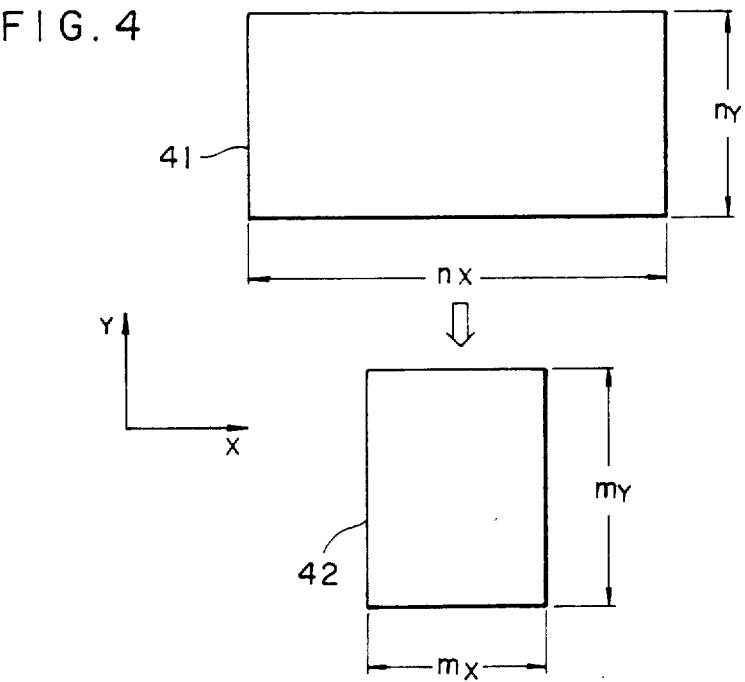
FIG. 4 is a view for illustrating the concept of expansion and contraction of a two-dimensional image.

In case where the two-dimensional data are to be transformed (i.e. expanded or contracted) on a row-by-row basis in the X-direction, as illustrated in FIG. 4, once the mapping pattern for the first row in the X-direction is arithmetically determined and stored at the beginning, the data transformation for the succeeding rows inclusive of the second row can be performed simply by referring to the store pattern, whereby high-speed processing can be accomplished.

In the following description, it is assumed that the data to be processed is binary image data in which one bit corresponds to one picture element or pixel. There is a data bus which is assumed to be 8 bits in width, and the processing is performed on an eight-bit basis. Further, input and output operations to and from each register are performed only on an eight-bit basis. (A set of eight bits may also be referred to as a word).

Figure 5:
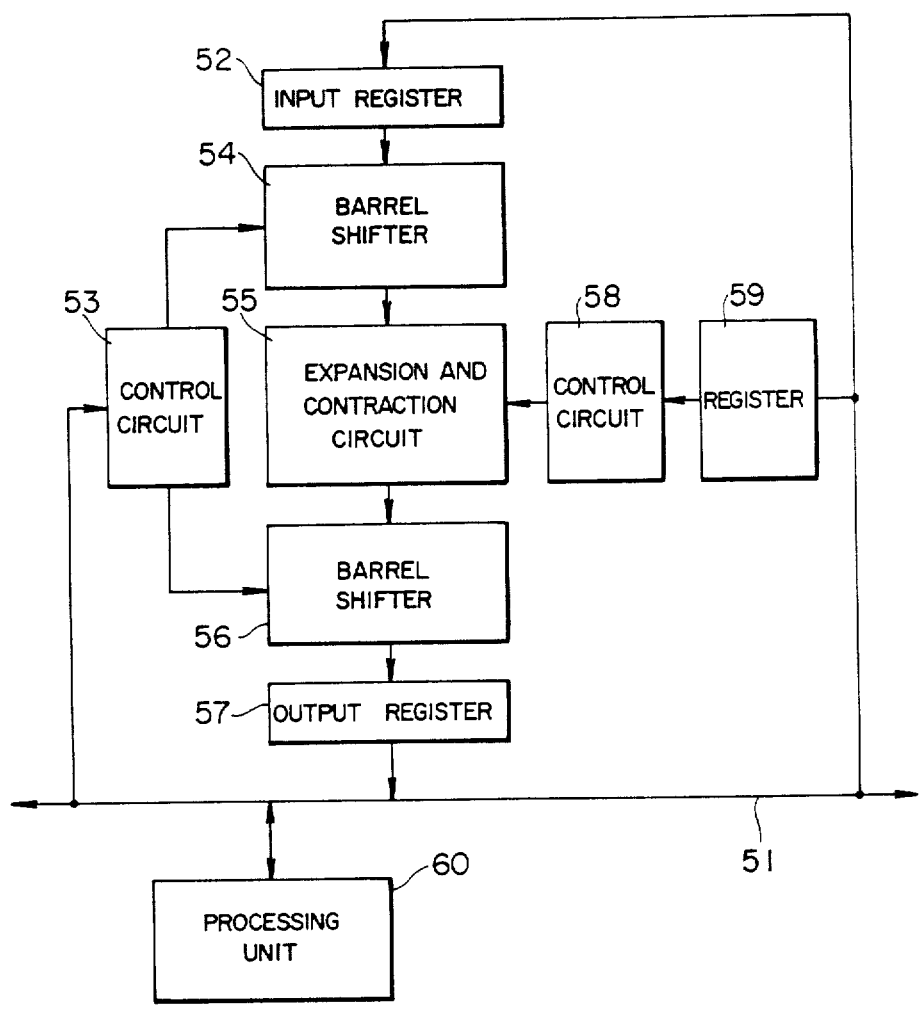
FIG. 5 shows in a block diagram a circuit arrangement for performing image expansion and contraction according to an embodiment of the invention.

FIG. 5 shows in a block diagram a general arrangement of the apparatus according to an exemplary embodiment of the invention.

Original image data loaded in an input register 52 through a data bus 51 is shifted by a first barrel shifter 54 under the control of a control circuit 53. The output data of the shifter 54 is expanded or contracted by an expansion and contraction circuit 55 which is controlled in dependence on the mapping pattern. The output data of the expansion and contraction circuit 55 is, after having been shifted by a second shifter 56, stored in an output register 57 to be available on the bus 51 for further processing.

The input register 52 has a capacity of two words each of eight bits, wherein the eight more significant bits (MSB) and the eight less significant bits (LSB) can be inputted and outputted independently of each other. In this connection, it is assumed that the most significant bit is located at the leftmost position with the least significant bit being located at the rightmost position in the figures. The output register 57 has a capacity of two words and is so arranged that the more significant word and the less significant word can be inputted and/or outputted independently. The first barrel shifter 54 has an entrance of 16 bits in width and an exit of 8 bits, while the second barrel shifter 56 has an entry of 8 bits and an exit of 16 bits. The expansion and contraction circuit 55 is designed to perform the processing on the eight-bit basis. The mapping pattern 60 is arithmetically determined by a processing unit 60 and stored in a register 59 to be read out by a control register or mapping pattern register 58 on the eight-bit basis for controlling the expansion and contraction circuit 55.

Next, the arrangement of the expansion and contraction circuit will be described, only by way of example. It should be mentioned that high-speed processing can not be accomplished to a satisfactory extent solely with the expansion and contraction circuit. The high-speed processing as desired can be accomplished by combining the expansion and contraction circuit additionally with other circuit components such as the barrel shifters.

Figure 6:
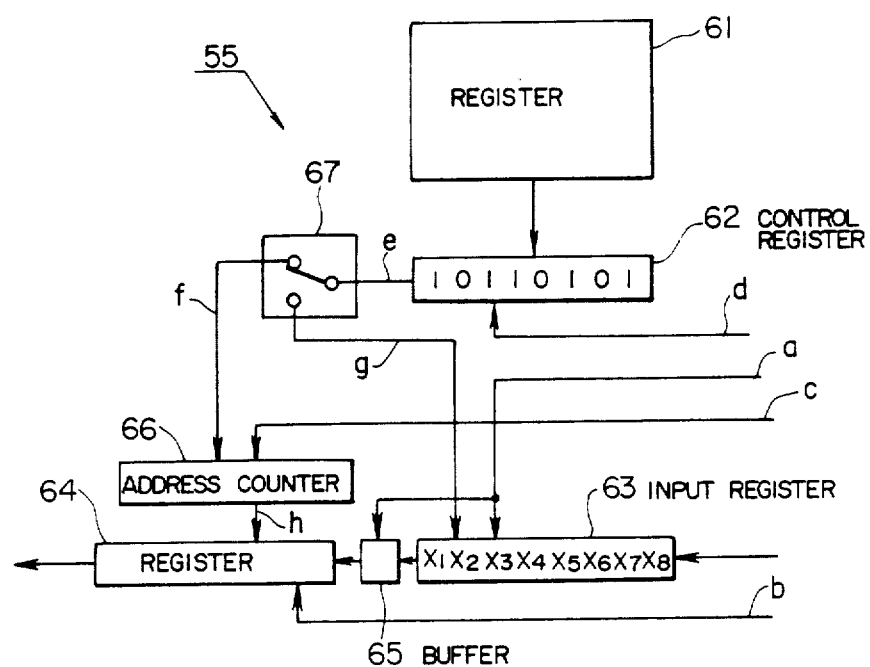
FIG. 6 shows in a block diagram an exemplified construction of the expansion and contraction circuit 55 shown in FIG. 5.

FIG. 6 shows an arrangement of the expansion and contraction circuit 55 according to an exemplary embodiment of the invention. The mapping pattern is read out from a register 61 on an eight-bit basis (i.e. eight-by-eight bits) and stored in a control register 62. On the other hand, the original image data of eight bits is stored in an input register 63. The registers 63 and 62 are constituted by shift registers which respond to clock signals a and d, respectively, for shifting the contents or data to the left, wherein the data appearing at the leftmost position of the register 63 is loaded in a buffer register 65. The clock signals a, b, c and d are of the same frequency and are delayed in phase by a small amount in the order of a, b, c and d. Numeral 67 denotes a switch circuit. In the case of the contraction, the mapping pattern value e outputted from the control register 62 in response to the clock d is transmitted to a line f by way of the switch 67. On the other hand, in the case of expansion, the mapping pattern value e is transmitted to a line g.

In the contraction mode, the leftmost one of the original image data in the register 63 is loaded in the buffer 65 in response to the clock a and then in response to the clock b is written in a register 64 at an address h designated by an address counter 66. When the value f of the mapping pattern outputted from the control register 62 is logic "1", the address counter 66 performs a counting operation, whereby the mapping pattern placed in the control register 62 is shifted to the left in response to the clock d. When the period in which a sequence of the clocks a, b, c and d appears is termed one cycle, the contracted data illustrated in FIG. 7A can be obtained in the output register 64 when eight cycles have elapsed from the starting time point.

In the expansion mode, the original image data placed in the input register 63 is transferred to the buffer 65 in response to the clock a when the output value g of the mapping pattern is logic "1". The data in the buffer 65 in turn is written in the register 64 at the address h in response to the clock b. The address counter 66 operates in response to the clock c, which is followed by the shifting of the mapping pattern to the left in the register 62 in response to the clock d. Thus, after eight cycles each defined by the sequence of the clocks a, b, c and d, the expanded data illustrated in FIG. 7B are prepared in the register 64.

Since the expansion and contraction circuit 55 shown in FIG. 6 is controlled by the use of a mapping pattern, by storing a pattern obtained through an arithmetic operation performed in the conversion of the first row, it becomes possible to attain the expansion and contraction of a two-dimensional image at high speed.

Figure 7A:
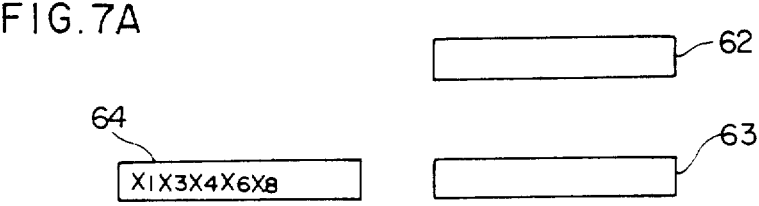
FIGS. 7A and 7B are views for illustrating the contents of the registers comprised in the expansion and contraction circuit 55 shown in FIG. 6 in its data contraction and expansion modes, respectively.
Figure 7B:
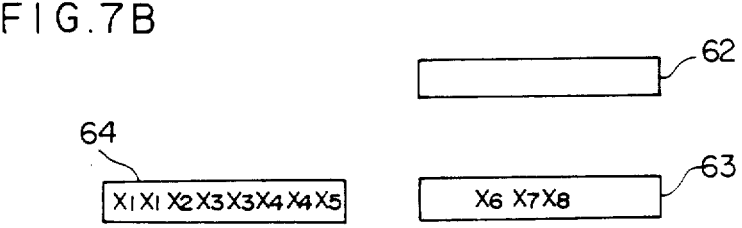

After operation for eight cycles in the contraction mode, the registers 62 and 63 are empty, while the register 64 is filled at the most significant five bits, as is illustrated in FIG. 7A. In the case of the expanding operation, the register 62 is found in the empty state after the eight cycles, while the register 64 is fully filled and the register 63 contains three remaining bits, as is illustrated in FIG. 7B.

Accordingly, in the case of the contraction mode, it is necessary that the mapping pattern and the original image data are supplied both on an eight-bit basis while the output data have to be read out every time the register 64 becomes full, requiring troublesome processing. (This processing will be referred to as the register overflow processing). In the expansion mode, the mapping pattern is supplied on an eight-bit basis with the output data being read out also on an eight-bit basis. However, the loading of the original image data in the register 63 is required to be performed at the time point when the register 63 becomes empty, rendering the processing troublesome. (This processing will be referred to as the register empty processing).

It should also be pointed out that although the memory for storing the original image data is usually so arranged that the reading of data can be performed on an 8-bit basis or on a 16-bit basis, it is impossible to read out the 8-bit data or 16-bit data from an arbitrarily selected position. It is common that the reading of data is permitted only from a predetermined position. (This position will be referred to as a word boundary.) In other words, the original image data as read out is always of eight bits from the word boundary. In this connection, it is noted that such expansion or contraction processing which is so commanded as to start from a word boundary and come to an end at another word boundary is rather rare. In other words, in many practical cases, it is required that the expansion or contraction processing starts from an intermediate bit of a word and terminates at an intermediate bit of another word. This processing is naturally troublesome. (This processing will be referred to as the word boundary processing.)

It is for the purpose of performing the troublesome expansion and/or contraction processings mentioned above tactfully at a high speed that two registers 52 and 57 each of a 16-bit-capacity and two barrel shifters 54 and 56 of the equivalent bit capacity are provided, as mentioned hereinbefore in conjunction with FIG. 5.

Next, the functions or roles of these registers and shifters will be elucidated.

Figure 8A:
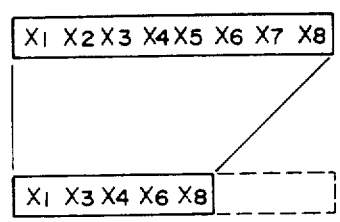
FIGS. 8A and 8B are views for illustrating transforming functions of the expansion and contraction circuit according to the invention.
Figure 8B:
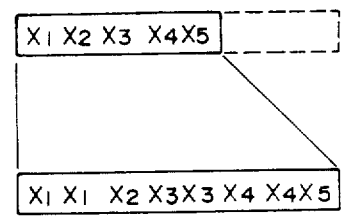

It is assumed that the expansion and contraction circuit 55 is adapted to transform the original image data of eight bits into the left-aligned 5-bit output data at a contraction ratio of ⅝ in the contracting operation mode, as is illustrated in FIG. 8A. On the other hand, in the expansion mode, the expansion and contraction circuit 55 performs translation of the left-aligned 5-bit original data into 8-bit output data at an expansion ratio of 8/5, as illustrated in FIG. 8B.

Figures 9A, 9B, 9C:
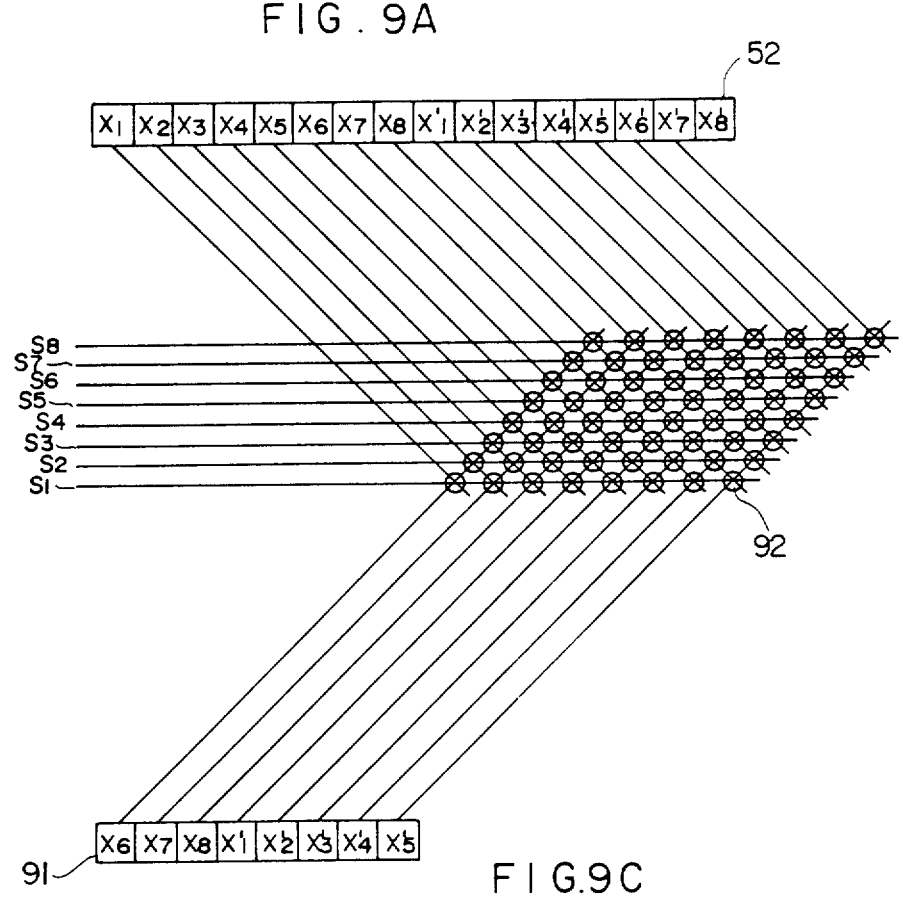
FIGS. 9A, 9B and 9C are views for illustrating the structure of the barrel shifters shown in FIG. 5.

FIG. 9A shows, by way of example, a configuration of the first barrel shifter 54. In the figure, reference numeral 92 indicates cells each of which is constituted by a transfer gate of a structure schematically illustrated in FIGS. 9B and 9C. The transfer gate is designed to interrupt the connection between signal lines p and q in response to control signal S. Referring to FIG. 9A, when a given one of the control signals S1 to S8 is validated, a given set of eight bits can be selected from the two words of 16 bits contained in the original image data register 52. In the illustrated case, the control signal S6 is assumed to be validated or turned on. Although the data bit $X'_1$ can not be straightforwardly transferred to a bit position of register 91, this transfer of the bit $X'_1$ to the register 91 can be accomplished by firstly reading out the least significant eight bits and writing them at the most significant eight bit positions, which is followed by the turning-on of the control signal S1, because the original image data register 52 is so arranged that the input/output of the most and less significant eight bits can be realized independently of each other.

The second barrel shifter 56 may be of a configuration corresponding to the one shown in FIG. 9A except that the input and output sides are reversed or exchanged with each other so that the 8-bit input can be transferred to given bit positions of the 16-bit output register 57.

Figure 10A:
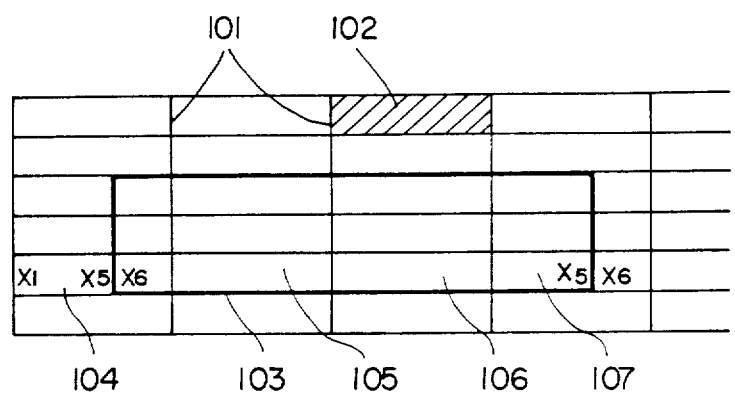
FIGS. 10A and 10B are views for illustrating images which are processed by the apparatus according to the present invention.
Figure 10B:
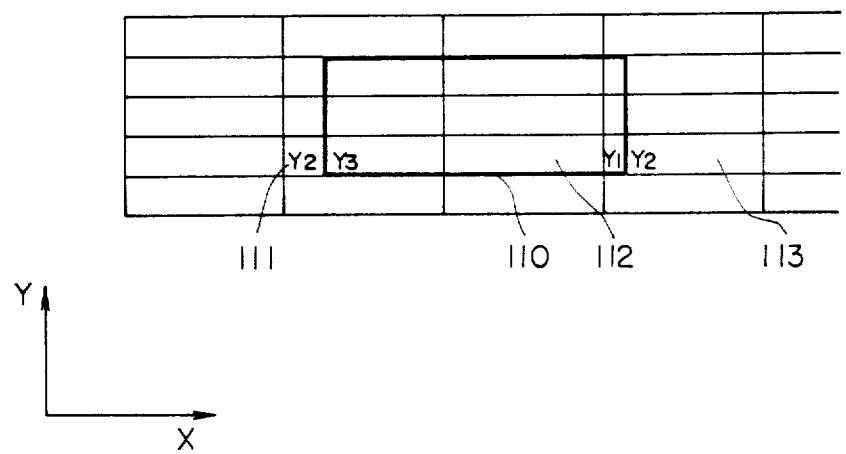

Next, to be explained will be the manner in which an input image 103 as illustrated in FIG. 10A is contracted to an output image 110 as illustrated in FIG. 10B or inversely the manner in which an input image 110 is transformed to an expanded output image 103 with the aid of the expansion and contraction circuit 55 and the associated circuits such as the barrel shifters. In FIG. 10A, the vertical lines 101 designates the boundary between words each of eight bits, and a hatched area 102 represents a single word consisting of eight bits or pixels (picture elements). In the illustrated case, it is assumed that the image 103 consists of n pixels (where n=24) and encompasses the sixth pixel of the word 104 to the fifth pixel of the word 107, and that the image 110 consists of m pixels (where m=15) and includes the third pixel of the word 111 to the first pixel of the word 113. In other words, contraction at the ratio of 15/24=5/8 or expansion at the ratio of 8/5 is under consideration. When the x-direction is referred to as the horizontal direction with the y-direction as the vertical direction, it is assumed that each of the images 103 and 110 consists of three pixels in the vertical direction. Further, the expansion and/or contraction are effected in such a manner in which the bottom row is firstly processed in the horizontal direction, which is then followed by the processing of the bottom second row and so forth.

Figure 11:
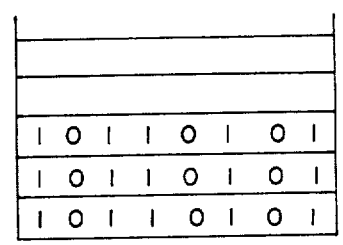
FIG. 11 is a view for illustrating a mapping pattern in the state stored in the mapping pattern register shown in FIG. 5.

Before the initiation of the processing, the mapping pattern is arithmetically determined on the basis of the number of original pixels n (=24) and the number of output pixels m (=15) and stored in the register 59 (FIG. 5) separately or distinctively for each word. The stored state is illustrated in FIG. 11.

Now, contraction will be elucidated by referring to FIGS. 5 and 10 in combination with FIG. 12 which shows data flows.

Here, the numbers of the words occurring during the processing of a row for an original image and an output image are denoted by j and l, respectively. Before initiating the processing of rows, both the original image word number j and the output image word number l are set to "1", and, as the processing of a word denoted by each word number is completed, the word number is increased by one.

1. Initialization of the First Row

Step (1): In the first place, the leading or first two words 104 and 105 of the original image data 103 are placed in the input register 52 in a manner illustrated at 121 in FIG. 12. Since the bits or pixels which undergo contraction are those which follow the pixel $X_6$, inclusive, of the first word, the five pixels $X_1$ to $X_5$ are unnecessary. To indicate this, the number of unnecessary pixels $C_i=5$ is set in an input counter 127 (FIG. 12). The remaining number n of the pixels of the original image data is 24.

Next, the leading one word 111 of the output image 110 is loaded in the output register 57 at the more significant bit positions, as shown at 125 in FIG. 12. The number of valid pixels $C_o=2$ contained in the output register is set at an output counter 129 (FIG. 12). The number m of empty pixels in the output image is equal to 15. By the way, the input counter 127 and the output counter 129 are incorporated in the control circuit 53 shown in FIG. 5. Here, j=1 and l=1, 2. Intermediate Processing of the First Row Step (2): From the mapping pattern register 59, the first eight bits of a mapping pattern are set at the control register 58, as illustrated in FIG. 12 at 123. The number $C_p$ of "1" bits present in the mapping pattern is set at a counter 128 (FIG. 12) which is also incorporated in the control circuit 53 shown in FIG. 5.

Step (3): The eight pixels following the pixel $X_6$ inclusive thereof are extracted by the first barrel shifter 54. The number or extent of the shifting to be effected is given by the value $C_i=5$ placed in the input counter 127.

Step (4): The contracted data shown at 124 in FIG. 12 is derived with the aid of the expansion and contraction circuit 55, which is controlled in dependence on the mapping pattern 123.

Step (5): The data thus obtained are loaded in the output register 57 at the bit positions following the bit $y_3$ through the second barrel shifter 56. The number or extent of the shifting to be effected is given by the value $C_o=2$ contained in the output counter 129. The value $C_o$ is updated to $C_o+C_p2+5=7$.

Step (6): No transfer takes place because the value $C_o$ of the output counter 126 is less than 8.

Step (7): The remaining number n of the pixels of the original image data is updated. Since the pixels are consumed eight by eight in the case of contraction, the number n is updated to $n-8=16$. The word number j is updated to $j+1=2$.

Step (8): The least significant eight bits of the input register 52 are shifted to the most significant eight bit positions, while the eight bits of the (j+1)-th word of the original image data are placed at the least significant eight bit positions, as illustrated at 131 in FIG. 12. Although the first word and the third word are denoted by using the same symbols $X_1, X_2, \ldots$, and $X_8$, it should be understood that these words represent different data. No variation occurs in the value $C_i$ of the input counter 127.

Step (9): The step (2) mentioned above is regained and the processings are repeated to the step (5). These processings are illustrated at 131 to 134 in FIG. 12.

Step (10): The contracted data shown at 134 is shifted by the second barrel shifter, as indicated by the content of the output counter 129, say 7, to thereby prepare the shifted output data shown at 135 in FIG. 12. The value $C_o$ of the output counter is updated to $C_o+C_p=7+5=12$.

Step (11): Since the value $C_o$ of the output counter 129 now exceeds the value "8", the most significant eight bits are transferred to the l-th word 111 of the output image data 110, while the least significant eight bits are shifted to the most significant bit positions. The value $C_o$ of the output counter 129 is updated to $C_o-8=4$, with l being updated to $l+1=2$.

Step (12): Again the remaining number n of the original image pixels is updated, i.e. $n \leftarrow n-8=8$. The word number, j is updated to $j+1=3$.

Step (13): The (j+1)-th word of the original image data is loaded in the input register 52 at the less significant bit positions in the manner illustrated at 141 in FIG. 12. Since it is designated that the contraction be effected to the pixel $X'_5$ of the fourth word, the (j+1)-th word is the last data of the first row. The processing described above in conjunction with the steps (2) to (5) is performed to thereby derive the contracted data illustrated at 144 in FIG. 12. The output data 145 are obtained through the processing of the step (10). The value $C_o$ of the output counter 129 is updated to $C_o+5=9$.

Step (14): Since the value $C_o$ of the output counter 129 is still beyond "8", the most significant eight bits of the output register 57 are transferred to the word 112 of the output image data 110 while the less significant bits are shifted to the more significant bit positions. The count value $C_o$ of the output counter 129 is updated to $C_o-8=1$. Thus, $1+1+1=3$.

Step (15): The remaining pixel number n is renewed. Namely, $n \leftarrow n-8=0$

3. End Processing of the First Row

Step (16): The first bit of the output data is aligned with the second bit of the word 113 of the output image data 110 and written in the word 113. This can be accomplished, for example, by setting the second bit et seq. of the output data to "0" and the first bit of the word 113 of the output image data to "0" and then by obtaining the logical sum for each bit position.

4. Processing of the Next Row

Step (17): A next row of the original image to be selected is determined in dependence on the expanison or contraction ratio in the vertical direction. For example, in the case of contraction at the ratio of ⅓, the third row upward is selected. On the other hand, in the case of expansion at the ratio of 3/1, the same present row is selected again. When the row of the original image to be selected is determined, the steps (2) to (16) described above are repeatedly executed. The same mapping pattern as that for the first row can be used. Accordingly, it is convenient to construct the mapping pattern register 59, for example, in a stack configuration, whereby upon completion of the processing for one row, a stack pointer is returned to the initial or start position.

Figure 13:
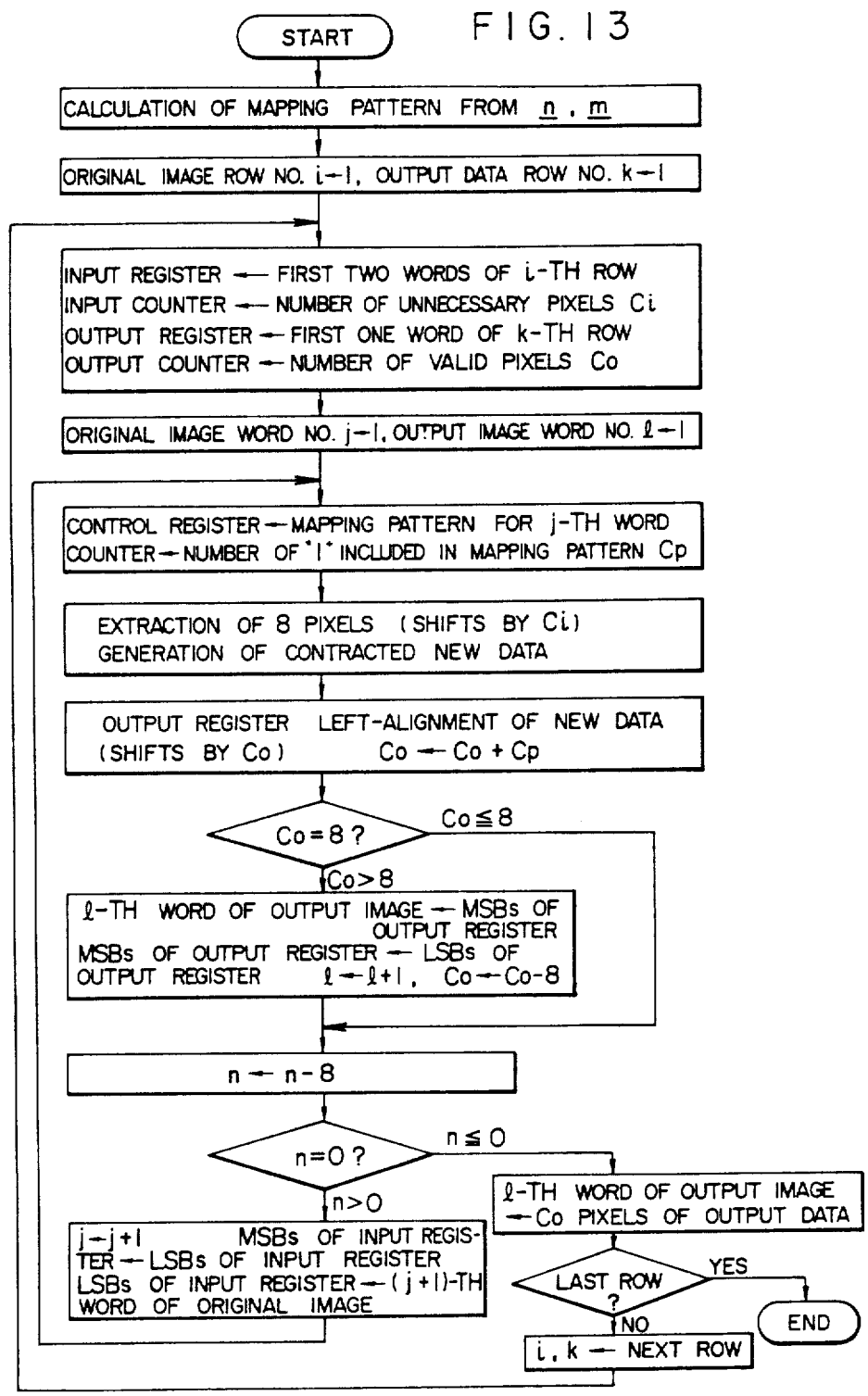
FIG. 13 shows a flow chart for the process of contracting image data according to the invention.

The flow of the processing described above is summarized in a flow chart shown in FIG. 13.

As will be appreciated from the foregoing description, the image expansion or contraction processing can be accomplished at a high speed because the individual steps can be executed on an eight-bit basis, without involving register overflow processing or word boundary processing, by virtue of the combination of the expansion and contraction circuit 55 with a pair of 16-bit registers 52 and 57 and a pair of the barrel shifters 54 and 56 according to the teaching of the present invention.

Figure 14:
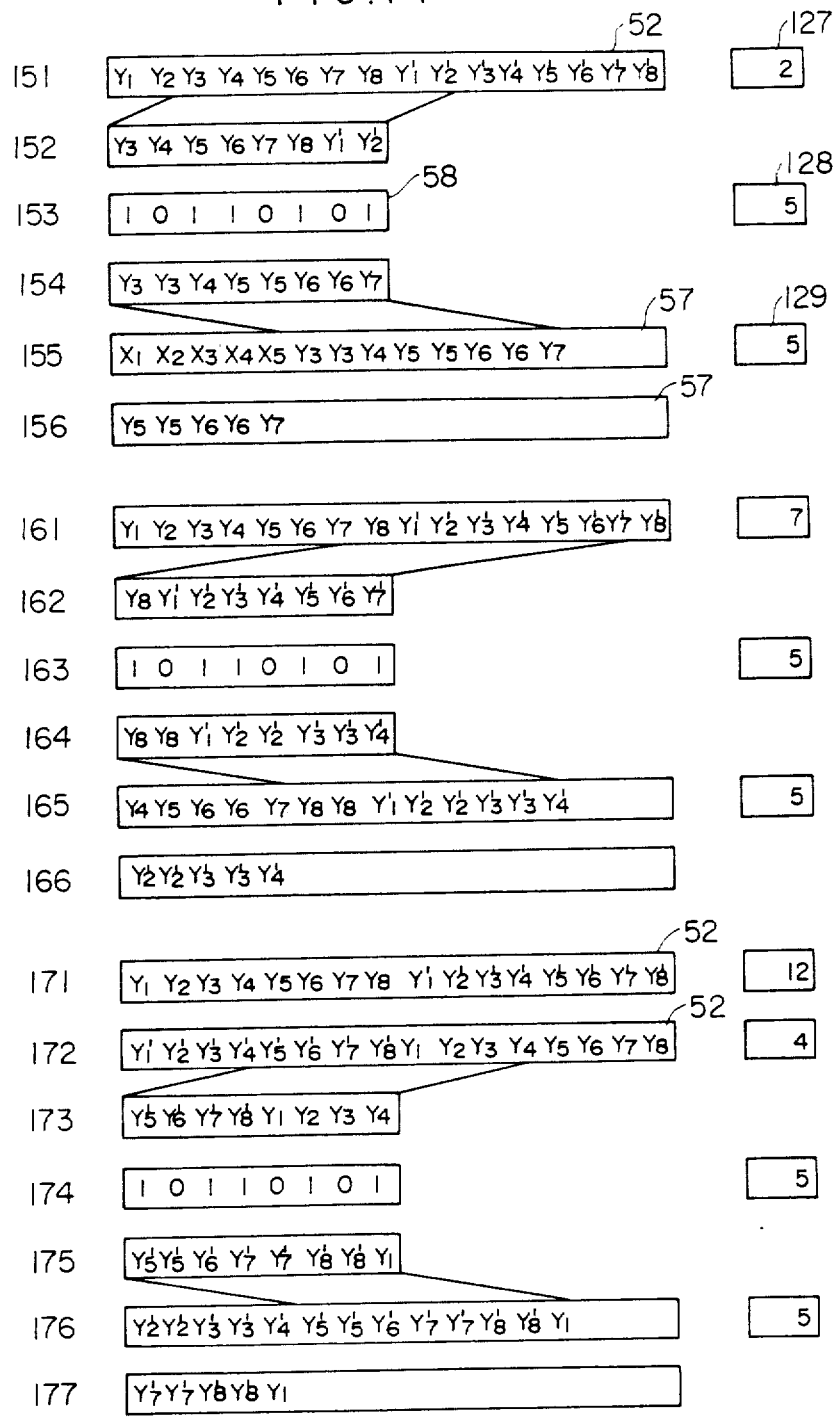
FIG. 14 shows a sequence chart for illustrating stepwise the process of expanding image data according to the invention.

Next, the expansion procedure will be elucidated by referring to FIGS. 5 and 10 in combination with FIG. 14.

1. Initialization of the First Row

Step (1): The first two words 111 and 112 of the original image data 110 are placed in the input register 52 in the manner illustrated at 151 in FIG. 14. Since expansion is performed on those bits of the first word which follow $y_3$ inclusive thereof, the data bits $y_1$ and $y_2$ are unnecessary. Accordingly, the number of the unnecessary bits $C_i(=2)$ is set in the input counter 127. The remaining number m of the pixels of the original image data is 15. The leading word 104 of the output image data 103 is loaded in the output register 57 at the more significant bit positions, as illustrated at 155 in FIG. 14. The number of the valid pixels $C_o(=5)$ contained in the output register is set at the output counter 129. The number n of the empty pixels in the output image data is equal to 24.

Here, j=1 and l=1

2. Intermediate Processing of the First Row

<j=1>

Step (2): The first eight bits of the mapping pattern are loaded from the mapping pattern register 59 in the control register 58, as illustrated at 153 in FIG. 14. The number $C_p$ of "1" bits included in the mapping pattern is set at a counter 128. In the instant case, $C_p=5$.

Step (3): Eight pixels succeeding $y_3$ inclusive thereof are extracted by the first barrel shifter 54 as designated by 152. The number or extent of the shifting to be effected is given by the value $C_i(=2)$ contained in the input counter 127.

Step (4): The expanded data 154 is derived from the expansion and contraction circuit 55 under the control of the mapping pattern 153.

Step (5): The data 154 thus obtained is placed in the output register 57 at the bit position $X_6$ et seq. with the aid of the second barrel shifter 56. The number or extent of the shifting to be effected is given by the value $C_o(=5)$ contained in the output counter 129.

Step (6): The most significant eight bits of the output register 57 are transferred to the l-th word 104 of the output image data 103, while the less significant bits are shifted to the more significant bit positions.

Thus, the value l is updated to $l+1=2$.

Step (7): The remaining pixel number n of the output image data is updated. Since eight pixels have been produced, $n \leftarrow n-8=16$.

Step (8): The value $C_i$ of the input counter 127 is updated. Namely, $C_i \leftarrow C_i+C_p=2+5=7$.

Step (9): Since the value $C_i$ of the input counter 127 is equal to 7 and not greater than 8, the input register 52 remains intact.

Step (10): The step (2) is regained and the processing until the step (8) is repeated, as illustrated at 161 to 166 in FIG. 14. The value l is updated to $l+1=3$, n is updated to $n-8=8$, and $C_i$ is updated to $C_i+C_p=7+5=12$. The word j is updated to $j+1=2$ Step (11): Since the value of $C_i$ exceeds "8", the least significant eight bits in the input register 52 are shifted to the more significant bit positions, while the succeeding word 113 of the original image data is placed at the least significant eight bits position of the input register 52. The count value $C_i$ of the input counter 127 is updated to $C_i-8=4$. The data in this step (11) is denoted by 172.

Step (12): Return is made to the step (2) and the processing to the step (8) is again performed, as illustrated at 172 to 177 in FIG. 14. The value l is updated to $1+1=4$, n is updated to $n-8=0$, and $C_i$ is updated to $C_i+C_p=4+5=9$.

3. End Processing of the First Row

Step (13): The five bits ($C_o$) of the output data 177 are aligned with the least significant three bits of the l-th word 107 of the output image data 103 and written in the word 107.

4. Processing of the Next Row

Step (14): In dependence on the expansion or contraction ratio in the vertical direction, the row of the original image data to be subsequently processed is determined, and the processing at the steps (2) to (13) is repeated. The same mapping pattern as that used in the processing for the first row can be used in the processing of the second row.

Figure 15:
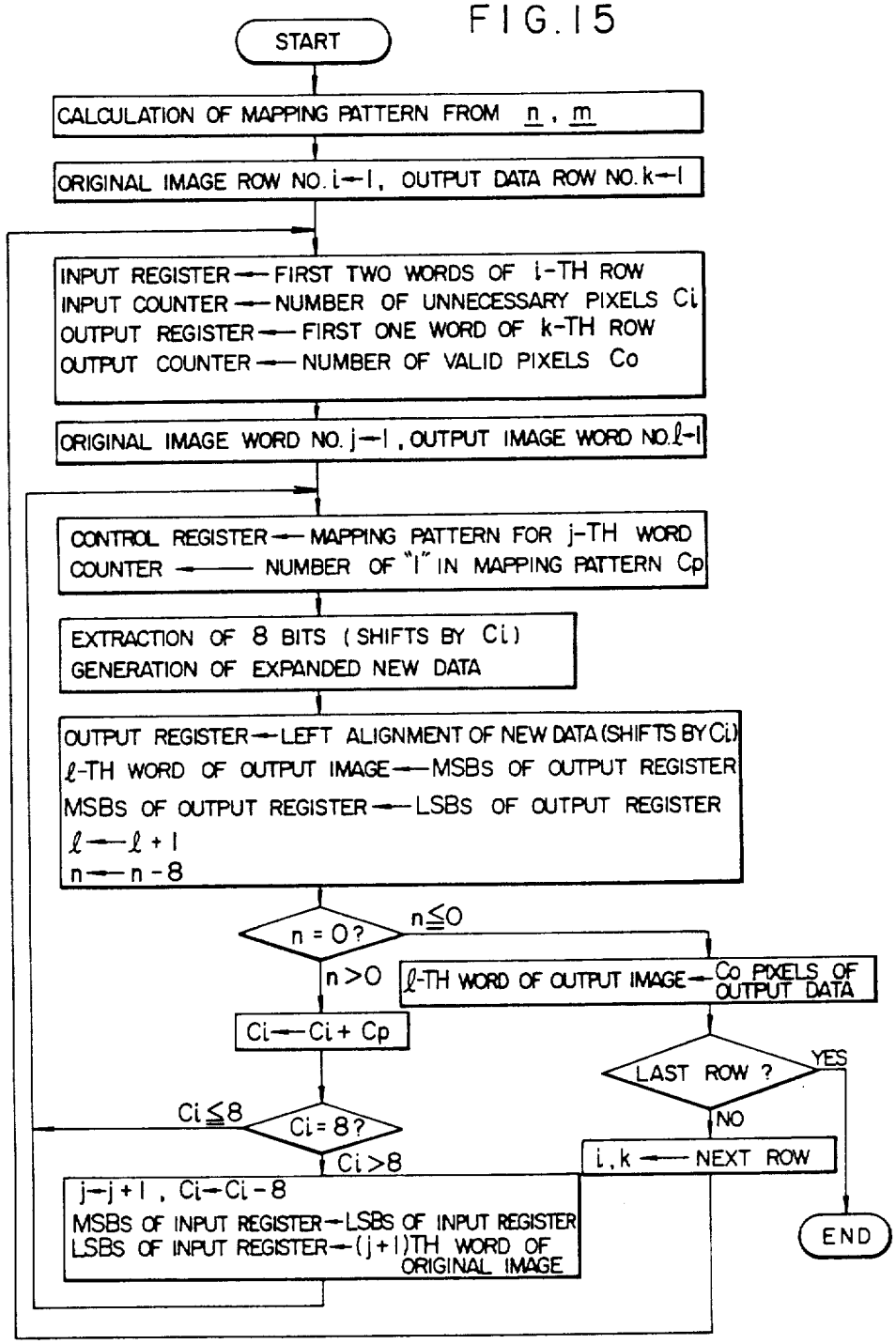
FIG. 15 shows a flow chart for the process of expanding image data according to the invention.

The flow of the processing described above is illustrated as summarized in a flow chart shown in FIG. 15.

The expansion processing elucidated above can be executed at a high speed without requiring register empty processing and word boundary processing by virtue of the combination of the expansion and contraction circuit 55 with a pair of registers 52 and 57 and a pair of barrel shifters 54 and 56.

In the case of the exemplary embodiment described so far, it has been assumed that the first barrel shifter has an entry of 16 bits in width and an exit of 8 bits in width. However, it should be appreciated that when the expansion and contraction circuit performs the processing on an n-bit basis in general terms, the entry and the exist of the first barrel shifter may be of more than 2n bits and n bits, respectively.

Further, the width of the data bus is not restricted to eight bits.

Although the foregoing description has been made on the assumption that data to be processed are binary image data, the invention is not restricted to this type of data. The expansion and contraction according to the invention can equally be applied to the processing of a half-tone image, so far as the data is available in the binary form.

Next, a second exemplary embodiment of the present invention will be described.

Figure 16:
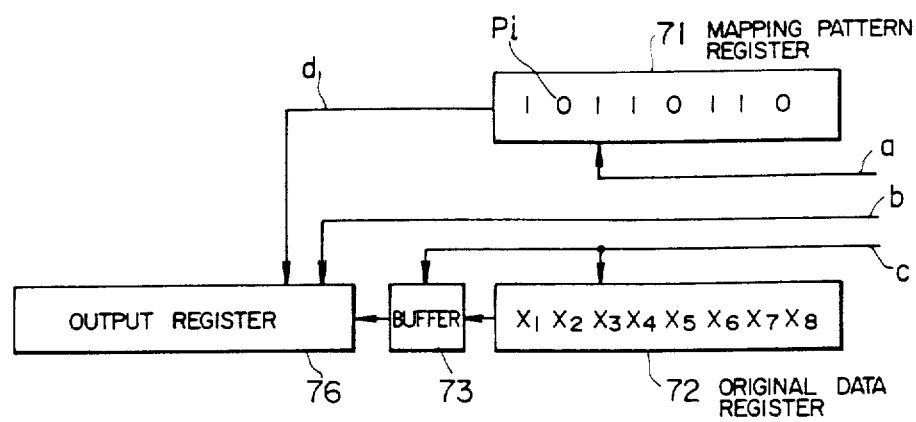
FIG. 16 is a block diagram for illustrating the process of contracting image data according to another embodiment of the invention.

FIG. 16 shows schematically an arrangement of the contraction circuit according to another embodiment of the invention. In the figure, reference numeral 72 denotes a shift register for storing the original image data, 76 denotes a shift register for storing output data and numeral 71 denotes a shift register for storing the mapping pattern. These shift registers 71, 76 and 72 are driven in response to the clock signals a, b and c which are delayed in phase relative to one another by a small amount in this order. The clock c applied to the register 72 causes the original image data stored therein to be shifted to the left, resulting in that the data bit located at the leftmost bit position (the most significant bit position) is transferred to a buffer 73. Subsequently, in response to the clock b, the data bit in the buffer 73 is loaded in the output shift register 76, provided that the pattern output d of the register 71 is logic or binary "1". On the other hand, when the pattern output d is "0", the data in the buffer 73 is not written in the output register 76. Defining a sequence of the clocks c, b and a as one cycle, the contracted data $X_1$, $X_3$, $X_4$, $X_6$, $X_7$ are prepared in the output register 76 after eight cycles.

Figure 17:
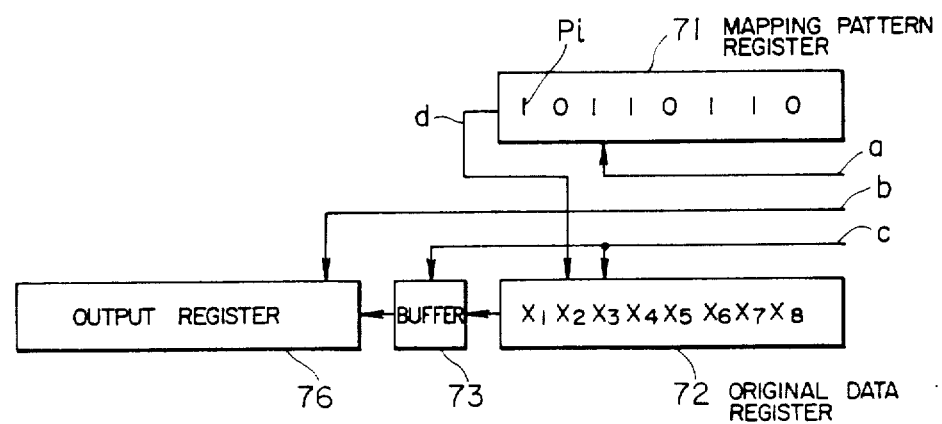
FIG. 17 is a block diagram for illustrating the process of expanding image data according to another embodiment of the invention.

FIG. 17 illustrates a circuit configuration for the expansion of image data. Only when the pattern output d of the mapping pattern register 71 is "1", the original image register 72 is shifted, whereby the data at the left-most bit position is transferred to the buffer 73. On the other hand, when the pattern output d is "0", the shifting does not take place in the original data register 72, incurring no change in the content of the buffer 73. The clocks c, b and a are delayed in phase by a small amount in this order, as in the case of the contracting operation illustrated in FIG. 16. When a sequence of the clocks c, b and a is referred to as one cycle, there are prepared the expanded data $X_1$, $X_1$, $X_2$, $X_3$, $X_3$, $X_4$, $X_5$, $X_5$ in the output register 76 after eight cycles.

The arithmetic determination or calculation of the mapping pattern $P (=P_1, P_2, P_3 ...)$ is performed in the manner mentioned below.

(1) In case the original data of n pixels is contracted to m pixels, the expression for transforming the original image data $X (=X_1, X_2, ... X_n)$ into the output data $Z (=Z_1, Z_2, ..., Z_m)$ is, for example, given by $$Z_j \leftarrow X_i$$

$$j \leftarrow [(m/n)(i-0.5)]+1$$

where [a] represents the maximum integer which is not greater than a. Assuming that $m/n=5/8$, the relationships among i, j and $Z_j$ are given by i: 1, 2, 3, 4, 5, 6, 7, 8
j: 1, 1, 2, 3, 3, 4, 5, 5
$Z_j$: $X_1$, $X_3$, $X_4$, $X_6$, $X_7$ It will be seen that the original image data $X_i$ is extracted at the point where j varies and included in the output data $Z_j$. In other words, at the point where j is changed, the mapping pattern bit $P_i$ is set to "1".

To this end, the initial value of $$\left(1 - \frac{m}{2n}\right)$$

is added with 5/8. From the sum, 1 is subtracted. When the resulting difference is positive, $P_i$ is set to "1". When the difference is negative or "0", $P_i$ of "0" is carried over to the succeeding stage.

Figure 19:
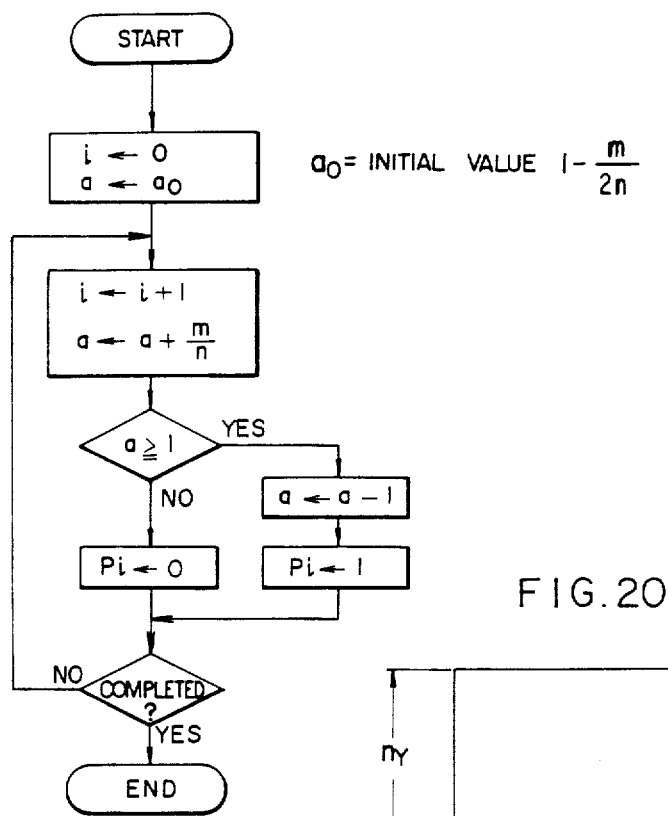

This procedure of the arithmetic determination or calculation of the mapping pattern is illustrated in FIG. 18. In the figure, stages of calculation are shown at column 101, while at column 102 there are shown additions of m/n=5/8 to the values of the preceding stages, respectively. The results of additions are shown at column 103. In case the result of addition is greater than 1(one), the part exceeding 1(one) is shown at column 104. This part (i.e. the difference resulting from subtraction of 1(one) from the result of the addition) is carried over to the succeeding stage. Unless the result of addition exceeds 1(one), the result of the addition is carried over to the succeeding stage. At column 105, elements of the mapping pattern are shown. When the result of addition exceeds 1, the corresponding pattern element assumes a value of "1". Otherwise, the element assumes the value "0". FIG. 19 illustrates in a flow chart the calculating procedure mentioned above. Interim values are represented by a.

(2) In case the original data of n pixels are expanded to m pixels, the expression of the transformation of the original image data $X(=X_1, X_2, ..., X_n)$ into $Z(=Z_1, Z_2, ..., Z_m)$ is, for example, given by $Z_j \leftarrow X_i$ $[(n/m)(i-0.5)]+1 \rightarrow i$ The relationships among i, j and $Z_j$ are as follows:
j: 1, 2, 3, 4, 5, 6, 7, 8
i: 1, 1, 2, 3, 3, 4, 5, 5
$Z_j$: $X_1$, $X_1$, $X_2$, $X_3$, $X_3$, $X_4$, $X_5$, $X_5$ Accordingly, the mapping pattern is the same as in the case of the contraction, wherein only the interpretation needs to be changed. More specifically, $X_k$ is changed at the position "1" of $P_i$, while $X_k$ is left unvaried so long as $P_i$ assumes the value "0".

According to the method mentioned above, the same frequency may be employed as the clock signals for driving the registers 71, 72 and 76 shown in FIGS. 16 and 17, involving no necessity for generating a frequency such as (m/n)f.

Figure 20:
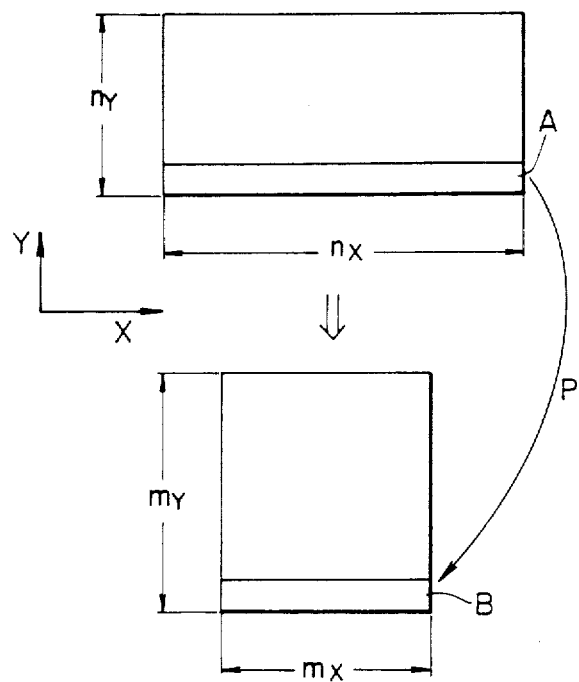
FIG. 20 is a view for illustrating a method for expanding or contracting a two-dimensional image.

Next, expansion and contraction of a two-dimensional image such as shown in FIG. 20 will be considered. In the two-dimensional image, the horizontal direction (x-direction) is referred to as the row, while the vertical direction (y-direction) is referred to as the column. In case the processing is effected in a manner in which transformation (i.e. expansion or contraction) of one row is followed by the transformation of another row which is displaced from the one row in the vertical direction, the mapping pattern P may be arithmetically determined and stored in a memory when the first row A of the original image is transformed into the first row B of the output image. Then, the transformation of the second row as well as the succeeding rows can be carried out by referred to the mapping pattern as stored. Accordingly, the processing speed can be increased ten or more times as high as the speed of processing in which the mapping pattern is determined for every transformation of the row.

Figure 21:
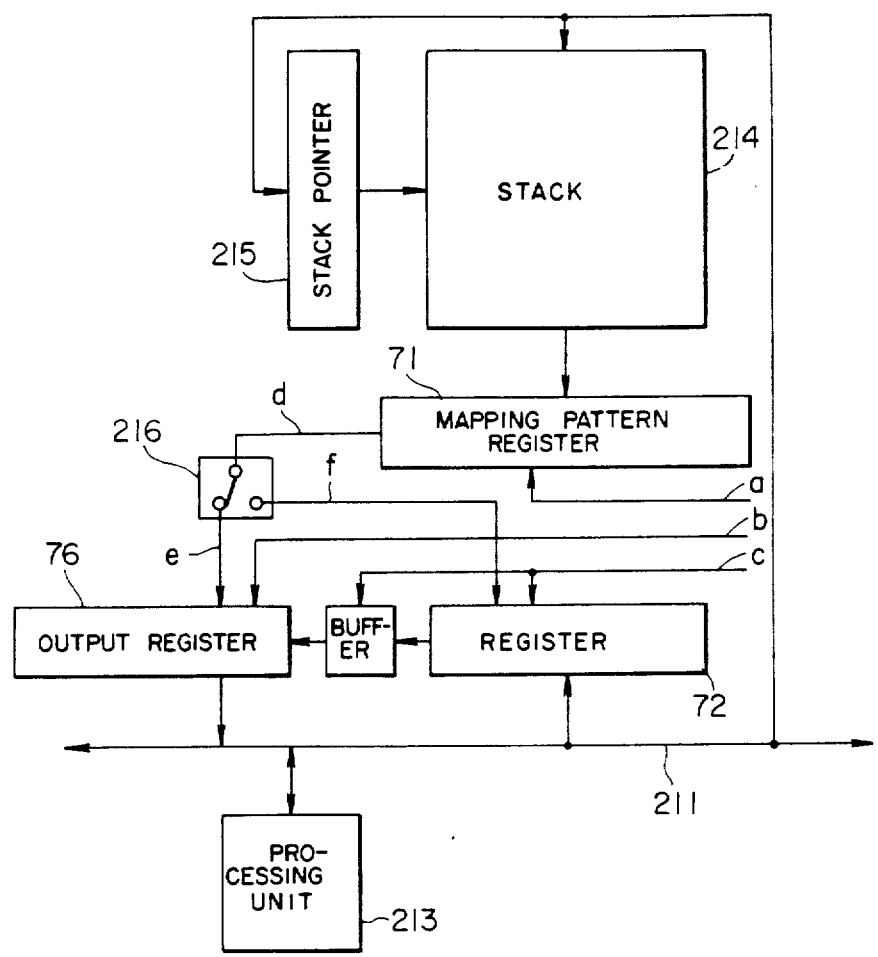
FIG. 21 is a block diagram showing the structure of the mapping pattern register of a stack configuration according to an embodiment of the invention.

Next, the mapping pattern register of a stack configuration will be described by referring to FIG. 21. In many applications, the image information or data is in general stored in a storage or memory device and processed by a computer, wherein arrangement is so made that the image data can be accessed on an 8-pixel basis or 16-pixel basis. Under the circumstances, the access to the mapping pattern should preferably be compatible with the access to the image data. Now referring to FIG. 21, the original image data of 16 bits are stored in the register 72 by way of a data bus 211 of 16 bits in width. The mapping pattern is arithmetically determined by a processing unit 213 on a 16-bit basis and stored sequentially in a first-in, first-out stack 214 of 16 bits in width. For example, when the mapping pattern is required for fifty bits, calculation of the mapping pattern is effected four times on a 16-bit basis, wherein the resulting four sets of mapping pattern data are sequentially stored in the stack 214. The address of the stored mapping pattern is designated by a stack pointer 215 and outputted to the mapping pattern register 71. The pattern output d of the register 71 is produced on a line e in the case of contraction through a switch 216 while the output d is transmitted to a line f in the case of expansion, thereby controlling the output register 76 in the former case or the original image data register 72 in the latter case. A series of operations taking place in the circuit shown in FIG. 21 will be described below in detail.

Step (1): A mapping pattern is calculated and stored in the stack 214.

Step (2): The initial address is set at the stack pointer 215, whereby the mapping pattern located at the address designated by the stack pointer 215 is read into the mapping pattern register 71.

Step (3): The registers 72, 76 and 71 are driven in response to the clocks c, b and a, respectively, whereby the output data are prepared from the original image data and placed in the output register 76.

Step (4): Updating of data is carried out. In the case of contraction, the original image data and the mapping pattern are processed during a period which corresponds to the sixteen clocks. The contracted data is stored in the output register 76. In other words, when the sixteen clocks constitute one cycle, the original image data and the mapping pattern are consumed in one cycle.

In the case of expansion, the mapping pattern is consumed in one cycle, whereby the output data of 16 bits is prepared by consuming a corresponding part of the original image data.

Accordingly, in the case of contraction, the mapping pattern and the original image data are updated or renewed at every cycle. The output data are read out when the output register is filled.

In the case of expansion, the mapping pattern is updated at every cycle with the output data being read out. The original image data are updated at a time point when it has been consumed.

The stack pointer may be automatically incremented at every cycle.

Step (5): When a two-dimensional image such as illustrated in FIG. 20 is to be processed, the mapping pattern for one row is divided into segments each of 16 bits and stored in the stack 214. Upon completion of the processing for one row, the stack pointer 215 is returned to the starting position. Thus, the succeeding rows inclusive of the second row can be processed in the similar manner.

As will be appreciated from the foregoing, by implementing the mapping pattern storing register 71 in the stack configuration, the mapping patterns can be sequentially read out automatically merely by setting the stack pointer 215 at the time point when the processing for the first row is initiated, whereby the processing can be performed smoothly.

In the following, other concrete examples of the image contracting method according to the invention will be described. In this connection, it should be noted that the following description is based on the assumption that the registers 63 and 64 and the buffer 65 shown in FIG. 6 and the contraction device shown in FIG. 16 are employed and that one word is formed by eight bits.

In the first place, it is assumed for convenience of elucidation that the original image data X includes elements or bits $x_0$, $x_1$, $x_2$, $x_3$, $x_4$, $x_5$, $x_6$ and $x_7$ and that the mapping or mask pattern P for the reference consists of 1, 0, 1, 0, 0, 0, 1 and 0, as illustrated in FIG. 22.

Further, individual elements of the matrix illustrated in FIG. 22 are represented by $M_{i,j}$ where i designates rows and j designates columns. Referring to FIG. 22, the original image data X are initially present at the row i(=7) and shifted from the row i to the row (i−1) and so forth within the matrix, whereby the contracted image Y=$x_0$, $x_2$, $x_6$ is obtained. Upon displacement from the row i to the row (i−1), the element $M_{i,j}$ where i=j is neglected or discarded when the reference mask pattern $P_i$ is "0", wherein all the elements located on the right side to the elements $M_{i,j}$ where i=j are shifted to the left by one element. On the other hand, when the reference mask pattern (mapping pattern) $P_i$ is "1", all the elements present at that time on the row i are moved to the row (i−1). This operation is performed for each of the elements in the row down to the lowermost row where i=0, whereby the contracted or compressed image Y is derived as the output data from the matrix.

The concept described above will be considered concretely by applying actual values.

(1) At the row i(=7), $P_7$ is "0". Accordingly, the bit $x_7$ is neglected or discarded. Since the element $M_{7,8}$ is absent on the right side to the element $M_{7,7}$ in the instant illustrative example, the element $M_{6,7}$ is empty. Accordingly, the row i where i=6 consists of $x_0$, $x_1$, $x_2$, $x_3$, $x_4$, $x_5$ and $x_6$.

(2) Since $P_6=1$ for the row i(=6), all the elements of this row are transferred to the row i=5, which thus includes $x_0$, $x_1$, $x_2$, $x_3$, $x_4$, $x_5$ and $x_6$.

(3) At the row i(=5), $x_5$ is discarded since $P_5=$"0", resulting in that all the elements located on the right side to the column j(=5) are shifted to the left. Accordingly, the row i(=4) includes $x_0$, $x_1$, $x_2$, $x_3$, $x_4$, $x_6$.

In a similar manner, the processing is performed for the rows i(=4 to 0), whereby the output data $Y=x_0$, $x_2$, $x_6$ are derived from the matrix.

By imaging the column j(=8) which includes elements all of "0" value, empty elements of the matrix may be set to "0".

Next, a data contracting circuit of a third embodiment of the present invention will be described. As pointed out hereinbefore, this circuit corresponds to the main portion of the circuit shown in FIG. 6 or the circuit shown in FIG. 16.

Figure 23:
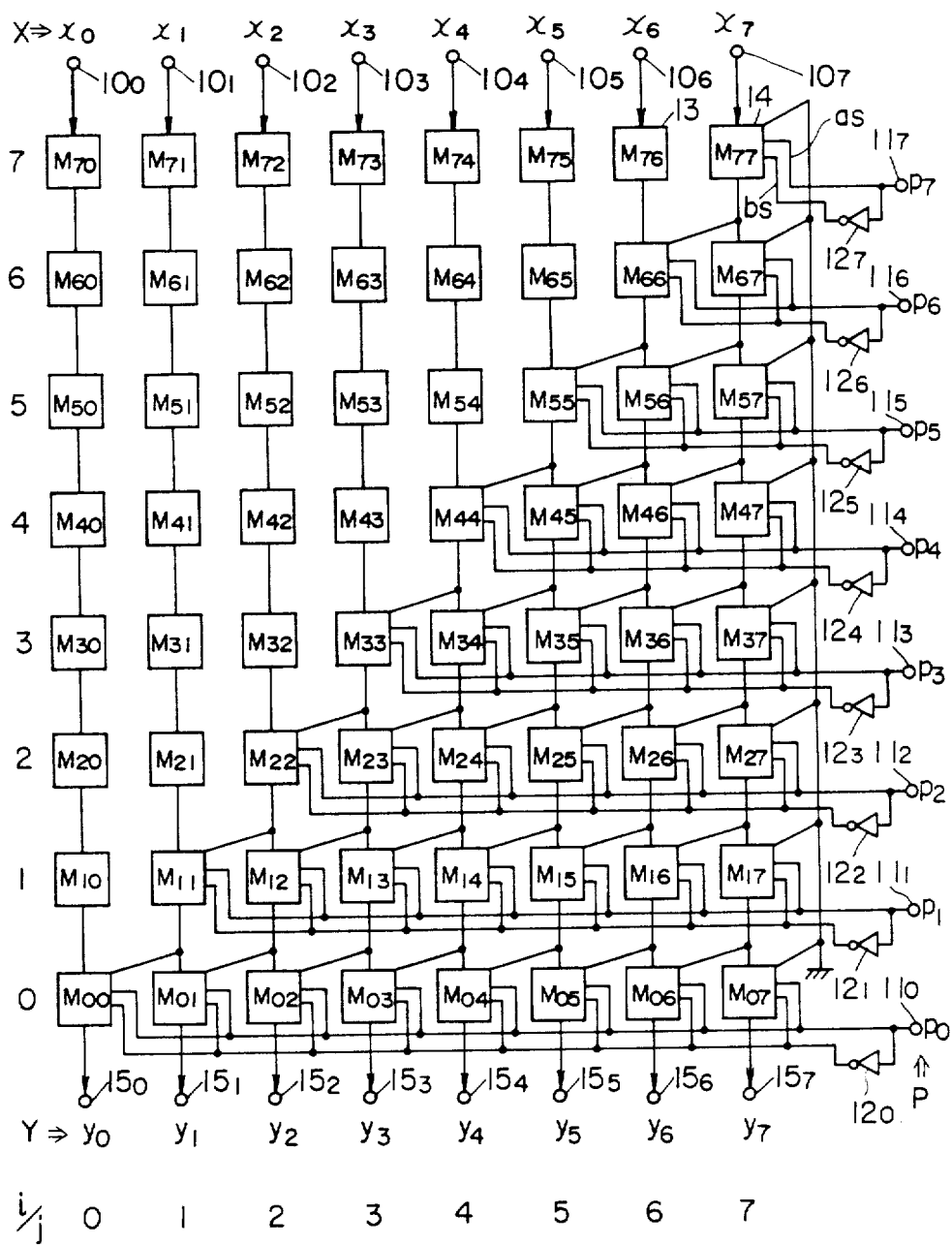
FIG. 23 is a wiring diagram of the data contracting circuit according to an embodiment of the present invention.

FIG. 23 shows a wiring diagram of the data contracting circuit according to an exemplary embodiment of the invention.

Figure 24:
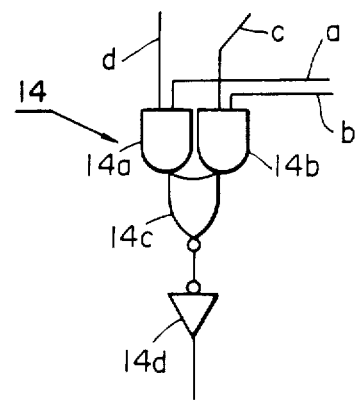
FIG. 24 is a view showing a circuit configuration of the data selecting means employed in the circuit shown in FIG. 23.

In FIG. 23, reference numerals $10_0$ to $10_7$ denote input terminals to which image data $x_0, \ldots, x_7$ to be contracted are applied, $11_0$ to $11_7$ denote control input terminals to which a binary control signal corresponding to the reference mask pattern (mapping pattern) $P_0, \ldots, P_7$ is applied, and numerals $12_0$ to $12_7$ denote inverters, respectively. Reference numeral 13 denotes data transmitting means each provided at the location of element $M_{k,l}$ (where k and l are both integers which satisfy the conditions of $1 \leq k \leq 7$ and that $k > l \geq 0$ of a matrix consisting of eight rows and eight columns. The data transmitting means may simply be signal lines and serve for transmitting the data incoming from the above to the elements located below. Numeral 14 denotes data selecting means provided at locations of the matrix elements $M_{s,t}$ (where s and t are both integers and satisfy the conditions that $0 \leq s \leq 7$ and $s \leq t$). The data selecting means may be constituted by logical elements 14a, 14b, 14c and 14d in the manner illustrated in FIG. 24 and serves for selecting one of data located at the matrix element $M_{s+1, t+1}$ or the matrix element $M_{s+1, t}$ in dependence on the control signals $a_s$ and $b_s$ which correspond to the reference mask pattern (or mapping pattern) $P_s$ supplied through the control signal input terminals $11_s$. It should however be noted that the data selecting means 14 provided at the row 7 of the matrix shown in FIG. 23 serves only for determining whether the image data $x_7$ is discarded or not. Reference numerals $15_0$ to $15_7$ denote output terminals through which the contracted data Y are obtained.

The operation of the data selecting means 14 will be described in detail by referring to FIG. 25.

Figure 25:
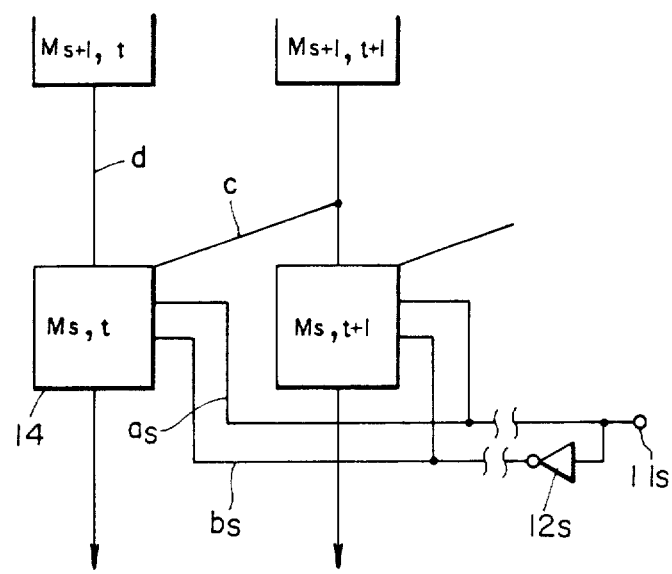
FIG. 25 is a wiring diagram including the data selecting means shown in FIG. 24.

As is seen in FIG. 25, the data selecting means 14 is so arranged that the data signal c present at the matrix element $M_{s+1, t+1}$ is selected as the input when the control signal $a_s$ supplied through the control input terminal $11_s$ is "0" and when the control signal $b_s$ is "1", i.e. when $(a_s, b_s)=(0, 1)$, while the data d present at the matrix element $M_{s+1,t}$ are selected as the input when the control signals $a_s$ and $b_s$ are "1" and "0", respectively, that is, when $(a_s, b_s)=(1, 0)$.

The operation of the matrix circuit described above with reference to FIG. 23 will now be described below in detail.

The reference mask pattern (or mapping pattern values) $P_i(i=0, 1 \ldots, 7)$ are 1, 0, 1, 0, 0, 0, 1, 0 and the contracted data derived finally are represented by $x_0$, $x_2$, $x_6$, as described hereinbefore in conjunction with FIG. 22.

Figure 26A:
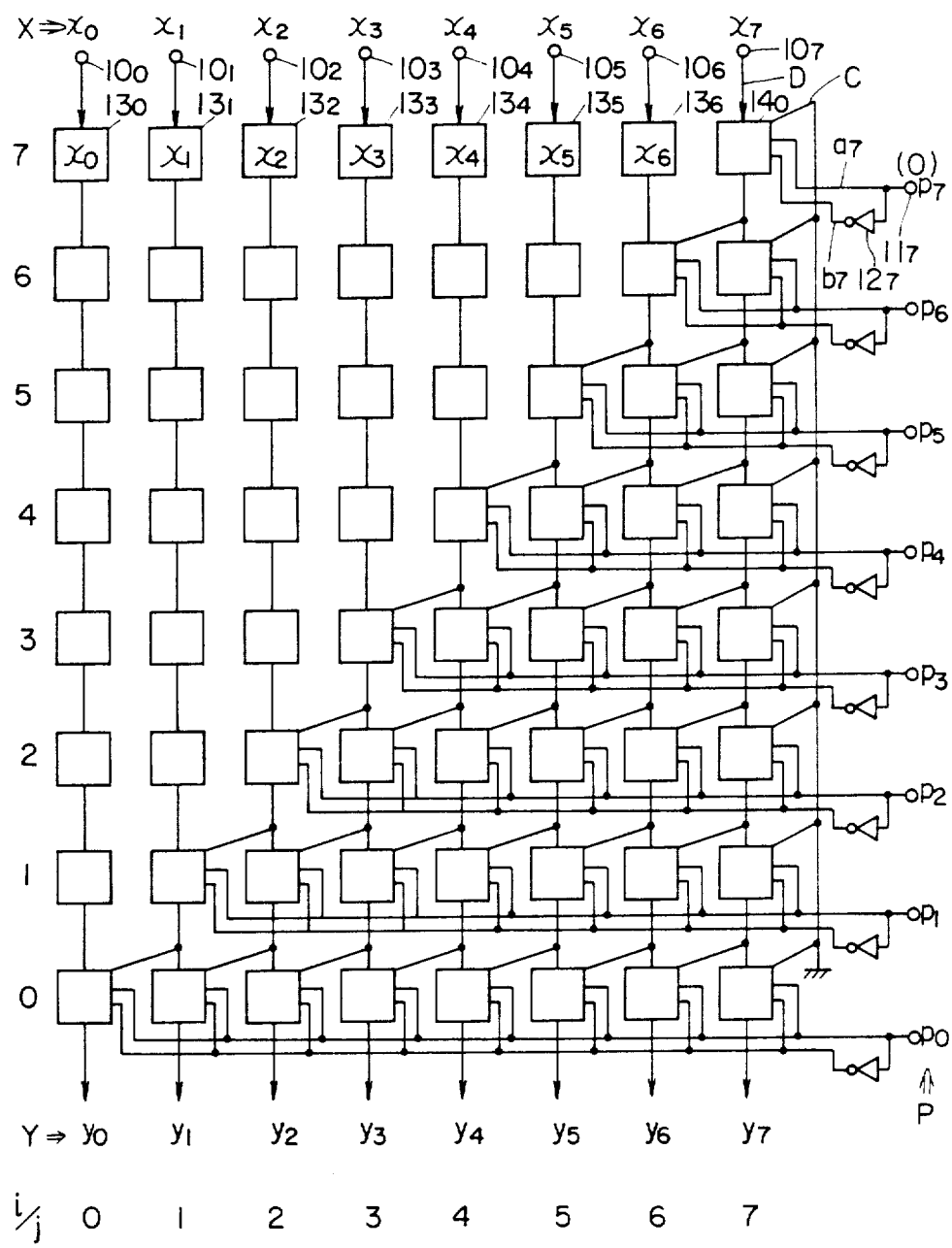
FIGS. 26A to 26H are wiring diagrams for illustrating operations of the data contracting circuit shown in FIG. 23.

Firstly referring to FIG. 26A, the original image data $x_0, x_1, \ldots, x_7$ are supplied to the data transmitting means $13_0, 13_1, \ldots, 13_6$ and the data selecting means $14_0$ through the data input terminals $10_0, 10_1, \ldots, 10_7$. Since the data selecting means $14_0$ is supplied with the control signals $(a_7, b_7)=(0, 1)$ through the control signal input terminal $11_7$ at that time point, the data selecting means $14_0$ selects as the input data the data on the line C while discarding the original image data bit $x_7$.

Figure 26B:
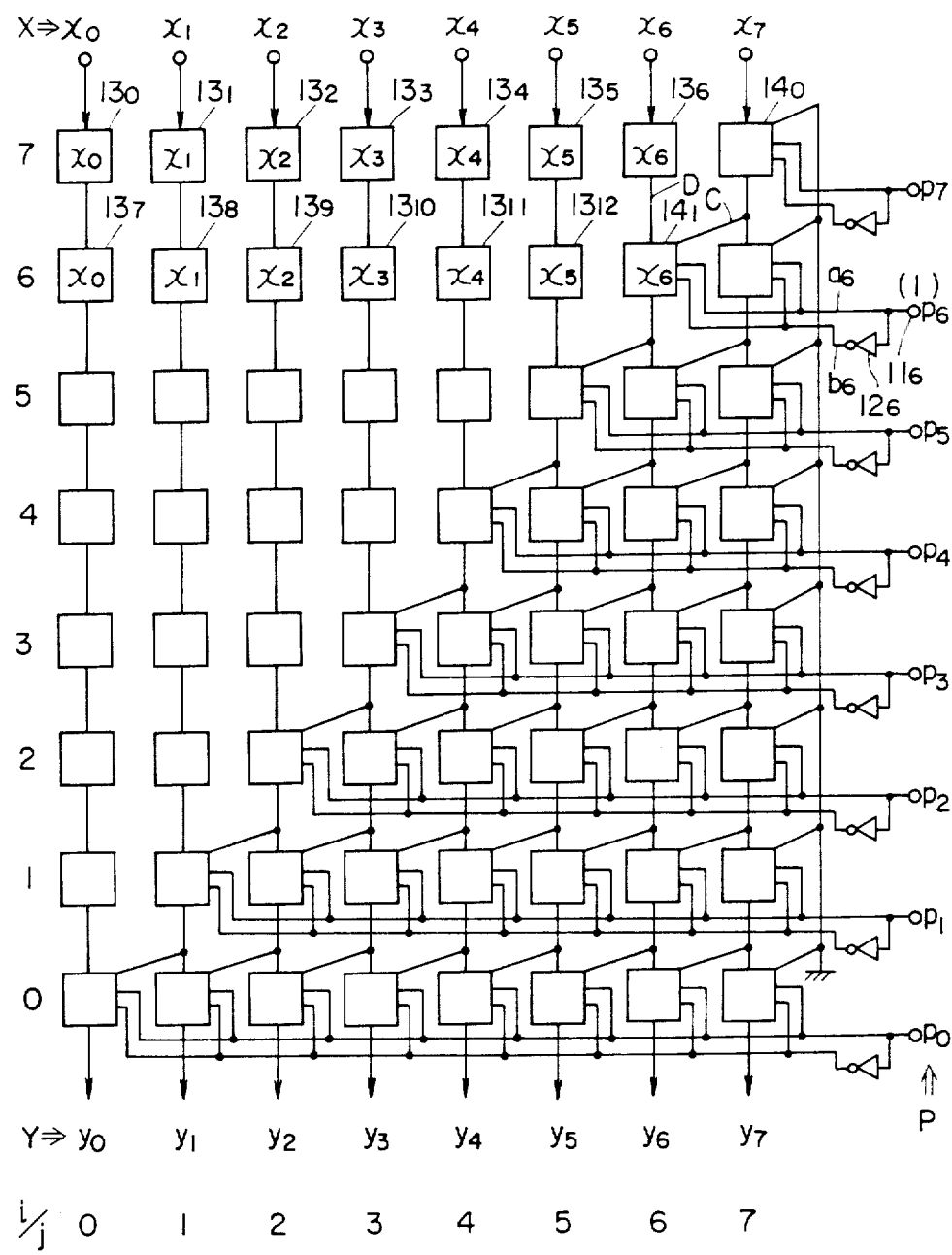

Next referring to FIG. 26B, the original image data bits $x_0, \ldots, x_5$ located at the data transmitting means $13_0, 13_1, \ldots, 13_5$ are sent to the data transmitting means $13_7, 13_8, \ldots, 13_{12}$. On the other hand, the control signal $(a_6, b_6)=(1, 0)$ are applied to the data selecting means $14_1$ through the control signal input terminal $11_6$, and as a result, the data on the line D are selected, which means that the orginal image data bit $x_6$ is inputted.

Figure 26C:
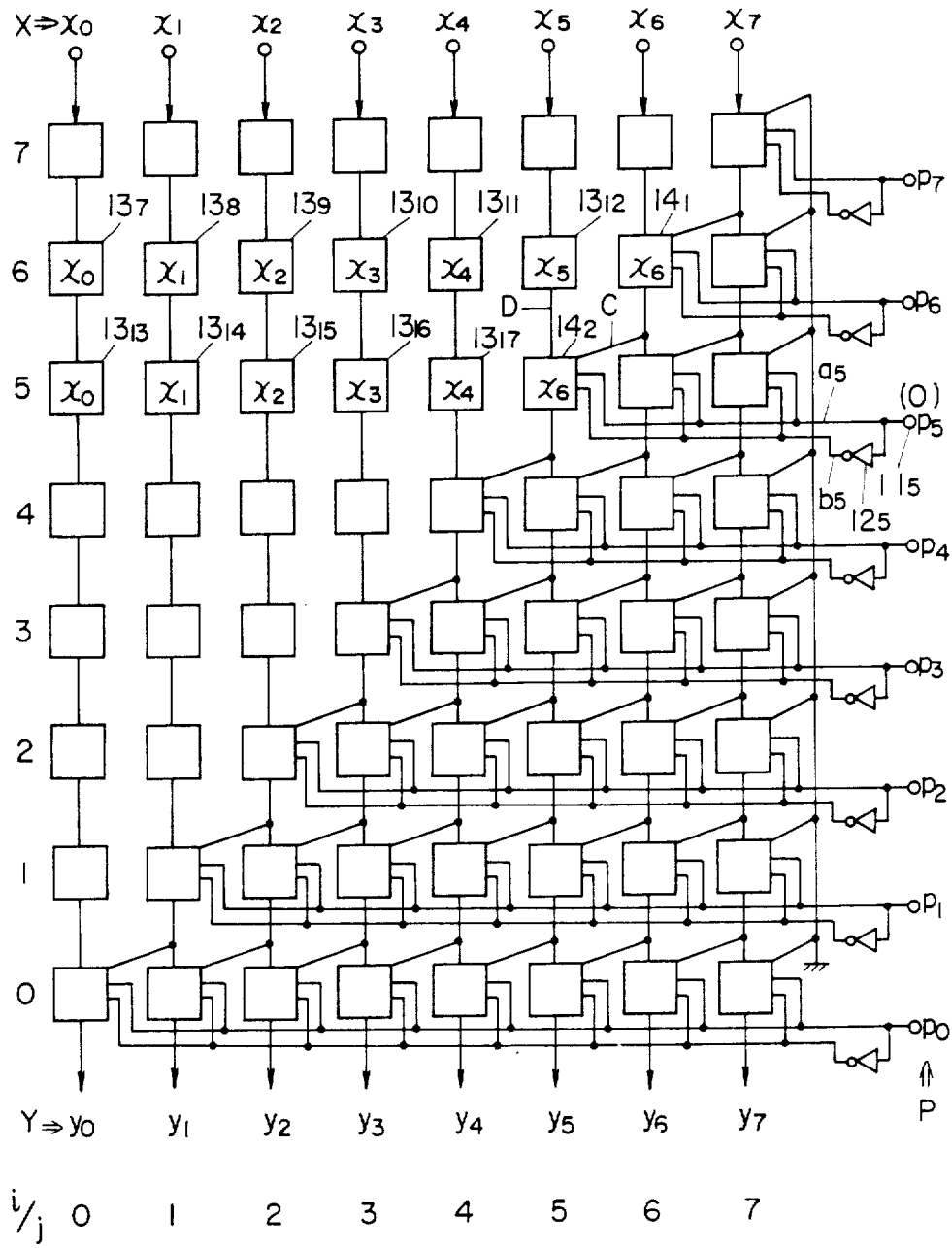

Referring to FIG. 26C, the original image data $x_0, x_1, \ldots, x_4$ present at the data transmitting means $13_7, 13_8, \ldots, 13_{11}$ are sent out to the data transmitting means $13_{13}, 13_{14}, \ldots, 13_{17}$. On the other hand, the control signals $(a_5, b_5)=(0, 1)$ are applied to the data selecting means $14_2$ through the control signal input terminal $11_5$, whereby the data on the line C is selected, and, as a result the original image data bit $x_6$ is inputted to the data selecting means $14_2$.

Figure 26D:
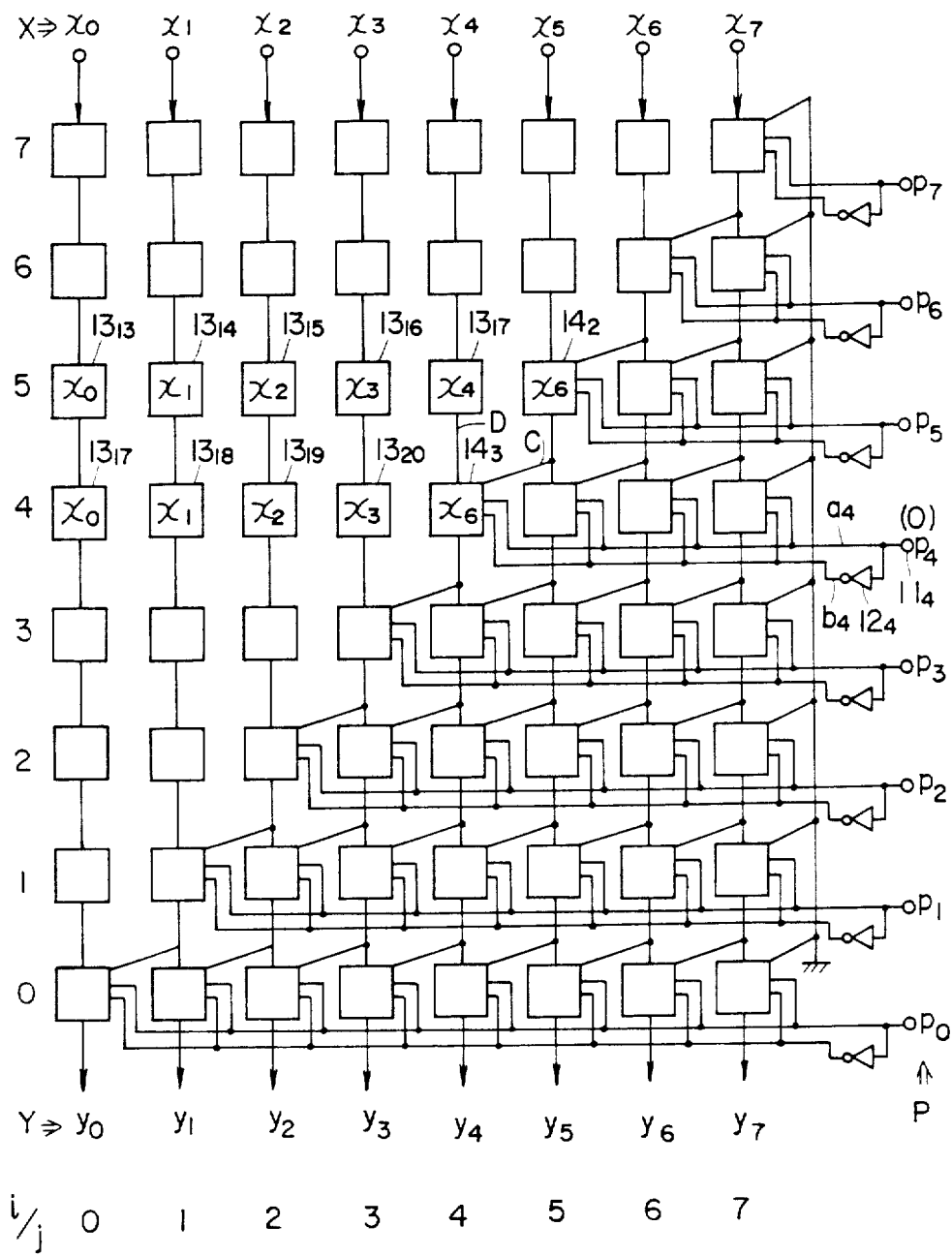

Next referring to FIG. 26D, the original image data $x_0, x_1, \ldots, x_3$ present on the data transmitting means $13_{13}, 13_{14}, \ldots, 13_{16}$ are sent out to the data transmitting means $13_{17}, 13_{18}, \ldots, 13_{20}$. On the other hand, the control signals $(a_4, b_4)=(0, 1)$ are applied to the data selecting means $14_3$ through the control input terminal $11_4$, and as a result the data on the line C is selected, thereby causing the original image data bit $x_6$ to be inputted.

Figure 26E:
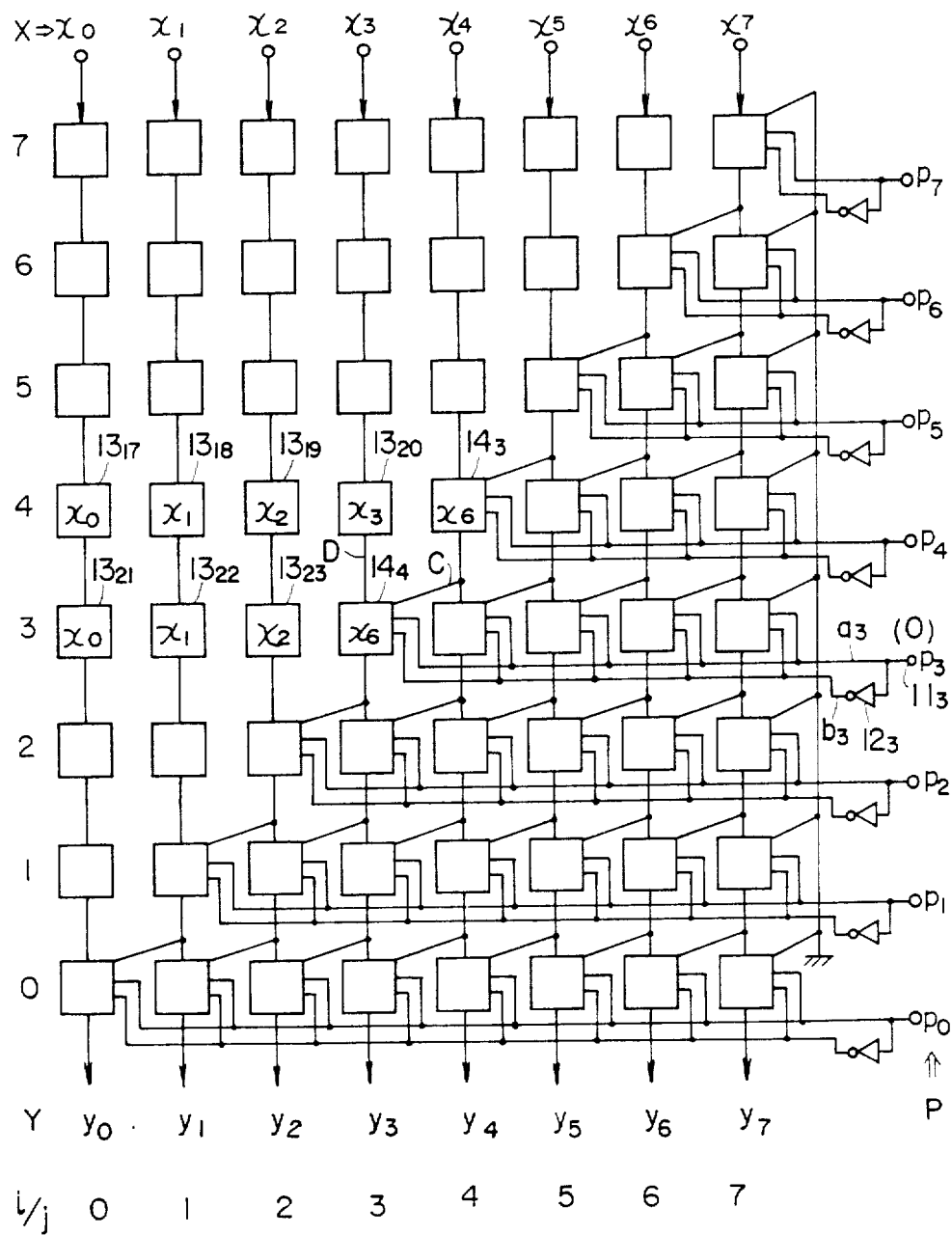

Referring to FIG. 26E, the original image data $x_0, x_1, x_2$ present at the data transmitting means $13_{17}, 13_{18}, 13_{19}$ are sent out to the data transmitting means $13_{21}, 13_{22}, 13_{23}$. On the other hand, the control signal $(a_3, b_3)=(0, 1)$ is applied to the data selecting means $14_4$ through the control signal input terminal $11_3$. As a consequence, the data on the line C is selected, thereby causing the original image data bit $x_6$ to be inputted.

Figure 26F:
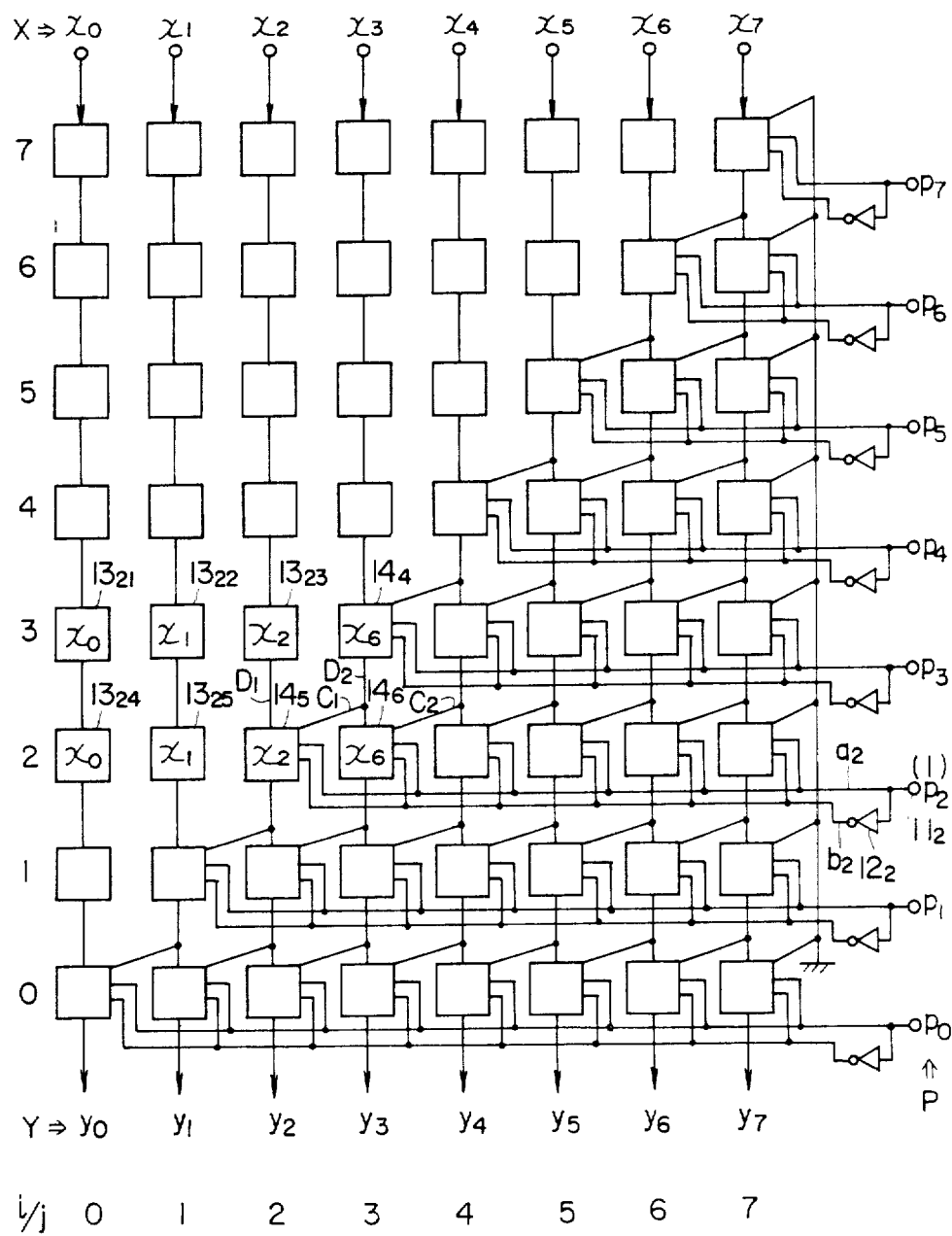

Next referring to FIG. 26F, the original image data $x_0$ and $x_1$ present at the data transmitting means $13_{21}$ and $13_{22}$ are sent out to the data transmitting means $13_{24}$ and $13_{25}$, respectively. At that time, the control signals $(a_2, b_2)=(1, 0)$ are applied to the data selecting means $14_5$ and $14_6$ through the control signal input terminal 11. Consequently, the data on the lines $D_1$ and $D_2$ are selected, thereby causing the original image data bits $x_2$ and $x_6$ to be inputted, respectively.

Figure 26G:
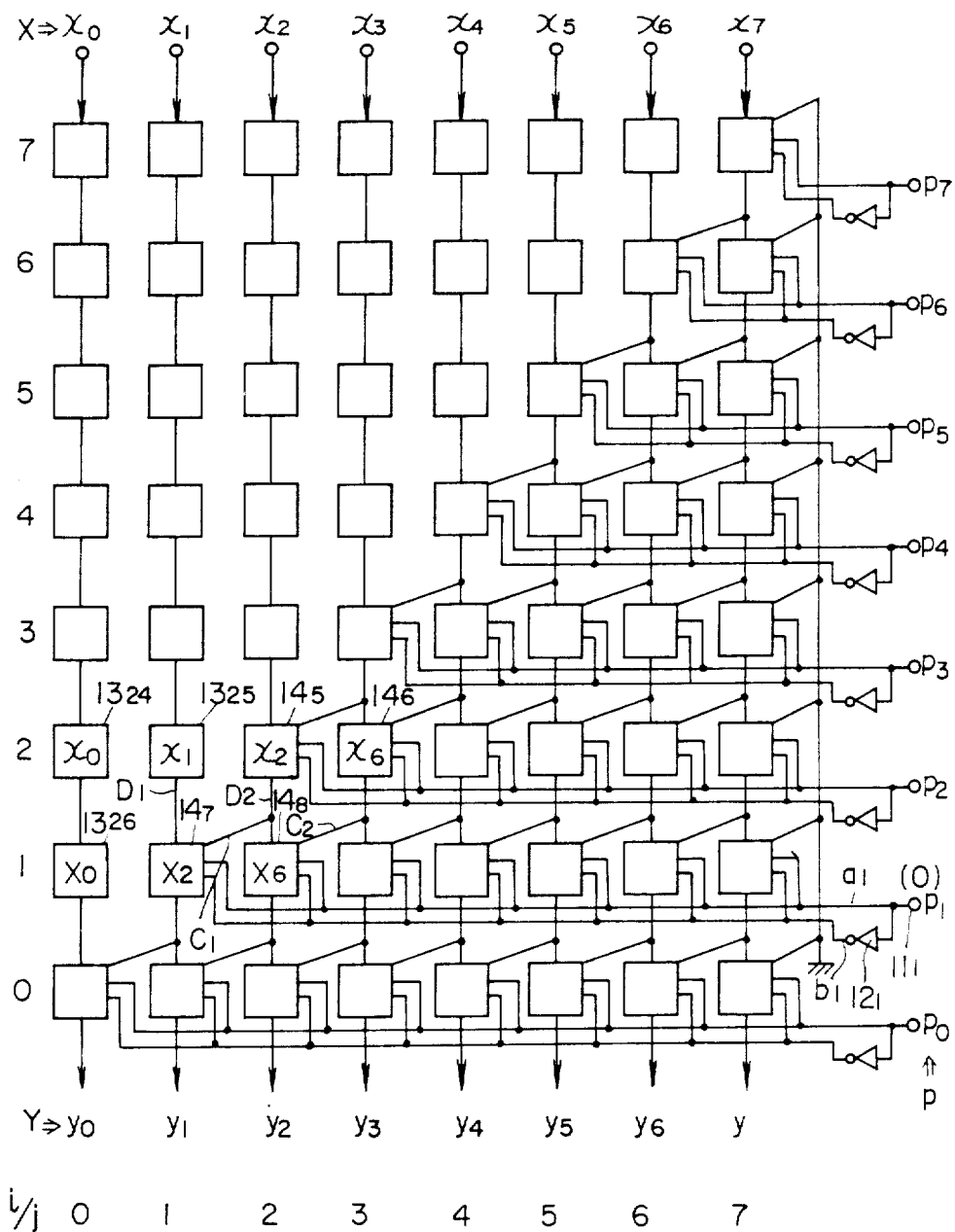

Referring to FIG. 26G, the original image data bit $x_0$ at the data transmitting means $13_{24}$ is sent out to the data transmitting means $13_{26}$. On the other hand, the control signals $(a_1, b_1)=(0, 1)$ are applied to the data selecting means $14_7$ and $14_8$ through the control signal input terminal $11_1$, whereby the data on the lines $C_1$ and $C_2$ are selected, thereby causing the original image data bits $x_2$ and $x_6$ to be inputted.

Figure 26H:
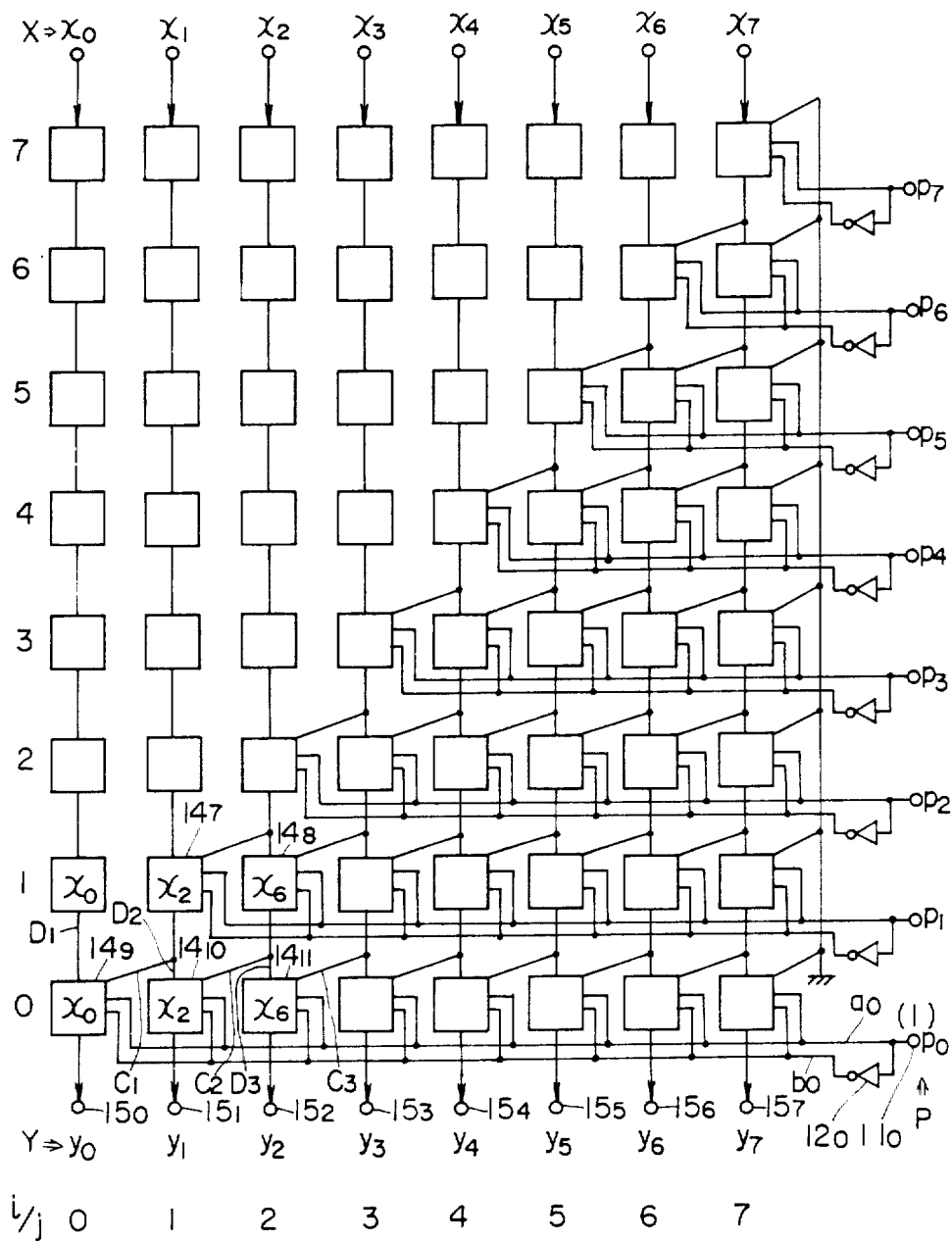

Referring to FIG. 26H, the data selecting means $14_9$, $14_{10}$ and $14_{11}$ are finally applied with the control signals $(a_0, b_0)=(1, 0)$ through the control signal input terminal $11_0$, and, as a result the data on the lines $D_1$, $D_2$ and $D_3$ are selected thereby causing the original image data $x_0$, $x_2$, $x_6$ to be inputted. By delivering the data from the data selecting means $14_9$, $14_{10}$ and $14_{11}$ as the final output, the contracted data Y can be obtained.

By virtue of the matrix-like array of the data transmitting means 13 and the data selecting means 14, data contraction can be carried out at a high speed without clocking. Further, due to the regular circuit configuration, the matrix circuit is suited for implementation in the form of LSI (large scale integrated circuit). Besides, merely by varying the control signal applied to the control signal input terminal 11, contracted data Y of other types can be produced easily.

Figure 27:
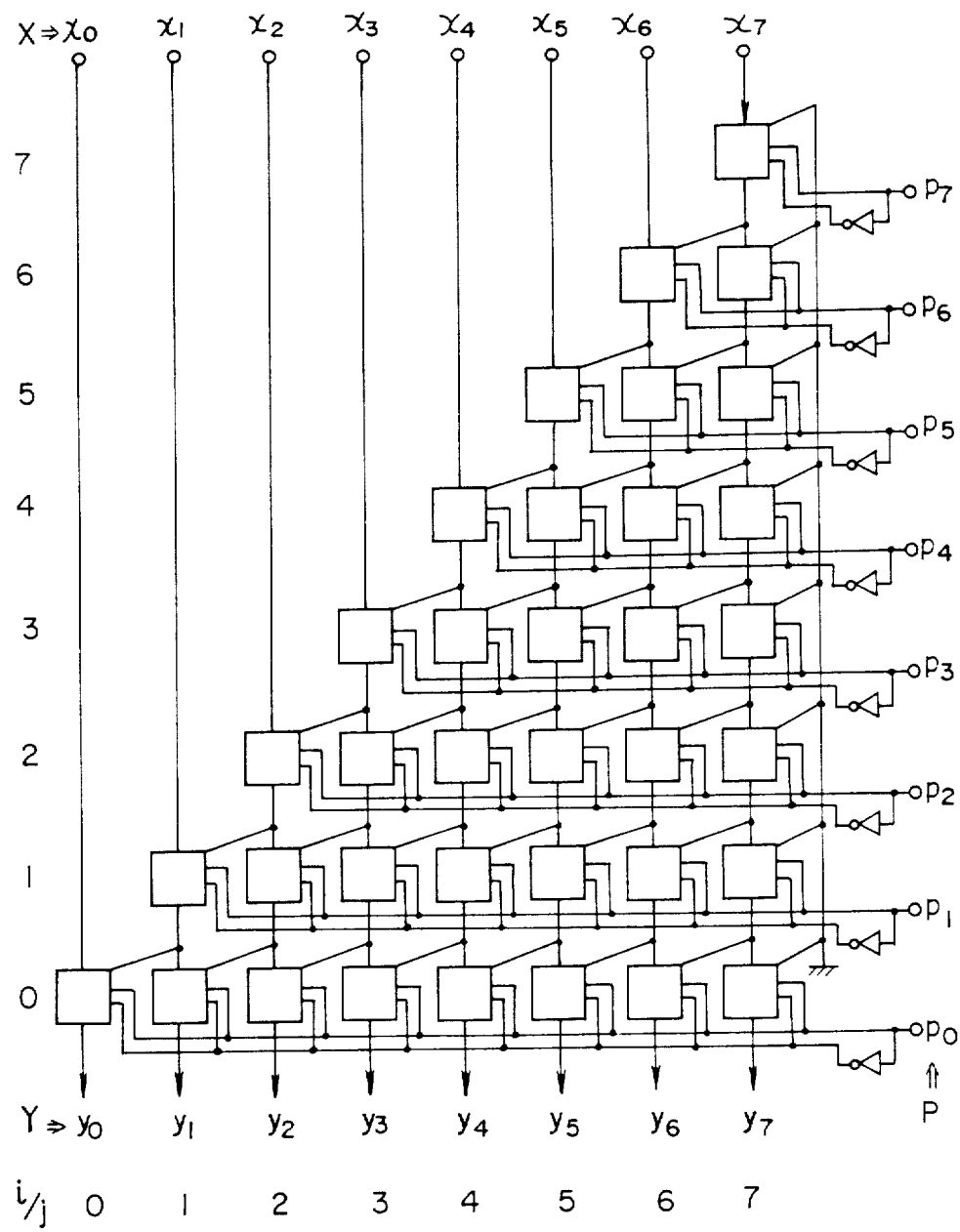
FIG. 27 is a wiring diagram of the data contracting circuit according to another embodiment of the invention.

Although the data transmitting means is assumed to be provided in the embodiment described above, this is only for convenience of illustration. Since the data transmitting means 13 may be replaced by simple signal lines, as noted earlier, the circuit shown in FIG. 24 may be modified to a configuration shown in FIG. 27.

The above description has been made on the assumption that the invention is applied to the processing of image data or information. It should however be appreciated that the other type of information can be processed according to the invention. Further, the invention can be applied to the sampling of information and the like processing.

Next, a data contracting method according to a fourth embodiment of the present invention will be described.

At first, it is assumed for convenience of elucidation that the original image data X include elements or bits $x_0, x_1, x_3, x_4, x_5, x_6, x_7$ and that the reference mask pattern P consists of 1, 0, 1, 0, 0, 0, 1, 0, as is illustrated in FIG. 28.

Further, individual elements of the matrix illustrated in FIG. 28 are represented by $M_{i,j}$ where i designates rows and j designates columns. Referring to FIG. 28, the original image data X are initially present at the row $i(=7)$ and shifted from the row i to the row (i−1) and so forth within the matrix, whereby the contracted image $Y=x_{01}, x_{2345}, x_{67}$ is obtained. Upon displacement from the row i to the row (i−1), elements located on the right side to the element $M_{i,j}$ (where i=j) are shifted to the left by one element, when the reference mask pattern $P_i$ is "0". At that time, the element $M_{i,j}$ (where i=j) is ORed with the element $M_{i,j-1}$. On the other hand, when the reference mask pattern $P_i$ is "1", all the elements present at that time on the row i are moved to the row (i−1). This operation is performed for each of the elements in the row down to lowermost row where i=0, whereby the contracted image data Y is derived as the output data from the matrix. The method described here differs from the one described with reference to FIG. 22 in that the logical sum is obtained. Here, the data bit $x_{01}$ denotes the result of an OR operation performed on the original image data bits $x_0$ and $x_1$.

The concept described above will be considered concretely by using actual values.

(1) At the row i (=7), $P_7$ is "0". Accordingly, the bit $x_7$ is ORed with $x_6$, and as a result the element $M_{6,6}$ includes $x_6+x_7$. Since the element $M_{7,8}$ is absent on the right side to the element $M_{7,7}$ in the instant illustrative example, the element $M_{6,7}$ is empty. Accordingly, the row i where i=6 consists of $x_0, x_1, x_2, x_3, x_4, x_5, x_6+x_7$.

(2) Since $P_6=1$ for the row i=6, all the elements of this row are transferred to the row i=5, which thus includes $x_0, x_1, x_2, x_3, x_4, x_5, x_6+x_7$.

(3) At the row i=5, $x_5$ is ORed with $x_4$ since $P_5=$"0", whereby all the elements located on the right side to the column j=5 are shifted to the left. Accordingly, the row i=4 includes $x_0, x_1, x_2, x_3, x_4, x_5, x_6+x_7$.

In the similar manner, processing is performed for the rows i where i=4 to 0, so that the output data $Y=x_0+x_1, x_2+x_3+x_4+x_5, x_6+x_7$ is derived from the matrix.

By assuming the presence of column j=8 including elements of "0", value empty elements of the matrix may be set to "0".

Next, a data contracting circuit for carrying out the above method will be described.

Figure 29:
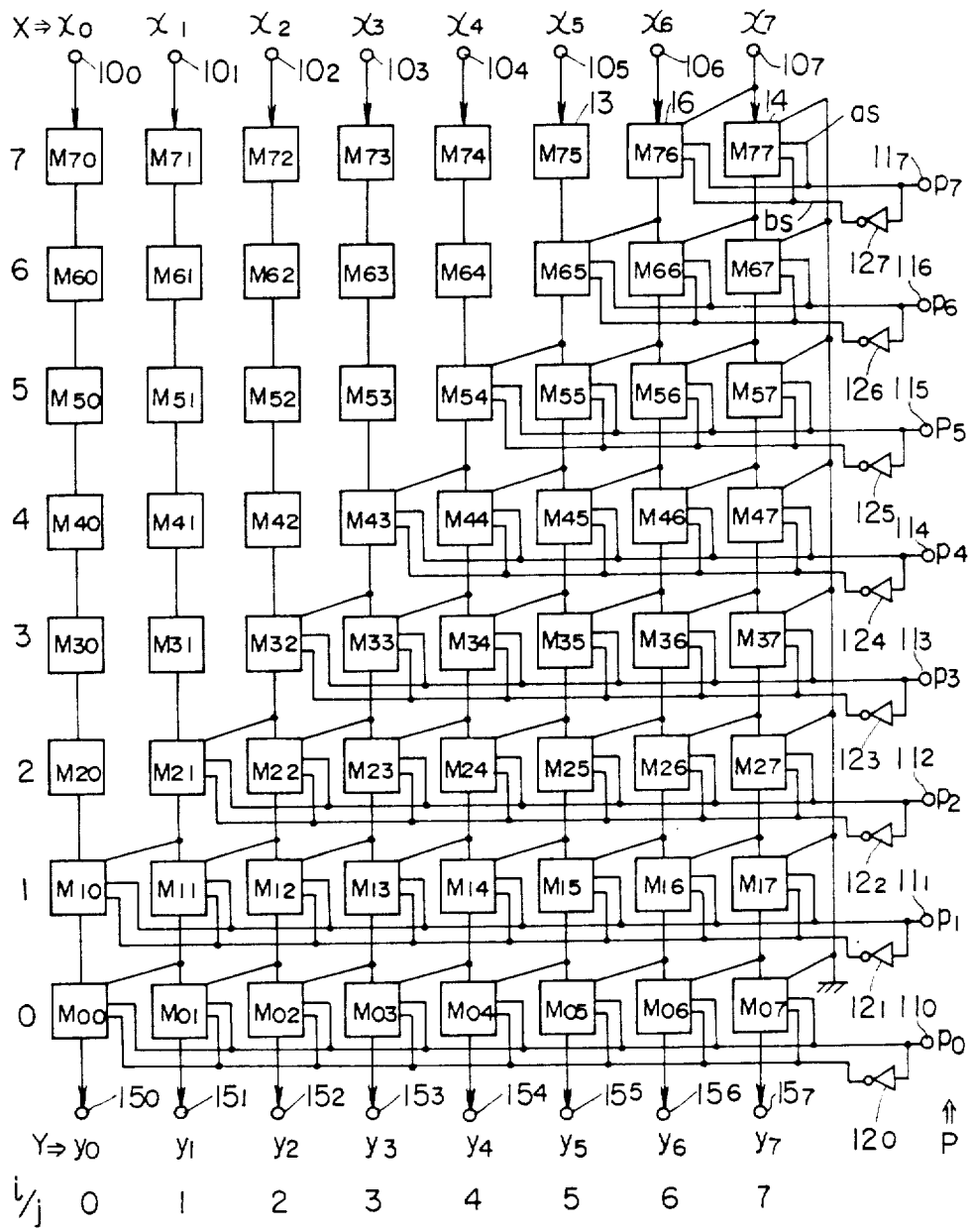
FIG. 29 is a wiring diagram of the data contracting circuit according to a still another embodiment of the invention.

FIG. 29 shows a wiring diagram of the data contracting circuit according to an exemplary embodiment of the invention.

Figure 30A:
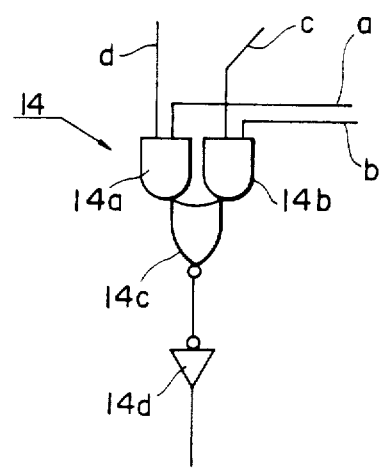
FIGS. 30A and 30B are circuit diagrams showing respectively the structure of the data selecting means employed in the circuit shown in FIG. 29.
Figure 30B:
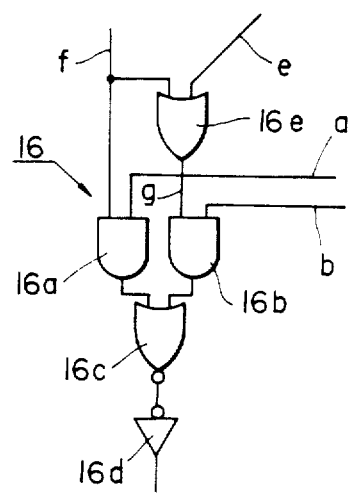

In FIG. 29, reference numerals $10_0$ to $10_7$ denote input terminals to which image data $x_0, \ldots, x_7$ to be contracted are applied reference numerals, $11_0$ to $11_7$ denote control input terminals to which binary control signals corresponding to the reference mask pattern (mapping pattern) $P_0, \ldots, P_7$ are applied, and numerals $12_0$ to $12_7$ denote inverters, respectively. Reference numeral 13 denotes data transmitting means each provided at the location of element $M_{k,l}$ (where k and l are both integers which satisfy the conditions of $2 \leq k \leq 7$ and $k-1 > l \geq 0$) of a matrix consisting of eight rows and eight columns. The data transmitting means may simply be signal lines and serve for transmitting the data incoming from the above to the elements located below. Numeral 14 denotes data selecting means provided at locations of the matrix elements $M_{s,t}$ (where s and t are both integers and satisfy the conditions that $0 \leq s \leq 7$ and $s \leq t$.). The data selecting means may be constituted by logical elements 14a, 14b, 14c and 14d in a manner illustrated in FIG. 30A and serves for selecting one of data located at the matrix element $M_{s+1, t+1}$ or the matrix element $M_{s+1, t}$ in dependence on the control signals $a_s$ and $b_s$ which correspond to the reference mask pattern $P_s$ supplied through the control signal input terminals $11_s$. It should however be noted that the data selecting means 14 provided at the row 7 of the matrix M serves only for determining whether the image data is to be discarded or not. Reference numeral 16 denotes data selecting means located at the position of the matrix element $M_{i,i-1}$ and serving for selecting either one of the logical sum of the data located at the matrix elements $M_{i+1,i}$ and $M_{i+1,i-1}$ or the data located at the matrix element $M_{i+1,i-1}$ in dependence on the control signals $a_i$ and $b_i$ which correspond to the reference mask pattern $P_i$ supplied through the control input terminal $11_i$. This data selecting means 16 is composed of logical elements 16a, 16b, 16c, 16d and 16e connected in the manner illustrated in FIG. 30B. The data selecting means 16 differs from the data selecting means 14 in that a logical sum of the data d and c is inputted in place of the data c. Reference numerals $15_0$ to $15_7$ denote output terminals through which the contracted data Y are obtained.

The construction and operation of the data selecting means 14 and 16 will be described in detail by referring to FIG. 31.

Figure 31:
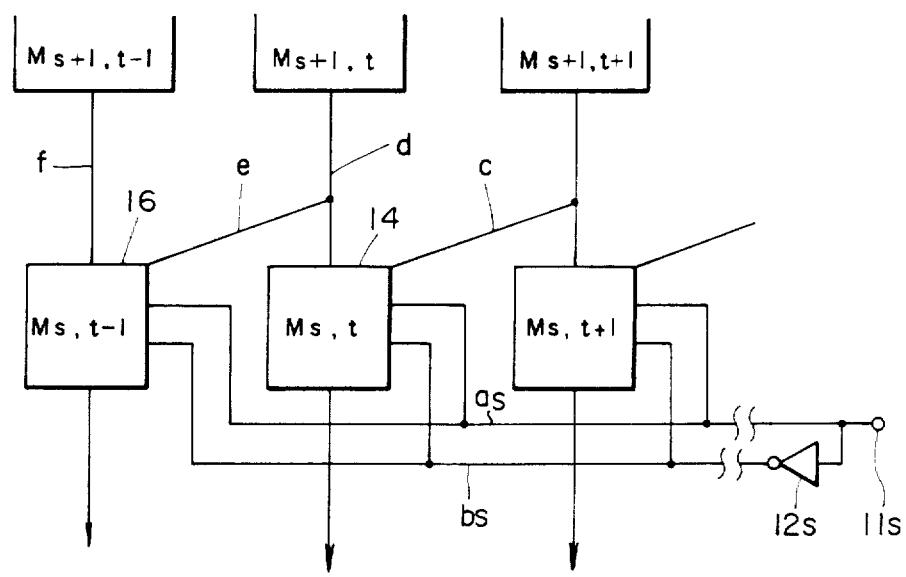
FIG. 31 is a wiring diagram of the data selecting means shown in FIGS. 30A and 30B.

As will be seen in FIG. 31, the data selecting means 14 is so arranged that the data c present at the matrix element $M_{s+1,t+1}$ is inputted when the control signal $a_s$ supplied through the control input terminal $11_s$ is "0" and the control signal $b_s$ is "1", i.e. when $(a_s, b_s)=(0, 1)$, while the data selecting means 16 inputs the logical sum of the data e and f located at $M_{s+1,t}$ and $M_{s+1,t-1}$, respectively. On the other hand, the data d present at the matrix element $M_{s+1,t}$ is selected by the data selecting means 14 as the input when the control signals $a_s$ and $b_s$ are "1" and "0", respectively, that is, when $(a_s, b_s)=(1, 0)$, while the data selecting means 16 selects as the input the data f located at the matrix element $M_{s+1,t-1}$.

With the arrangement of the matrix circuit mentioned abve, operations are performed in the manner described below in detail.

It is again assumed that the reference mask pattern values $P_i(i=0, 1, \ldots, 7)$ 1, 0, 1, 0, 0, 0, 1, 0 and the contracted data derived finally are represented by $x_0+x_1$, $x_2+x_3+x_4+x_5$, $x_6+x_7$, as described hereinbefore in conjunction with FIG. 28.

Figure 32A:
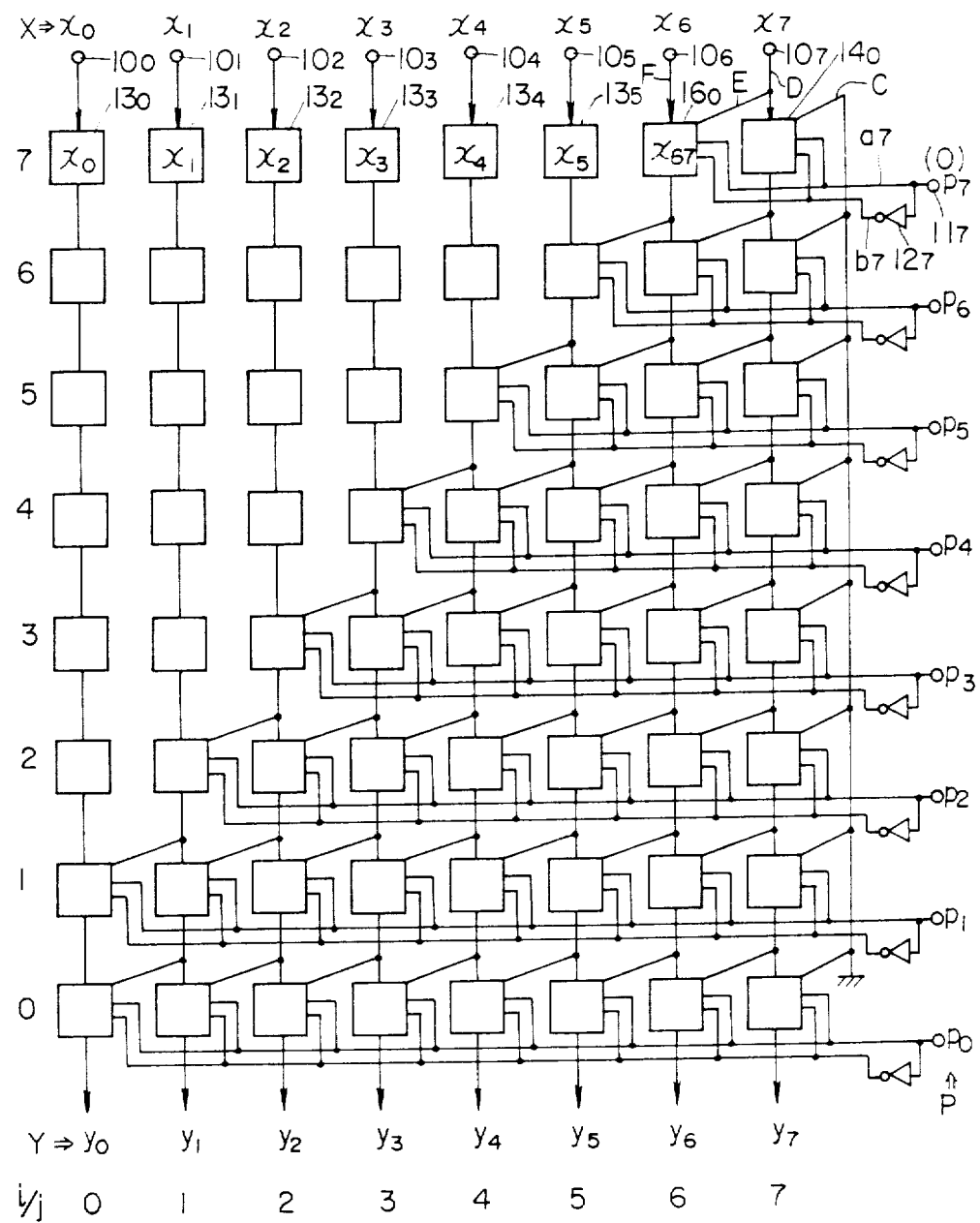
FIGS. 32A to 32H are wiring diagrams for illustrating operations of the data contracting circuit shown in FIG. 29.

Firstly referring to FIG. 32A, the original image data $x_0, x_1, \ldots, x_7$ are supplied to the data transmitting means $13_0, 13_1, \ldots, 13_5$ and the data selecting means $16_0$ and $14_0$ through the data input terminals $10_0, 10_1, \ldots, 10_7$. Since the data selecting means $14_0$ is supplied with the control signals $(a_7, b_7)=(0, 1)$ through the control signal input terminal $11_7$ at that time point, the data selecting means $14_0$ selects as the input data the data on the line C, while the data selecting means $16_0$ selects the logical sum $x_{67}=x_6+x_7$ of respective signals on the lines E and F. (Hereinafter, a logical sum of data $x_1, x_2, \ldots, x_i$ will be described as $x_{12\ldots i}$.)

Figure 32B:
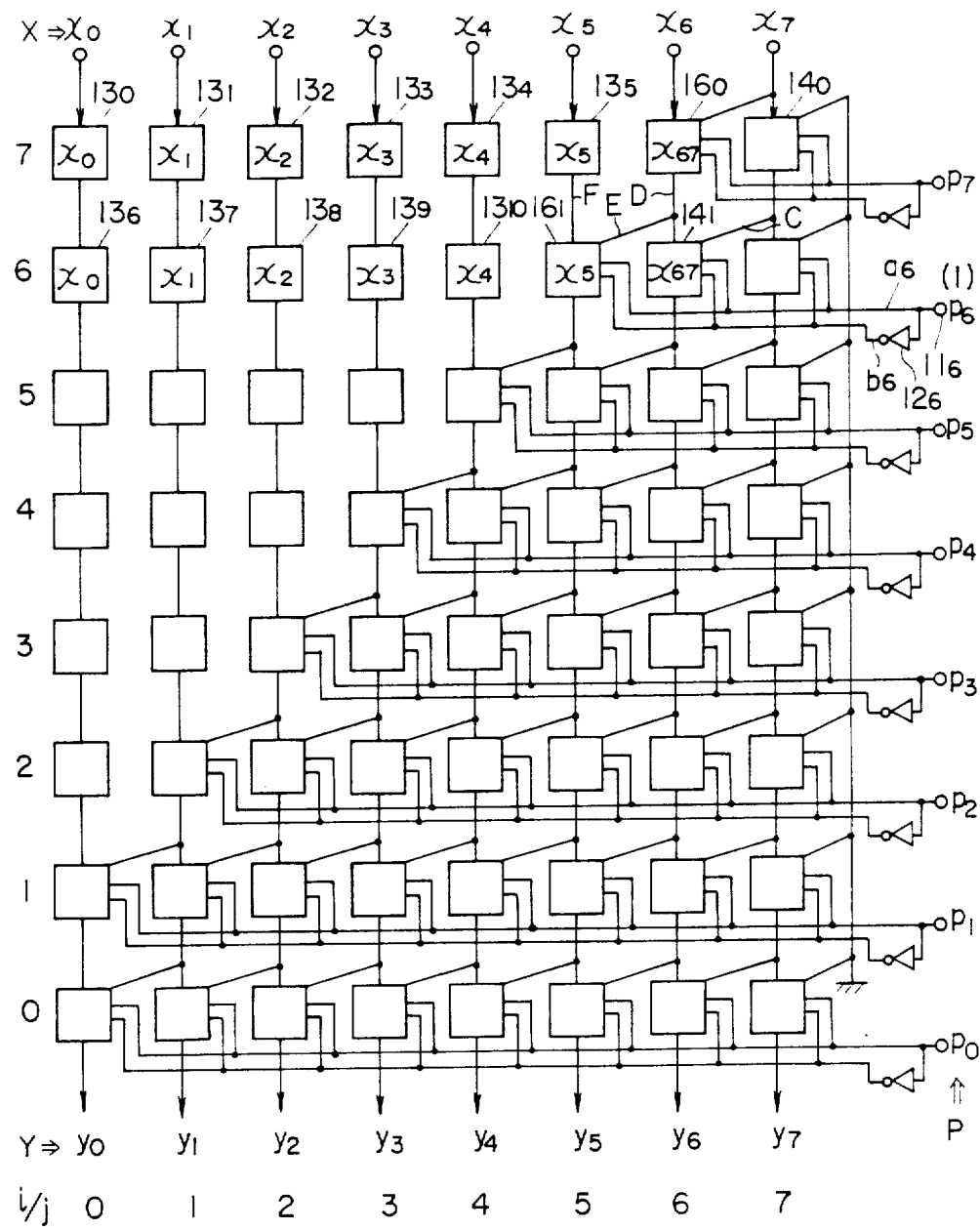
Figure 32:
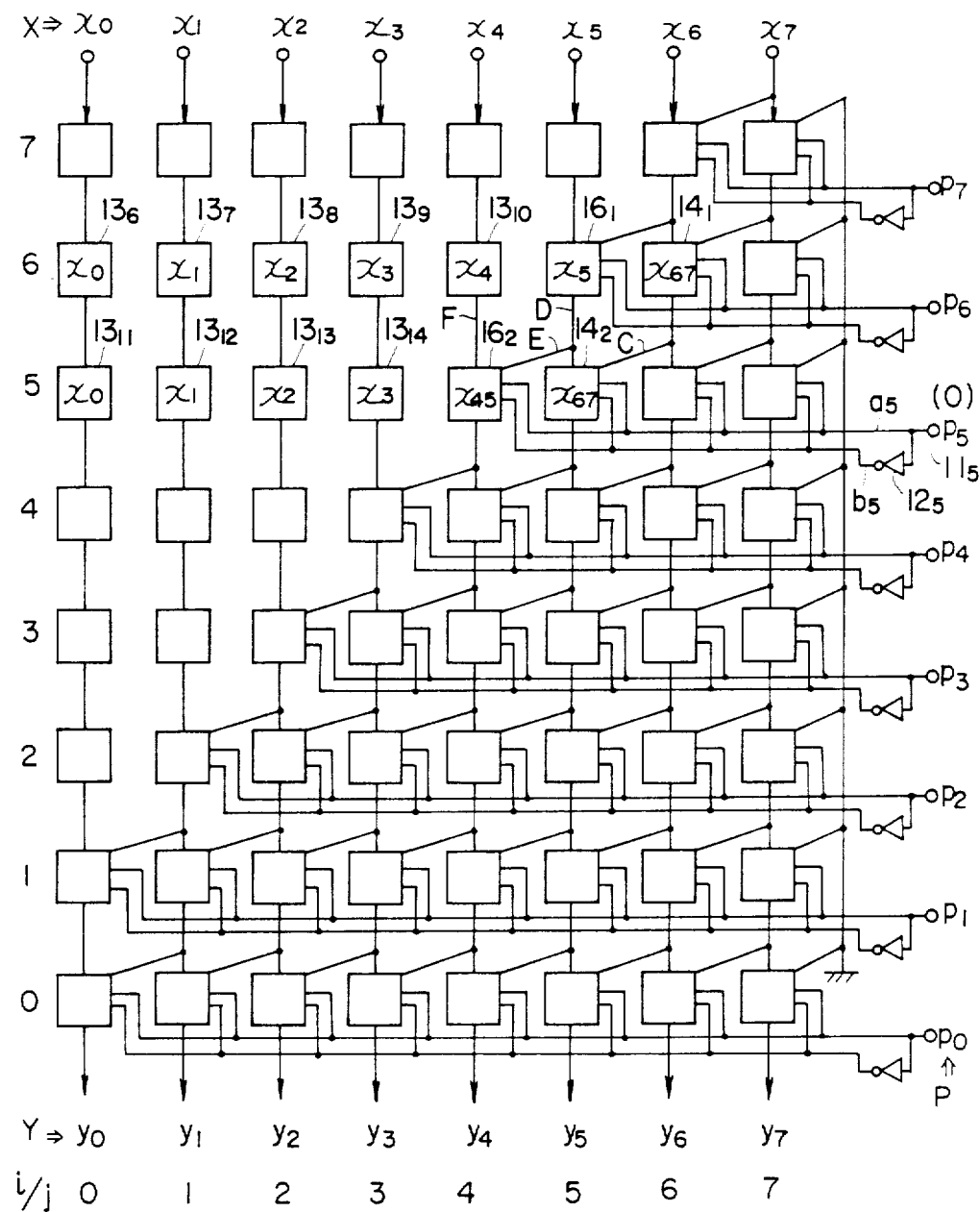

Next referring to FIG. 32B, the original image data bits $x_0, \ldots, x_4$ located at the data transmitting means $13_0, 13_1, \ldots, 13_4$ are sent to the data transmitting means $13_6, 13_7, \ldots, 13_{10}$. On the other hand, the control signals $(a_6, b_6)=(1, 0)$ are applied to the data selecting means $14_1$ and $16_1$ by way of the control signal input terminal $11_6$, as the result of which the data on the line D is selected by the data selecting means $14_1$, which means that the original image data $x_{67}$ is inputted to the data selecting means $14_1$, while the data selecting means $16_1$ selects as the input the data bit $x_5$ on the line F.

Referring to FIG. 32C, the original image data $x_0, x_1, x_2, x_3$ present at the data transmitting means $13_6, 13_7, 13_8, 13_9$ are sent out to the data transmitting means $13_{11}, 13_{12}, 13_{13}, 13_{14}$. On the other hand, since the control signals $(a_5, b_5)=(0, 1)$ are applied to the data selecting means $14_2$ through the control signal input terminal $11_5$, the data selecting means $14_2$ selects the original image data $x_{67}$ on the line C, while the data selecting means $16_2$ selects the logical sum $x_{45}$ of the signals on the lines E and F.

Figure 32D:
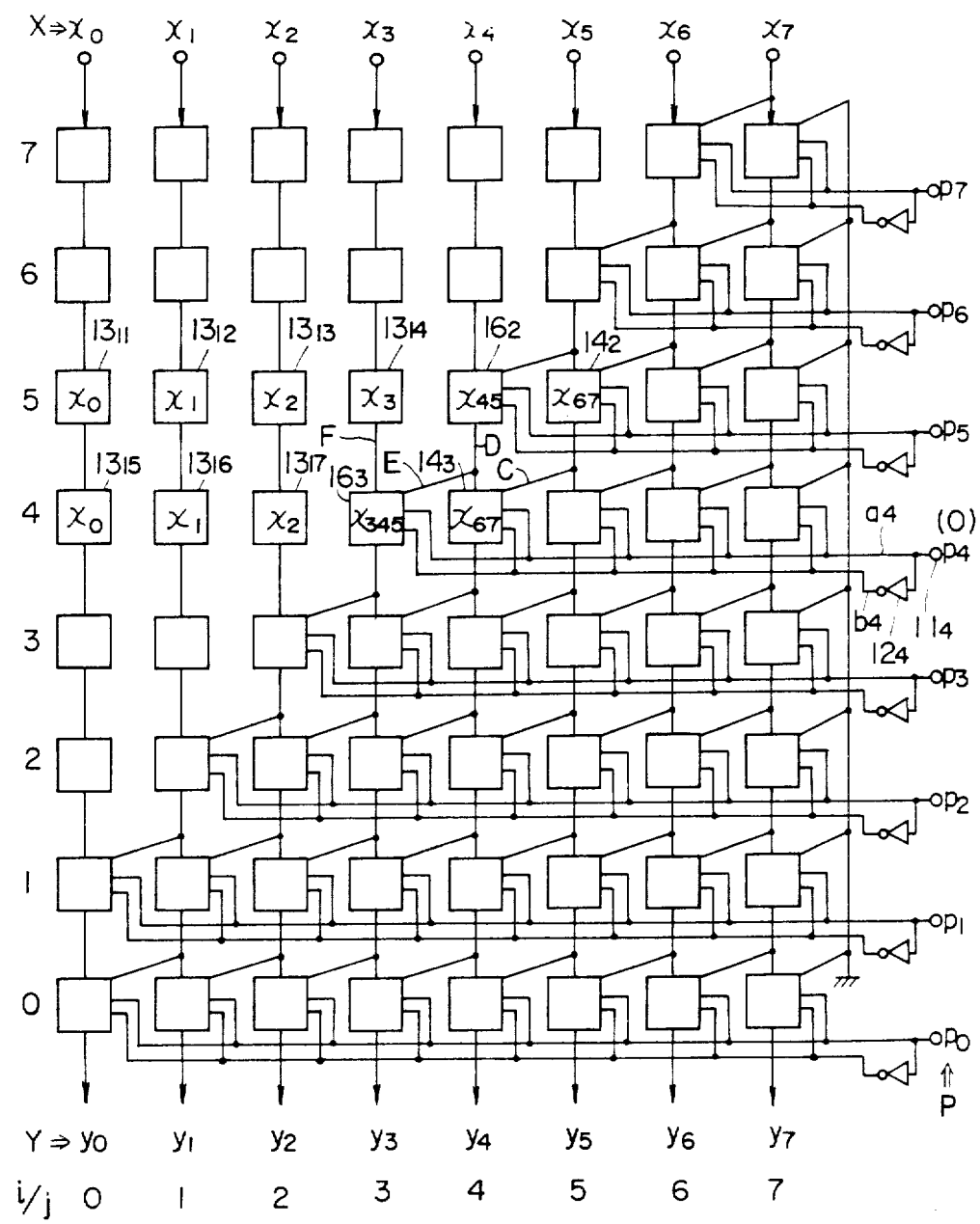

Next referring to FIG. 32D, the original image data $x_0, x_1, x_2$ present on the data transmitting means $13_{11}, 13_{12}, 13_{13}$ are sent out to the data transmitting means $13_{15}, 13_{16}, 13_{17}$. On the other hand, the control signals $(a_4, b_4)=(0, 1)$ are applied to the data selecting means $14_3$, $16_3$ through the control input terminal $11_4$, and as a result the data on the line C is selected by the data selecting means $14_3$, allowing the original image data bit $x_{67}$ to be inputted, while the data selecting means $16_3$ selects the logical sum $x_{345}$ of the signals on the lines E and F.

Figure 32E:
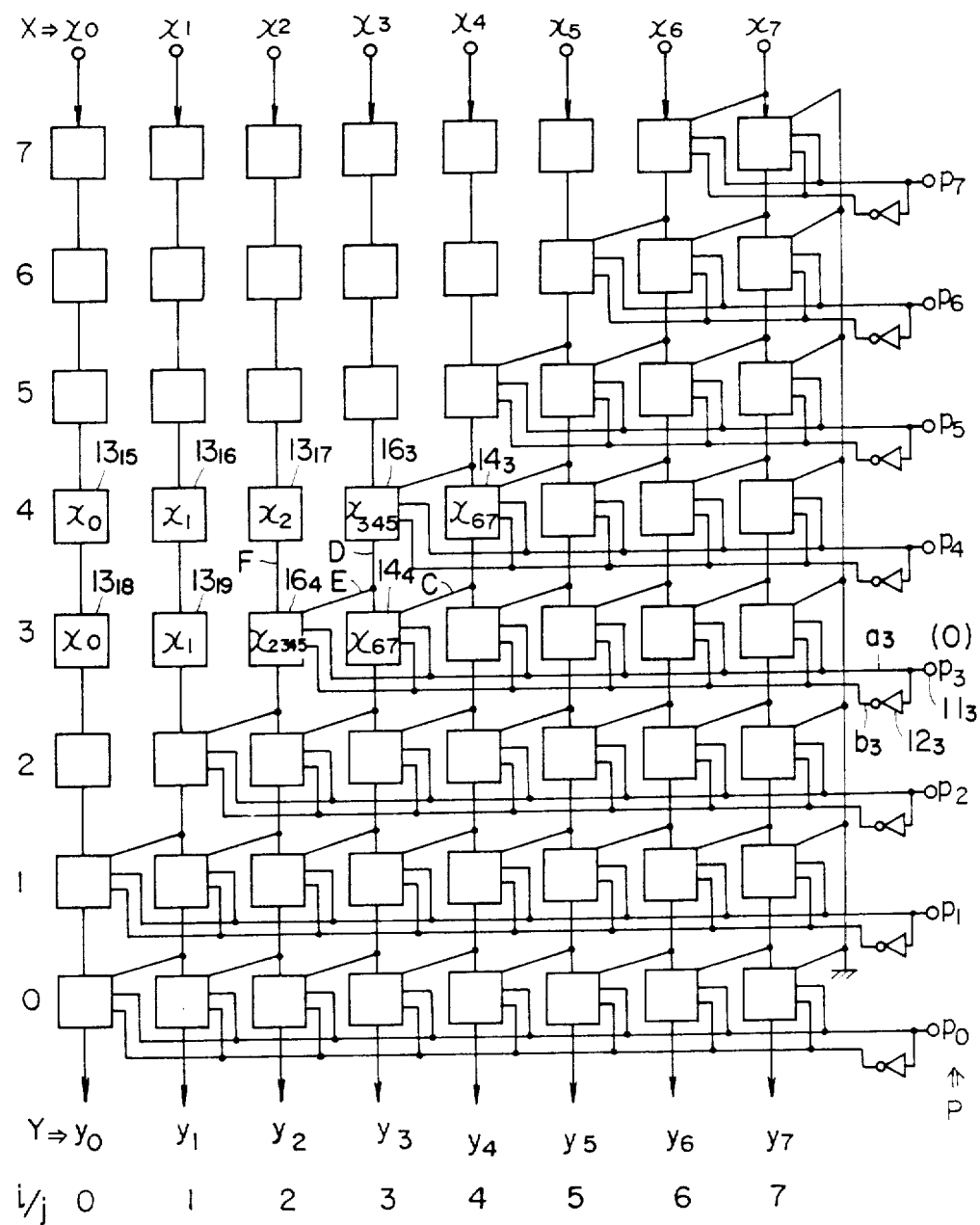

Referring to FIG. 32E, the original image data information $x_0, x_1$ present at the data transmitting means $13_{15}$ and $13_{16}$ are sent out to the data transmitting means $13_{18}$ and $13_{19}$. On the other hand, the control signals $(a_3, b_3)=(0, 1)$ are applied through the control signal input terminal $11_3$. As a consequence, the data on the line C is selected by the data selecting means $14_4$, allowing the original image data bit $x_{67}$ to be inputted, while the data selecting means $16_4$ selects the logical sum $x_{2345}$ of the signals on the lines E and F.

Figure 32F:
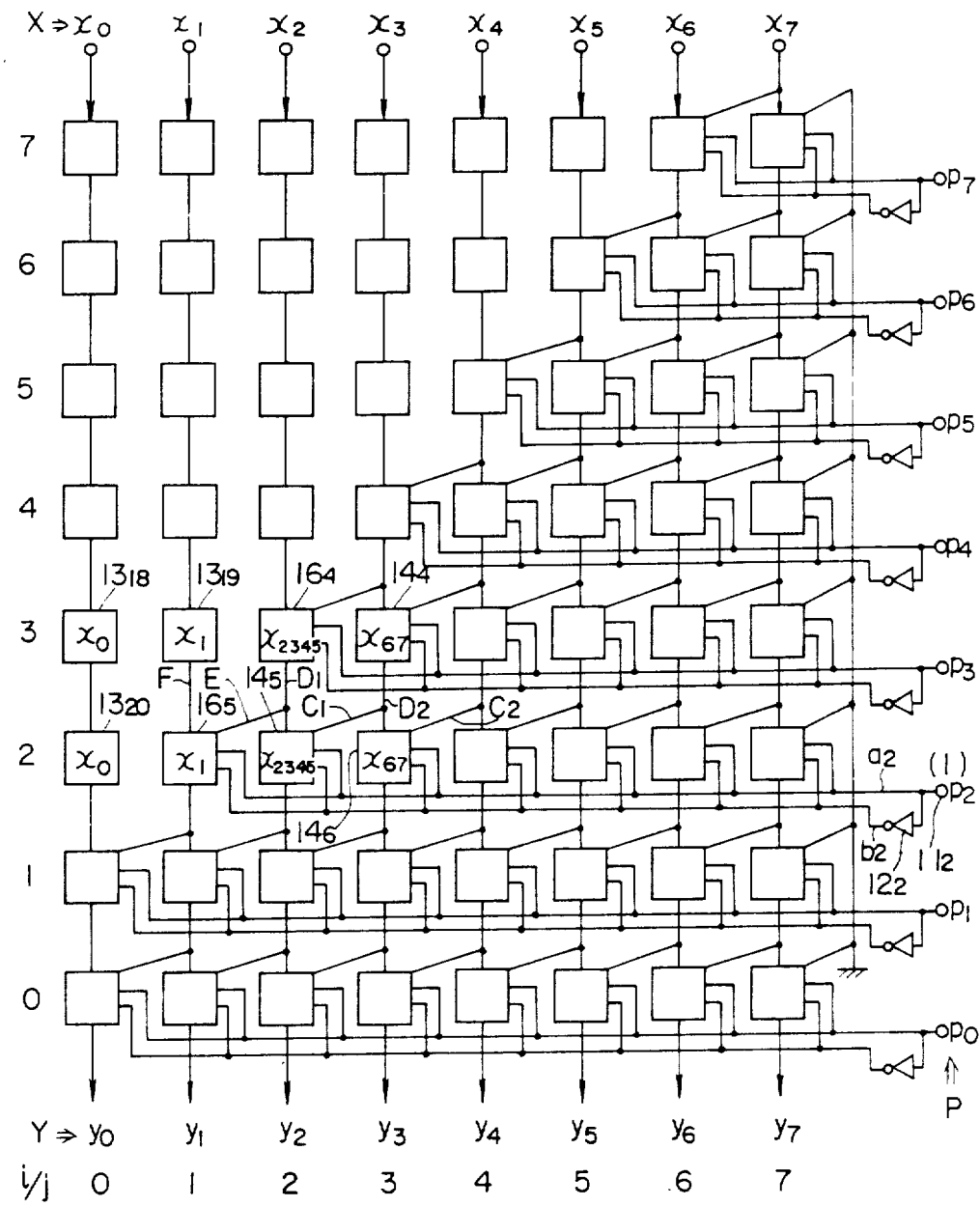

Next referring to FIG. 32F, the original image data $x_0$ present at the data transmitting means $13_{18}$ are sent out to the data transmitting means $13_{20}$. At that time, the control signals $(a_2, b_2)=(1, 0)$ are applied to the data selecting means $14_5$, $14_6$ and $16_5$ by way of the control signal input terminal 11. Consequently, the data on the lines $D_1$ and $D_2$ are selected by the data selecting means $14_5$ and $15_6$, thereby allowing the original image data bits $x_{2345}$ and $x_{67}$ to be inputted, respectively, while the data selecting means $16_5$ selects the data on the line F, allowing the original image data $x_1$ to be inputted.

Figure 32G:
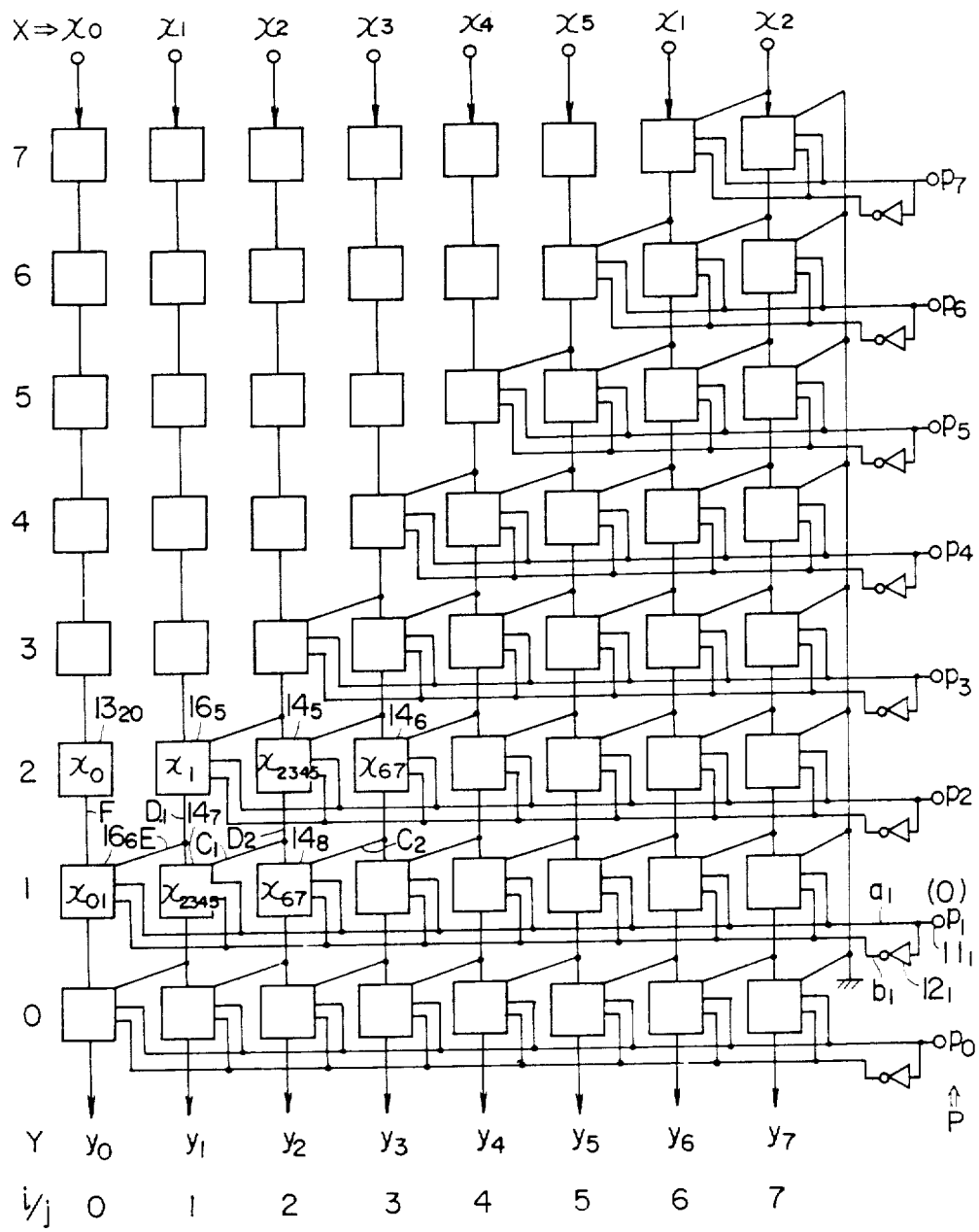

Referring to FIG. 32G, the control signals $(a_1, b_1)=(0, 1)$ are applied to the data selecting means $14_7$, $14_8$ and $16_6$ through the control signal input terminal $11_1$, whereby the data on the lines $C_1$ and $C_2$ are selected by the selecting means $14_7$ and $14_8$, allowing the original image data bits $x_{2345}$ and $x_{67}$ to be inputted, while the data selecting means $16_6$ selects the logical sum $x_{01}$ of the data on the lines E and F.

Figure 32H:
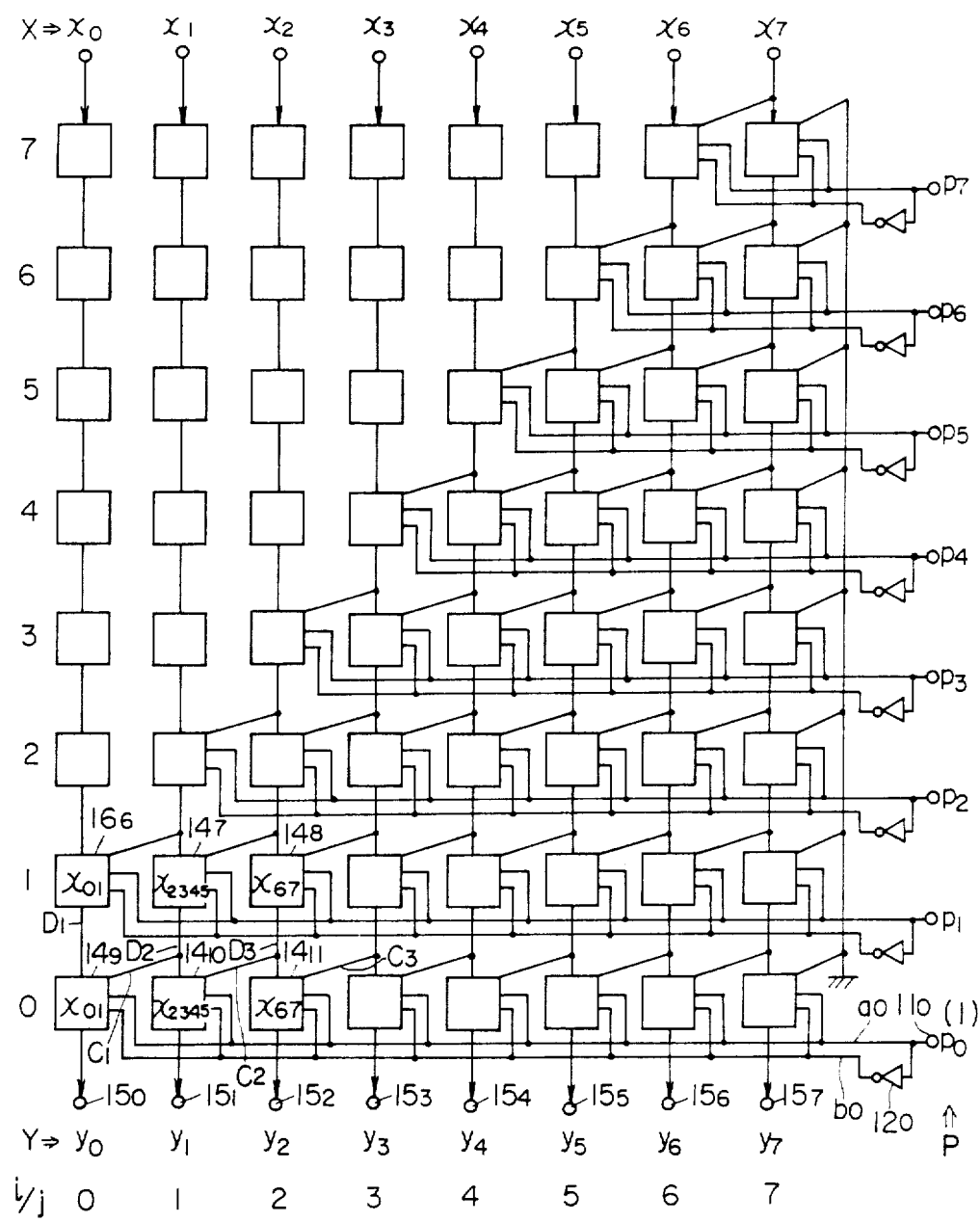

Referring to FIG. 32H, the data selecting means $14_9$, $14_{10}$ and $14_{11}$ are finally supplied with the control signals $(a_0, b_0)=(1, 0)$ through the control signal input terminal $11_0$, and as a result the data on the lines $D_1$, $D_2$ and $D_3$ are selected to allow the original image data $x_{01}$, $x_{2345}$ and $x_{67}$ to be outputted. By deriving the data through the data selecting means $14_9$, $14_{10}$ and $14_{11}$ as the final output, the contracted data Y can be obtained.

By virtue of the matrix-like array of the data transmitting means 13 and the data selecting means 14 and 16, data contraction can be carried out at a high speed without requiring clocking. Further, due to the regular circuit configuration, the matrix circuit is suited for implementation in the form of LSI. Further, by deriving the logical sum of the adjacent data upon contraction of the original image data, the logic "1" data will not disappear. Accordingly, the frame of table prepared by the logic "1" bits is not erased by the data contraction. Besides, merely by varying the control signal applied to the control signal input terminal 11, contracted data Y of other types can be produced easily.

Figure 33:
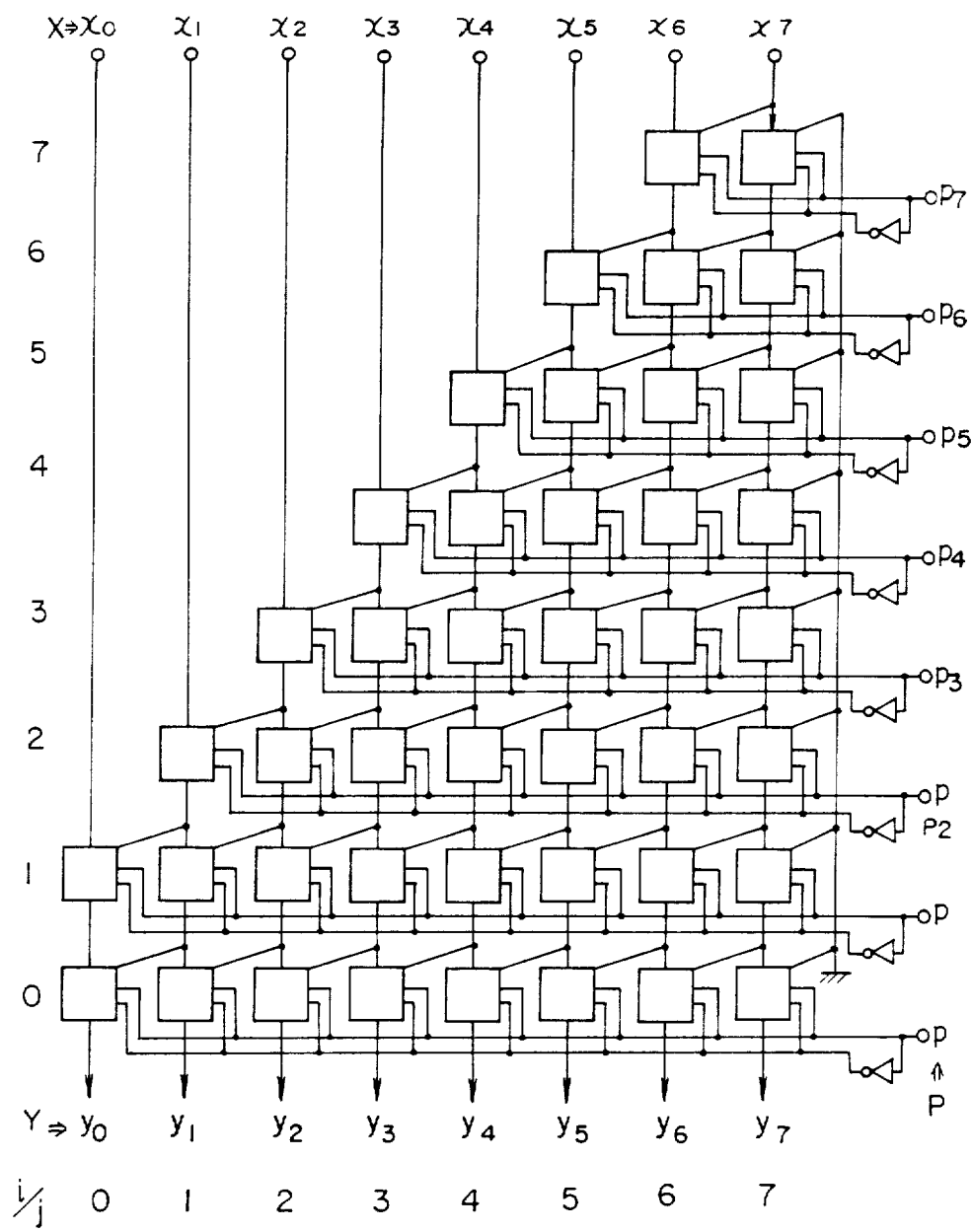
FIG. 33 is a wiring diagram showing the data contracting circuit according to a further embodiment of the invention.

Although the data transmitting means are assumed to be provided in the embodiment described above, this is only for convenience of illustration. Since the data transmitting means 13 may be replaced by simple signal lines, as described earlier, the circuit shown in FIG. 29 may be modified to a configuration shown in FIG. 33.

Although the OR-function is adopted as the arithmetic operation for the data contraction, other logical functions may be adopted. Further, although the above description has been made on the assumption that the invention is applied to the processing of image data or information, it will be apparent that other types of information can be processed according to the teaching of the invention. Moreover, the invention can be applied to the sampling of information and the like processing.

Next, a data expanding method according to a fifth embodiment of the present invention will be described.

Figure 34:
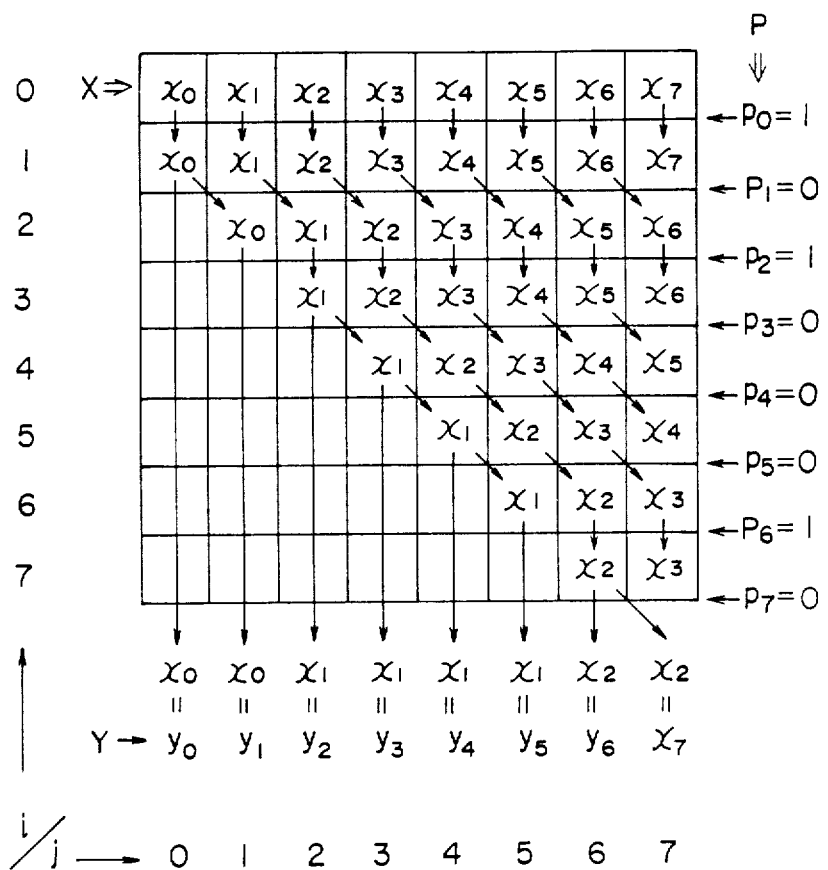
FIG. 34 is a view for illustrating the data expanding method according to an embodiment of the invention.

It is again assumed for convenience of elucidation that the original image data X includes elements or bits $x_0$, $x_1$, $x_2$, $x_3$, $x_4$, $x_5$, $x_6$ and $x_7$ and that the mapping or reference mask pattern P consists of 1, 0, 1, 0, 0, 0, 1, 0 as illustrated in FIG. 34.

Further, individual elements of the matrix illustrated in FIG. 34 are represented by $M_{i,j}$ where i designates rows and j designates columns. Referring to FIG. 34, the original image data X are initially present at the row i ($=0$) and shifted from the row i to the row (i+1) and so forth within the matrix, whereby the expanded image Y=$x_0$, $x_0$, $x_1$, $x_1$, $x_1$, $x_1$, $x_2$, $x_2$ is obtained.

Upon displacement from the row i to the row (i+1), all the elements located on the row i are shifted to the row (i+1), when the reference mask pattern $P_i$ is "1". On the other hand, when the reference mask pattern $P_i$ is "0", the element j ($=0$) to j ($=i-1$) are transferred to the row (i+1), while the elements located from j ($=i-1$) to the rightmost position are shifted by one element to the right to be transferred to the row (i+1). This operation is performed for each of the rows up to the row where i=7, whereby the expanded image Y is derived as the output data from the matrix.

The concept described above will be considered concretely by applying actual values.

(1) At the row i ($=0$), $P_0$ is "1". Accordingly, all the bits or elements on the row 0 are transferred to the row 1. Accordingly, the row i where i=1 consists of $x_0$, $x_1$, $x_2$, $x_3$, $x_4$, $x_5$, $x_6$, $x_7$.

(2) Since $P_1=0$ for the row i=1, the element $M_{10}$ is moved to $M_{20}$, while $M_{10}$ to $M_{16}$ are sequentially moved to $M_{21}$ to $M_{27}$. Thus, the row i=2 includes $x_0$, $x_0$, $x_1$, $x_2$, $x_3$, $x_4$, $x_5$ and $x_6$.

(3) At the row i=2, all the elements on the second row are mapped or moved to the third row, since $P_2=$"1". Accordingly, the row i=3 includes $x_0$, $x_0$, $x_1$, $x_2$, $x_3$, $x_4$, $x_5$, $x_6$.

(4) In a similar manner, the processing is performed for the rows i=3 to 7, whereby the output data Y=$x_0$, $x_0$, $x_1$, $x_1$, $x_1$, $x_1$, $x_2$, $x_2$ can be obtained from the matrix.

Next, a data expanding circuit for carrying out the above method will be described.

Figure 35:
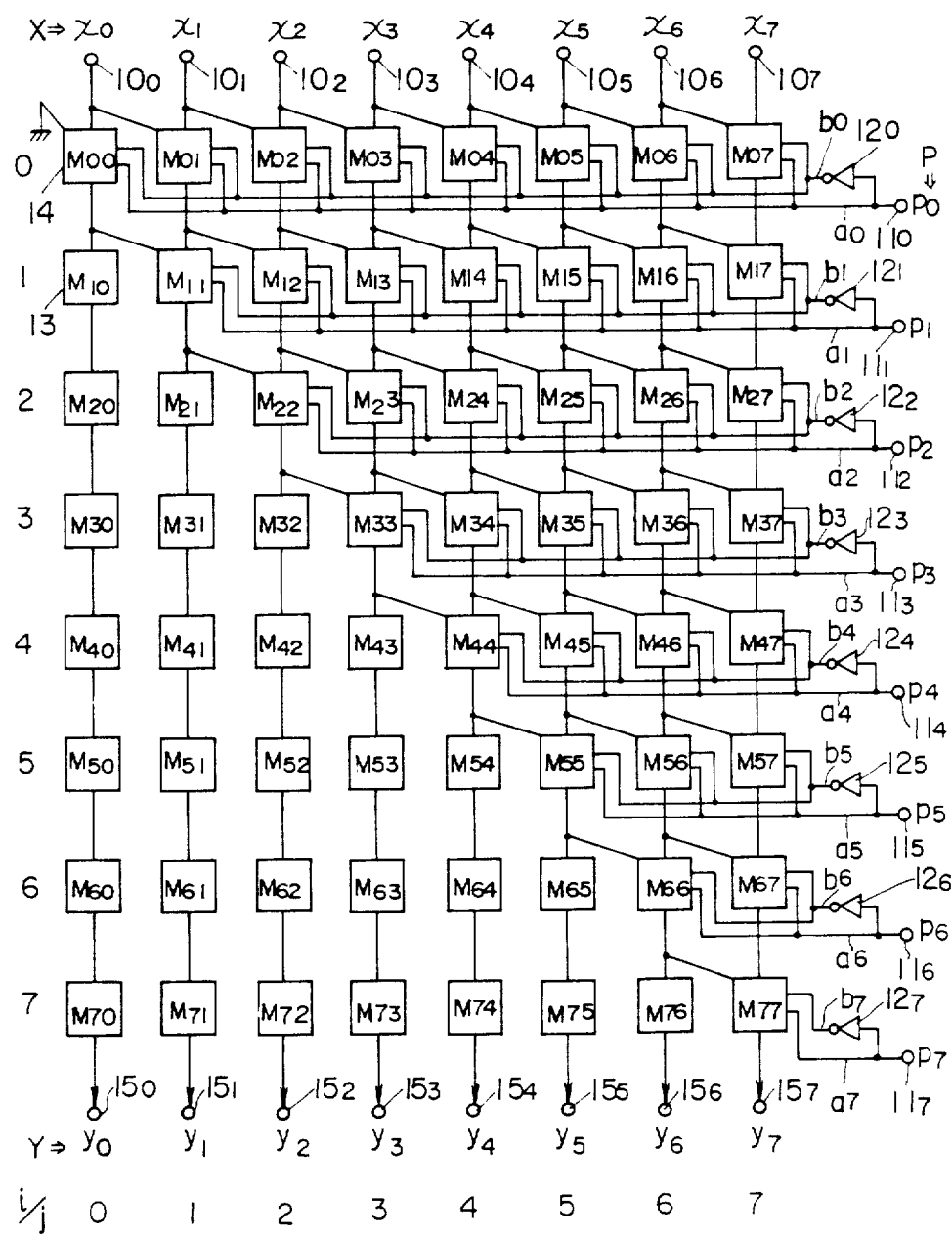
FIG. 35 is a wiring diagram showing the data expanding circuit according to an embodiment of the invention.

FIG. 35 shows a wiring diagram of the data expanding circuit according to an exemplary embodiment of the present invention.

Figure 36:
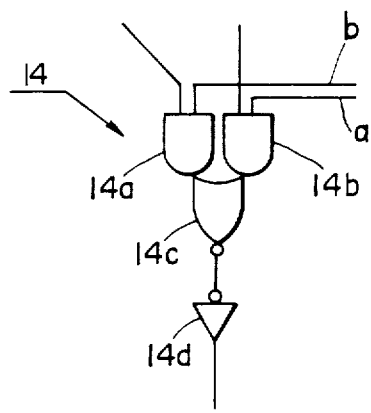
FIG. 36 is a circuit diagram of the data selecting means employed in the circuit shown in FIG. 35.

In FIG. 35, reference numerals $10_0$ to $10_7$ denote input terminals to which image data $x_0, \ldots, x_7$ to be expanded are applied reference numerals, $11_0$ to $11_7$ denote control input terminals to which a binary control signal corresponding to the reference mask pattern (mapping pattern) $P_0, \ldots, P_7$ is applied, and numerals $12_0$ to $12_7$ denote inverters, respectively. Reference numeral 13 denotes data transmitting means each provided at the location of element $M_k$, l (where k and l are both integers which satisfy the conditions of $1 \leq k \leq 7$ and $k > l \geq 0$ of a matrix consisting of eight rows and eight columns. The data transmitting means may simply be signal lines and serve for transmitting the data incoming from the above to the elements located below. Numeral 14 denotes data selecting means provided at locations of the matrix elements $M_{s,t}$ (where s and t are both integers and satisfy the conditions that $0 \leq s \leq 7$ and $s \leq t$). The data selecting means may be constituted by logical elements 14a, 14b, 14c and 14d in the manner illustrated in FIG. 36 and serves for selecting one of data located at the matrix element $M_{s-1, t-1}$ or the matrix element $M_{s-1, t}$ in dependence on the control signals $a_s$ and $b_s$ which correspond to the reference mask pattern (or mapping pattern) $P_s$ supplied through the control signal input terminals $11_s$. Reference numerals $15_0$ to $15_7$ denote output terminals through which the expanded image Y are obtained.

The operation of the data selecting means 14 will be described in detail by referring to FIG. 37.

Figure 37:
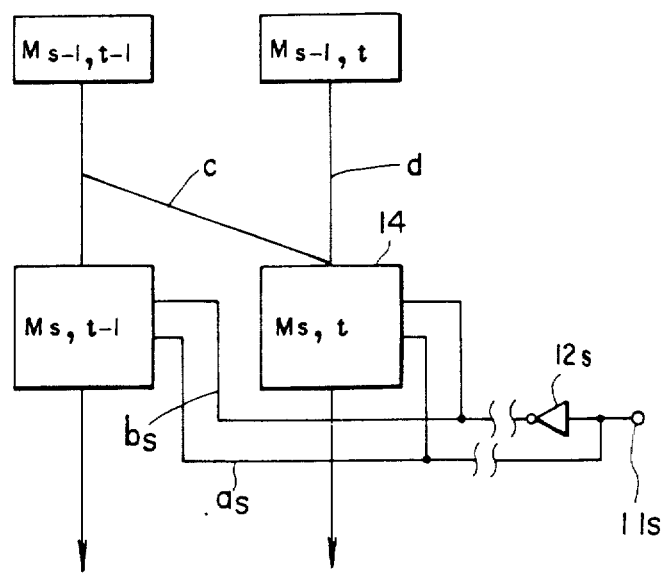
FIG. 37 is a wiring diagram including the data selecting means shown in FIG. 36.

As will be seen in FIG. 37, the data selecting means 14 is so arranged that the data c present at the the matrix element $M_{s-1, t-1}$ is inputted when the control signal $a_s$ supplied through the control input terminal $11_s$ is "0" and the control signal $b_s$ is "1", i.e. when ($a_s$, $b_s$)=(0, 1), while the data d present at the matrix element $M_{s-1, t}$ is selected as the input when the control signals $a_s$ and $b_s$ are "1" and "0", respectively, that is, when ($a_s$, $b_s$)=(1, 0).

The operation performed by the matrix circuit mentioned above, is described below in detail.

It is again assumed that the reference mask pattern (or mapping pattern) P consists of 1, 0, 1, 0, 0, 0, 1, 0 and the expanded data to be derived finally is represented by $x_0$, $x_0$, $x_1$, $x_1$, $x_1$, $x_1$, $x_2$, $x_2$.

Figure 38A:
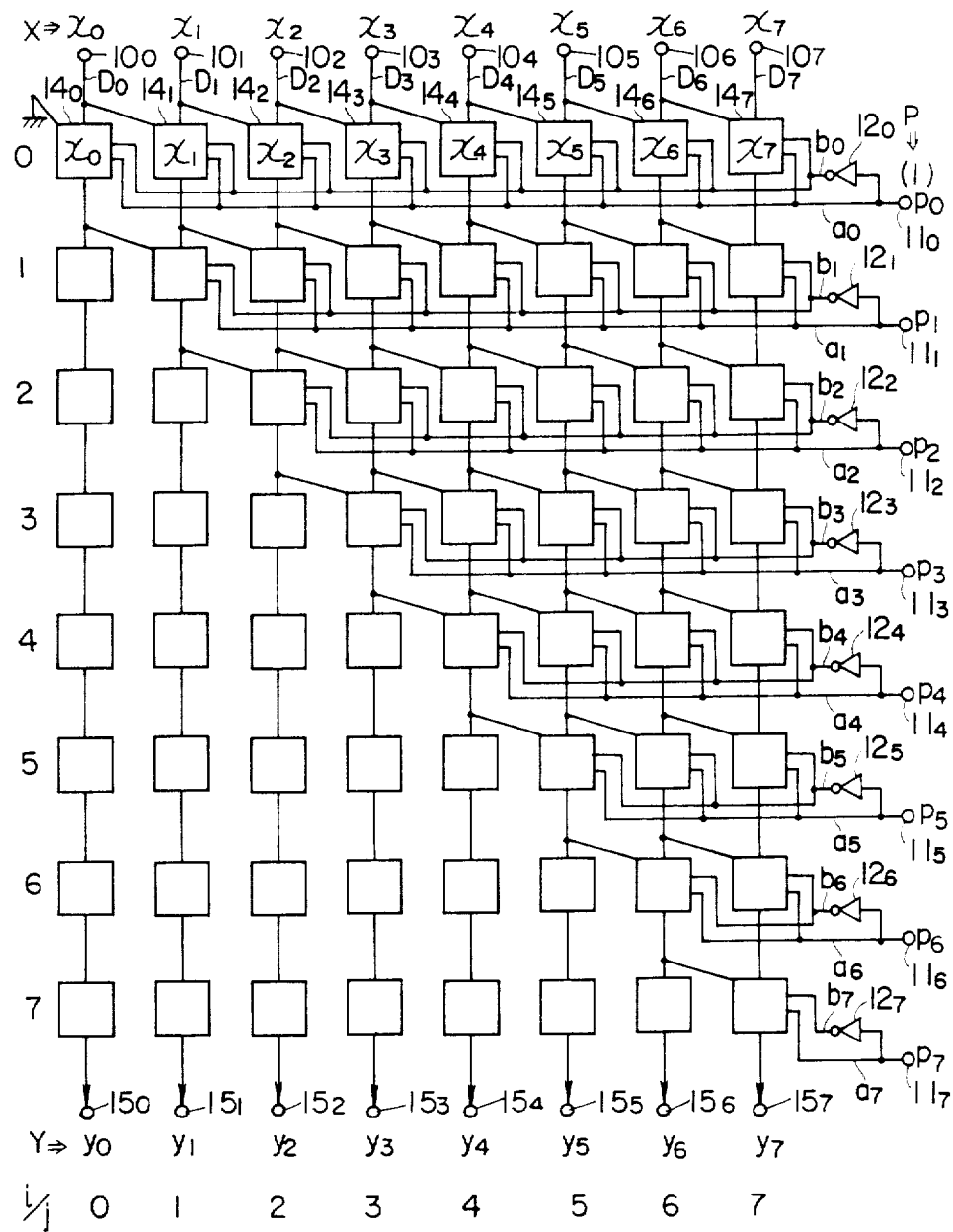
FIGS. 38A to 38H are wiring diagrams for illustrating operations of the data expanding circuit shown in FIG. 35.

Firstly referring to FIG. 38A, the original image data $x_0, x_1, \ldots, x_7$ are supplied to the data selecting means $14_0$, $14_1, \ldots, 14_7$ through the data input terminals $10_0$, $10_1, \ldots, 10_7$. Since the data selecting means $14_0$ to $14_7$ are supplied with the control signals ($a_0$, $b_0$)=(1, 0) through the control signal input terminal $11_0$ at that time point, the data selecting means $14_0$ to $14_7$ select as the input data thereto the data on the lines $D_0$ to $D_7$, respectively, whereby the original image data $x_0, x_1, \ldots, x_7$ are inputted.

Figure 38B:
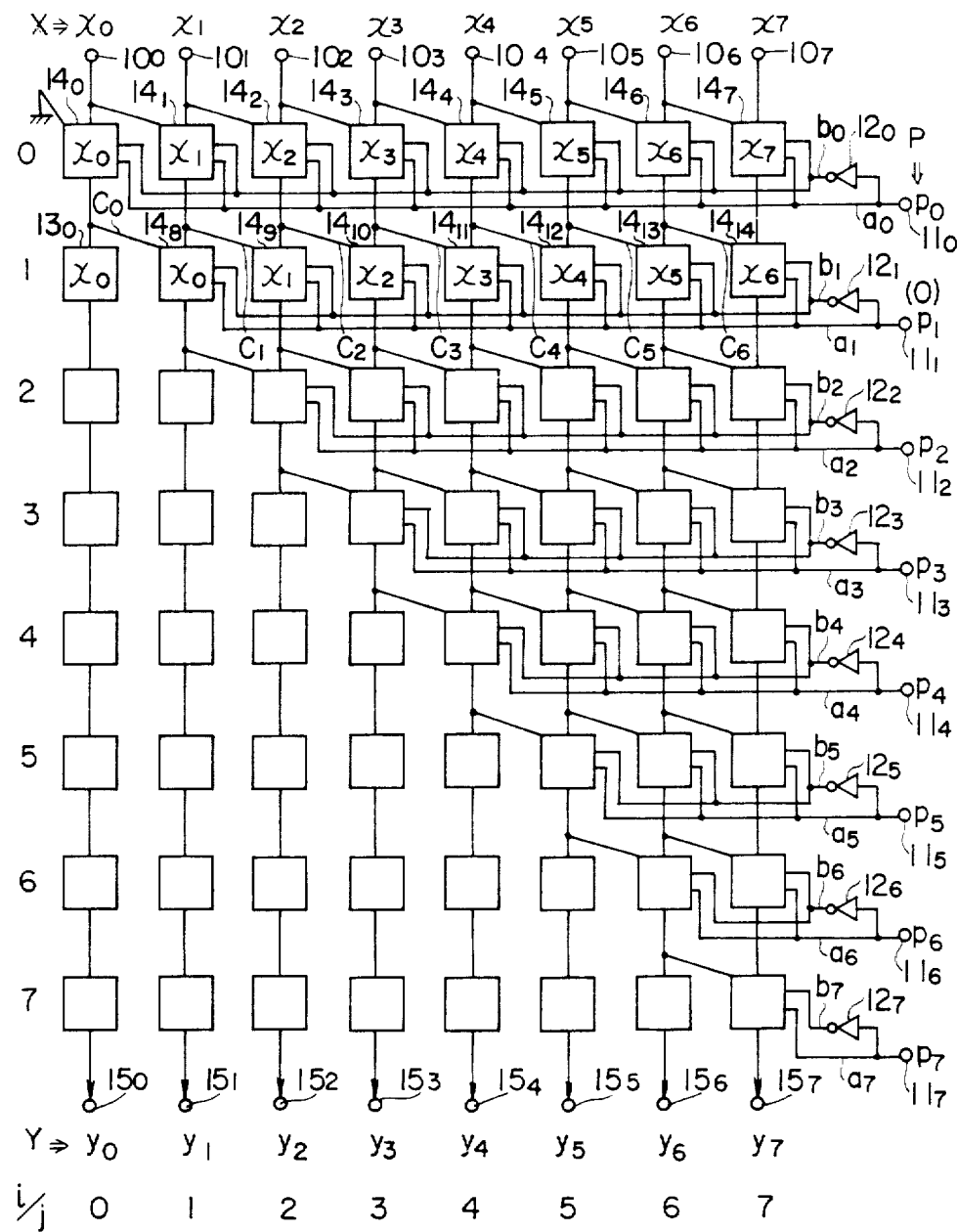

Next referring to FIG. 38B, the original image data bit $x_0$ located at the data selecting means $14_0$ is sent to the data transmitting means $13_0$. On the other hand, the control signals ($a_1$, $b_1$)=(0, 1) are applied to the data selecting means $14_8, \ldots, 14_{14}$ through the control signal input terminal $11_1$, thereby causing the data on the lines $C_0, \ldots, C_6$ to be selected, whereby the original image data bits $x_0, \ldots, x_6$ are inputted.

Figure 38C:
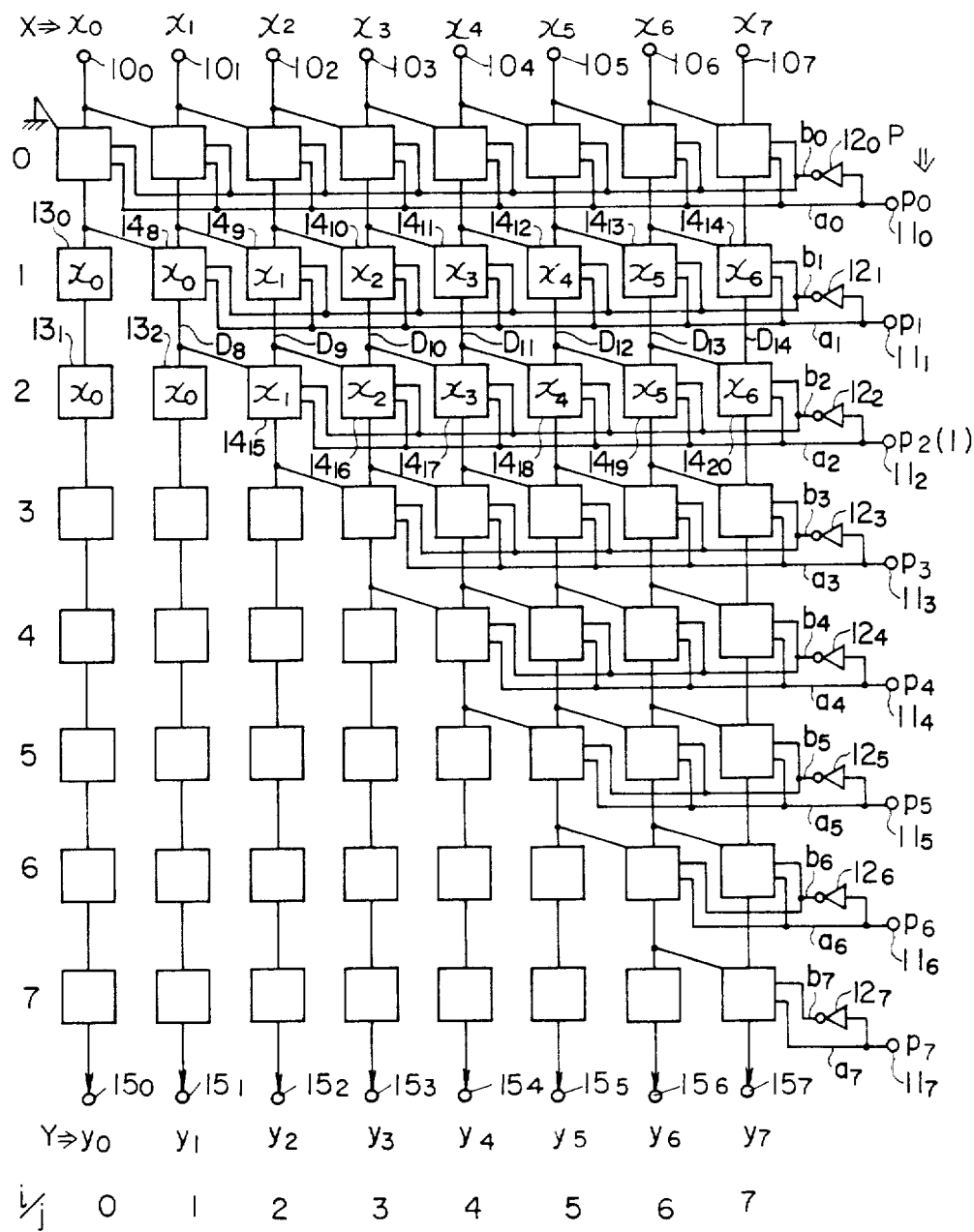

Referring to FIG. 38C, the original image data $x_0$ present at the data transmitting means $13_0$ and the data selecting means $14_8$ are respectively sent out to the data transmitting means $13_1$ and $13_2$. On the other hand, the control signals ($a_2$, $b_2$)=(1, 0) are applied to the data selecting means $14_{15}$ to $14_{20}$ through the control signal input terminal $11_2$, whereby the data on the lines $D_9, \ldots, D_{14}$ are selected, and hence the original image data $x_1, \ldots, x_6$ are inputted.

Figure 38D:
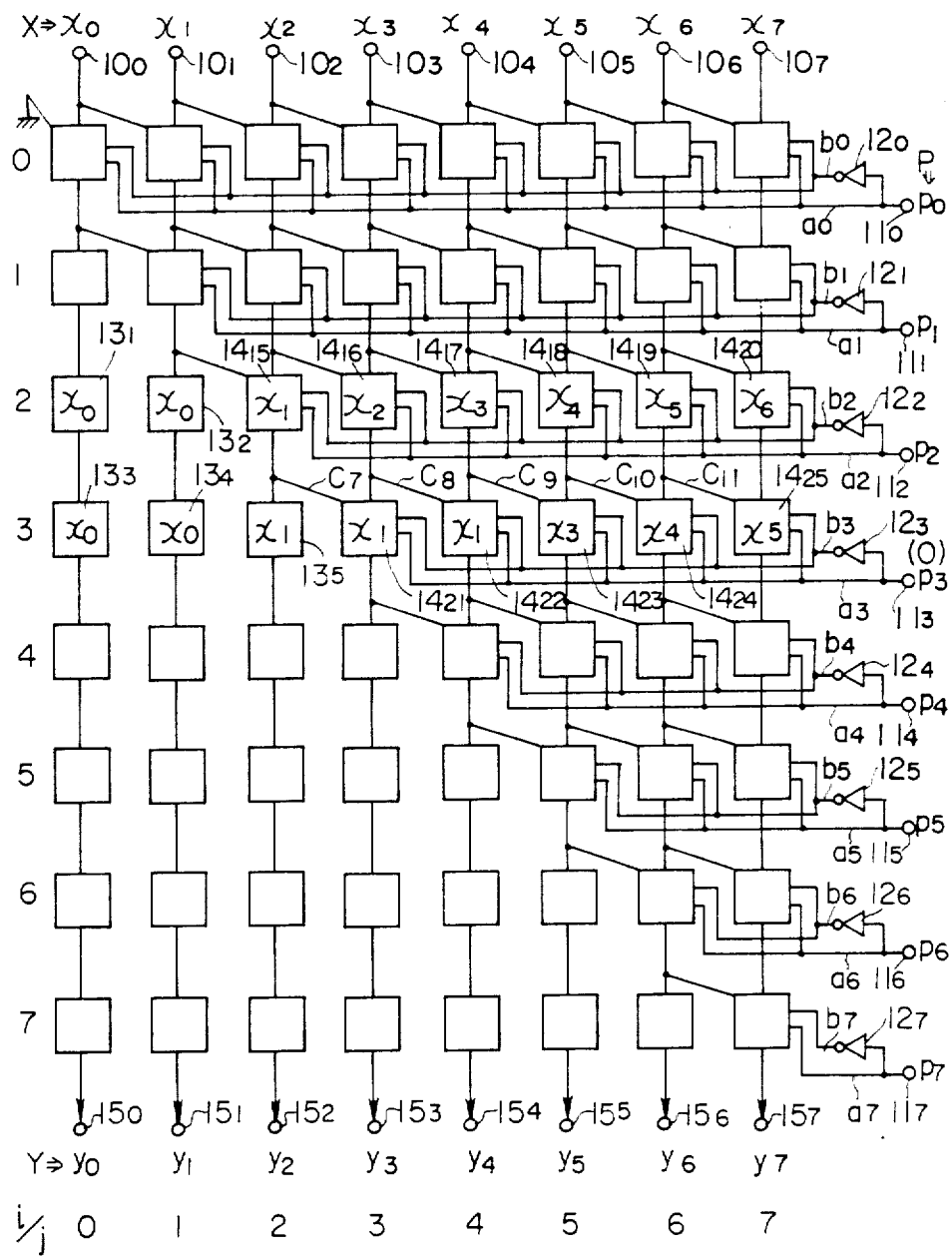

Next referring to FIG. 38D, the original image data $x_0$ and $x_1$ present on the data transmitting means $13_1$ and $13_2$ and the data selecting means $14_{15}$, respectively, are sent out to the data transmitting means $13_3, \ldots, 13_5$. On the other hand, the control signals ($a_3$, $b_3$)=(0, 1) are applied to the data selecting means $14_{21}$ to $14_{25}$ through the control input terminal $11_3$, whereby the data on the lines $C_7, \ldots, C_{11}$ are selected, and hence the original image data $x_1, \ldots, x_5$ are inputted.

Figure 38E:
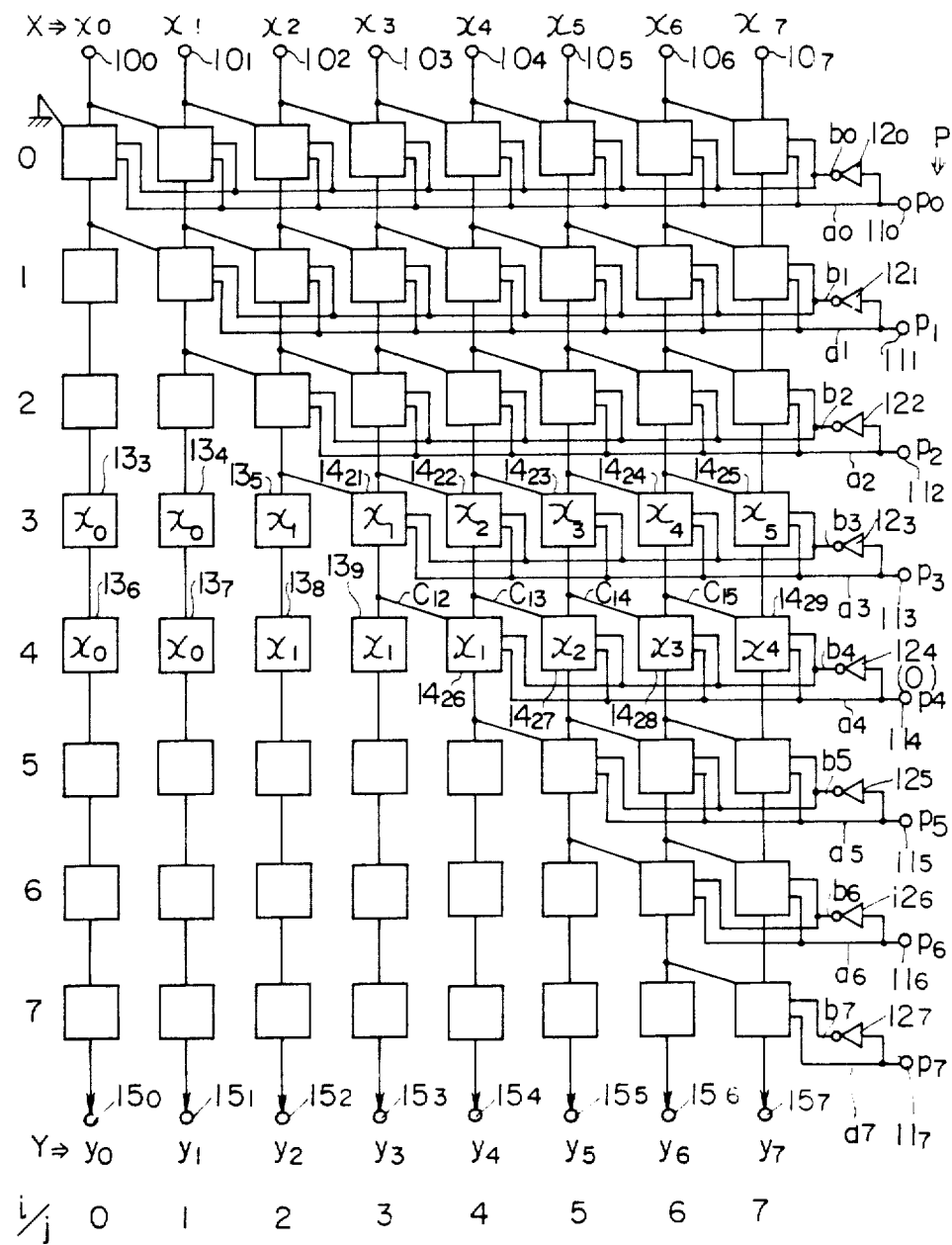

Referring to FIG. 38E, the original image data $x_0$ and $x_1$ present at the data transmitting means $13_3$, $13_4$, $13_5$ and the data selecting means $14_{21}$ are sent out to the data transmitting means $13_6, \ldots, 13_9$. On the other hand, the control signals ($a_4$, $b_4$)=(0, 1) are applied to the data selecting means $14_{26}, \ldots, 14_{29}$ through the control signal input terminal $11_4$. As a consequence, the data on the lines $C_{12}, \ldots, C_{15}$ are selected, thereby causing the original image data $x_1, \ldots, x_4$ to be inputted.

Figure 38F:
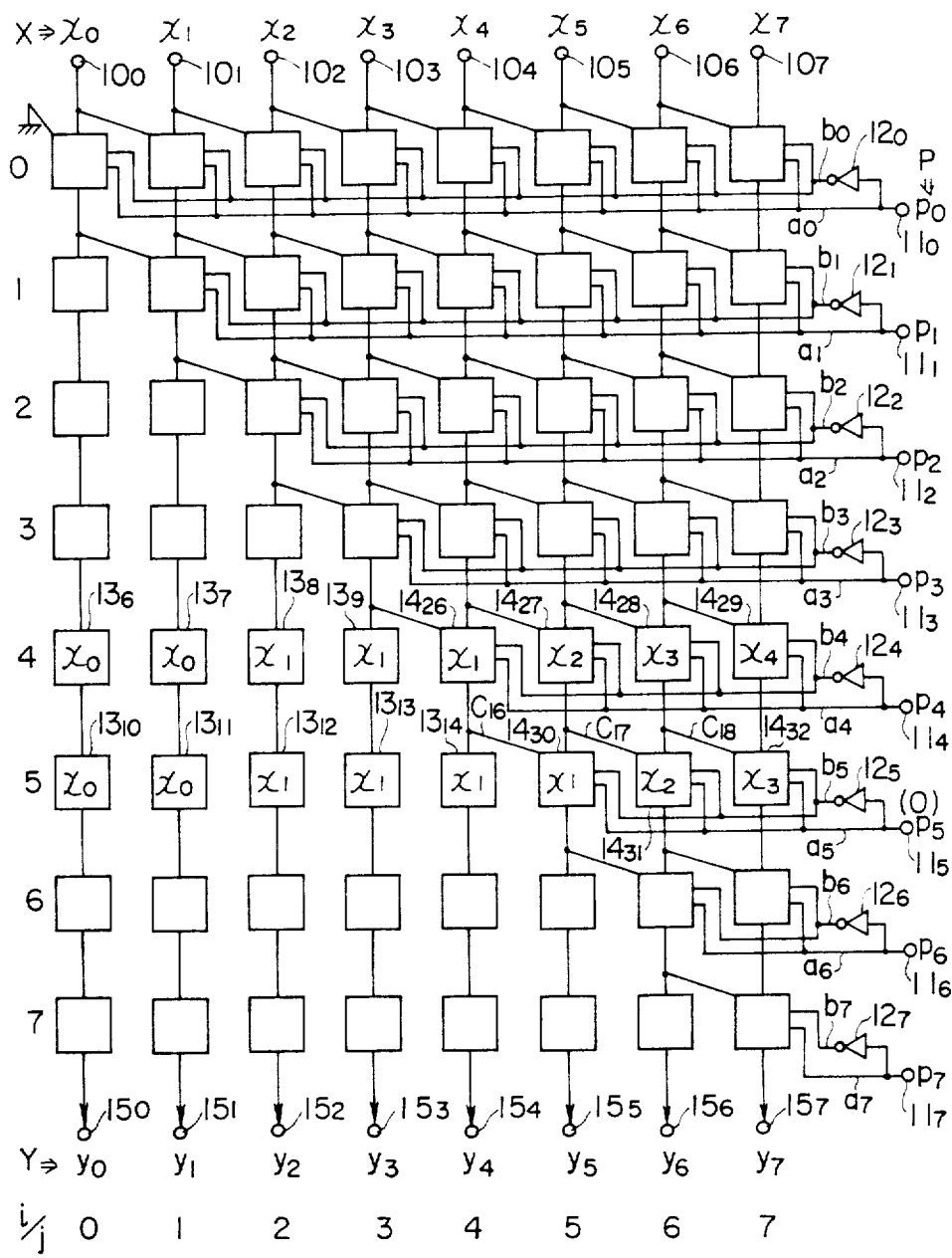

Next referring to FIG. 38F, the original image data $x_0$ and $x_1$ present at the data transmitting means $13_6, \ldots, 13_9$ and the data selecting means $14_{26}$, respectively, are sent out to the data transmitting means $13_{10}, \ldots, 13_{14}$, respectively. At that time, the control signals $(a_5, b_5) = (0, 1)$ are applied to the data selecting means $14_{30}, 14_{31}$ and $14_{32}$ through the control signal input terminal $11_5$. Consequently, the data on the lines $C_{16}, \ldots, C_{18}$ are selected, thereby causing the original image data bits $x_1, x_2, x_3$ to be inputted, respectively.

Figure 38G:
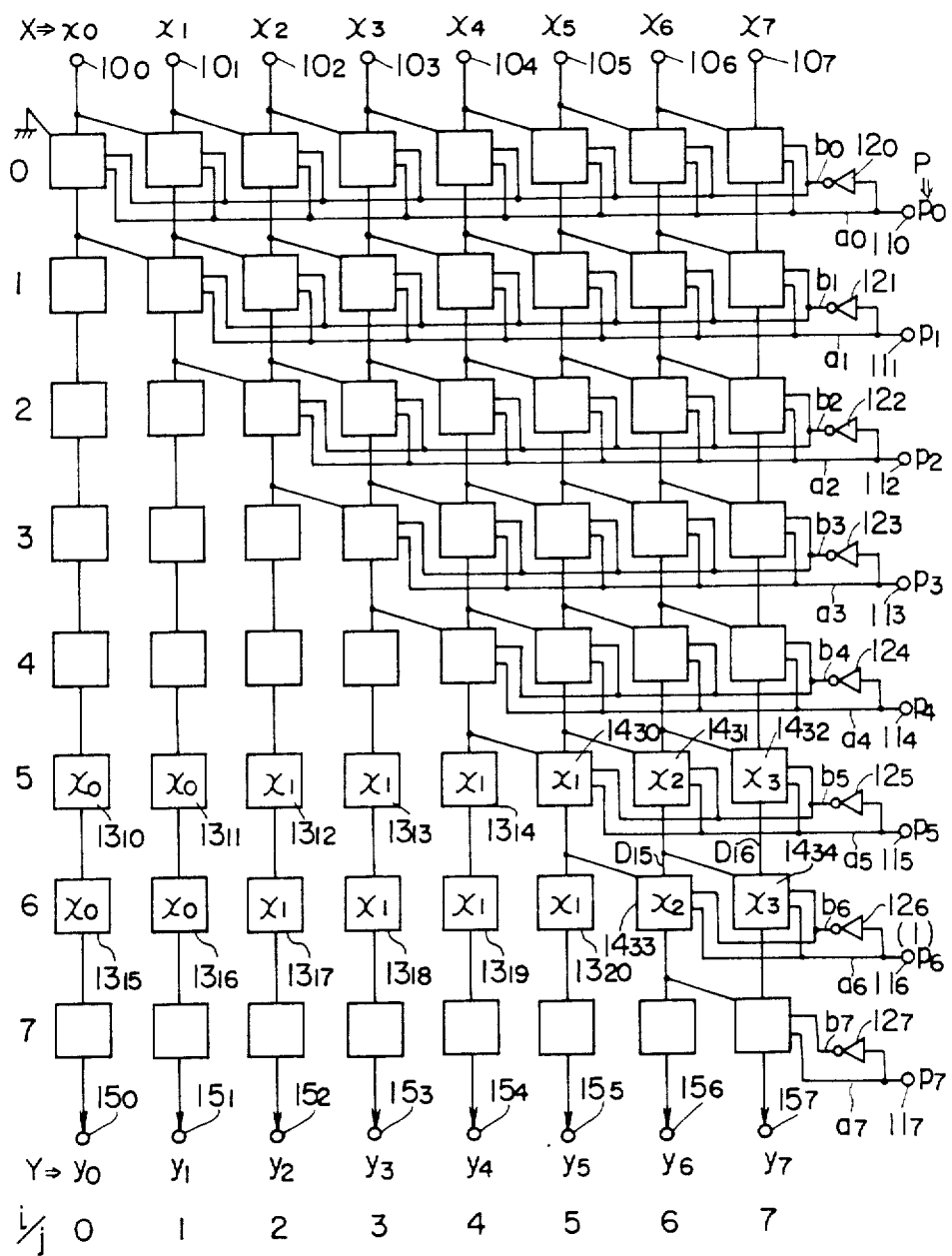

Referring to FIG. 38G, the original image data bit $x_0$ and $x_1$ of the data transmitting means $13_{10}, \ldots, 13_{14}$ and the data selecting means $14_{30}$, respectively, are sent out to the data transmitting means $13_{15}, \ldots, 13_{20}$. On the other hand, the control signals $(a_6, b_6) = (1, 0)$ are applied to the data selectint means $14_{33}$ and $14_{34}$ through the control signal input terminal $11_6$, whereby the data on the lines $D_{15}$ and $D_{16}$ are selected, thereby causing the original image data $x_2, x_3$ to be inputted.

Figure 38H:
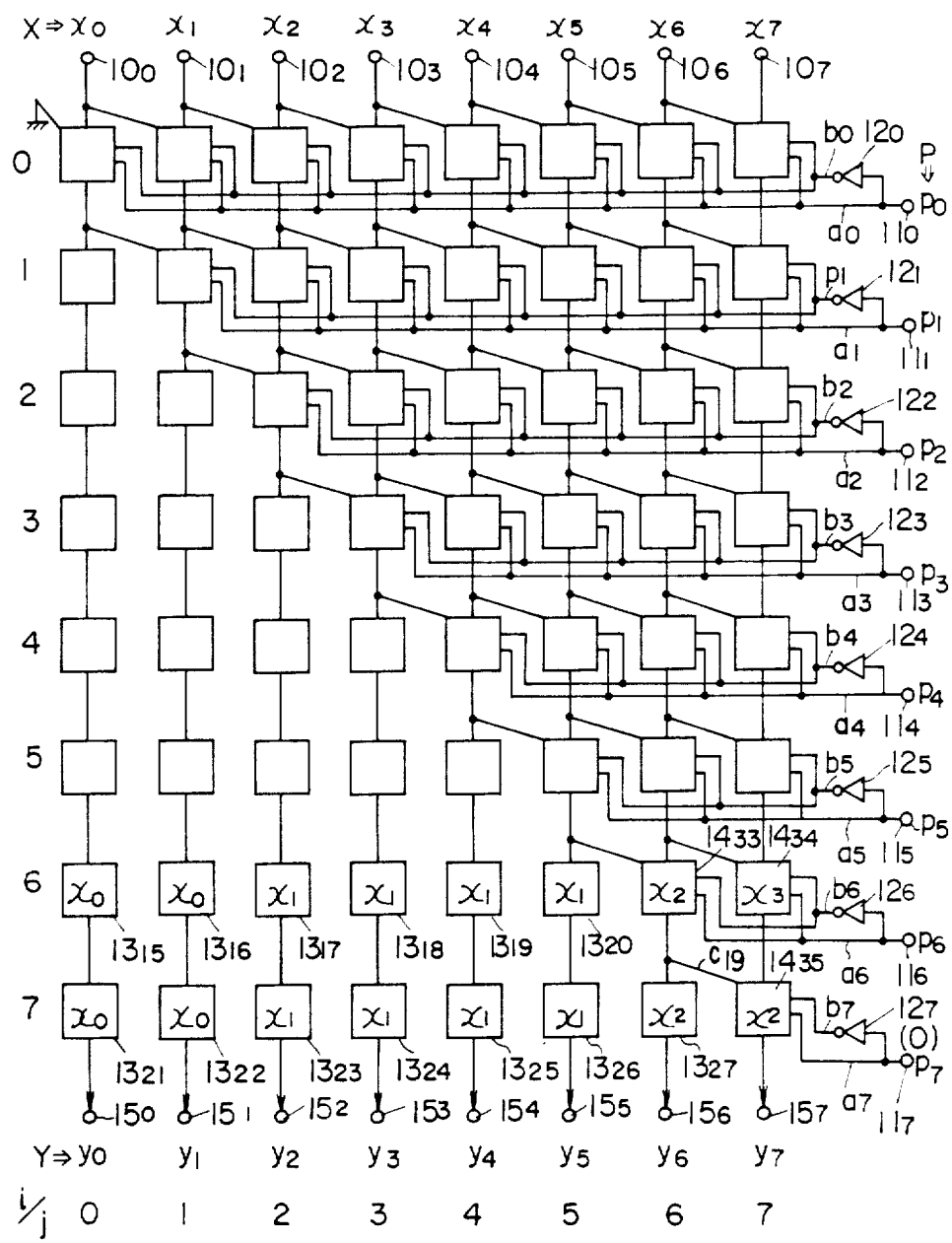

Referring to FIG. 38H, the image data $x_0, x_1, x_2$ at the signal transmitting means $13_{15}, \ldots, 13_{20}$ and the data selecting means $14_{33}$ are sent out to the signal transmitting means $13_{21}, \ldots, 13_{27}$, respectively. On the other hand, the data selecting means $14_{35}$ is applied with the control signals $(a_7, b_7) = (0, 1)$ through the control signal input terminal $11_7$, whereby the data on the line $C_{19}$ is selected to thereby causing the original image data $x_2$ to be inputted. Thus, through the output terminals $15_0, 15_{0'}, \ldots, 15_7$, the expanded original image data $Y = x_0, x_0, x_1, x_1, x_1, x_1, x_2, x_2$ can be derived.

By virtue of the matrix-like array of the data transmitting means 13 and the data selecting means 14, data expansion can be carried out at a high speed without requiring clocking. Further, due to the regular circuit configuration, the matrix circuit is suited implementation in the form of LSI. Besides, merely by varying the control signal applied to the control signal input terminal 11, the expanded data Y of other types can be produced easily.

Figure 39:
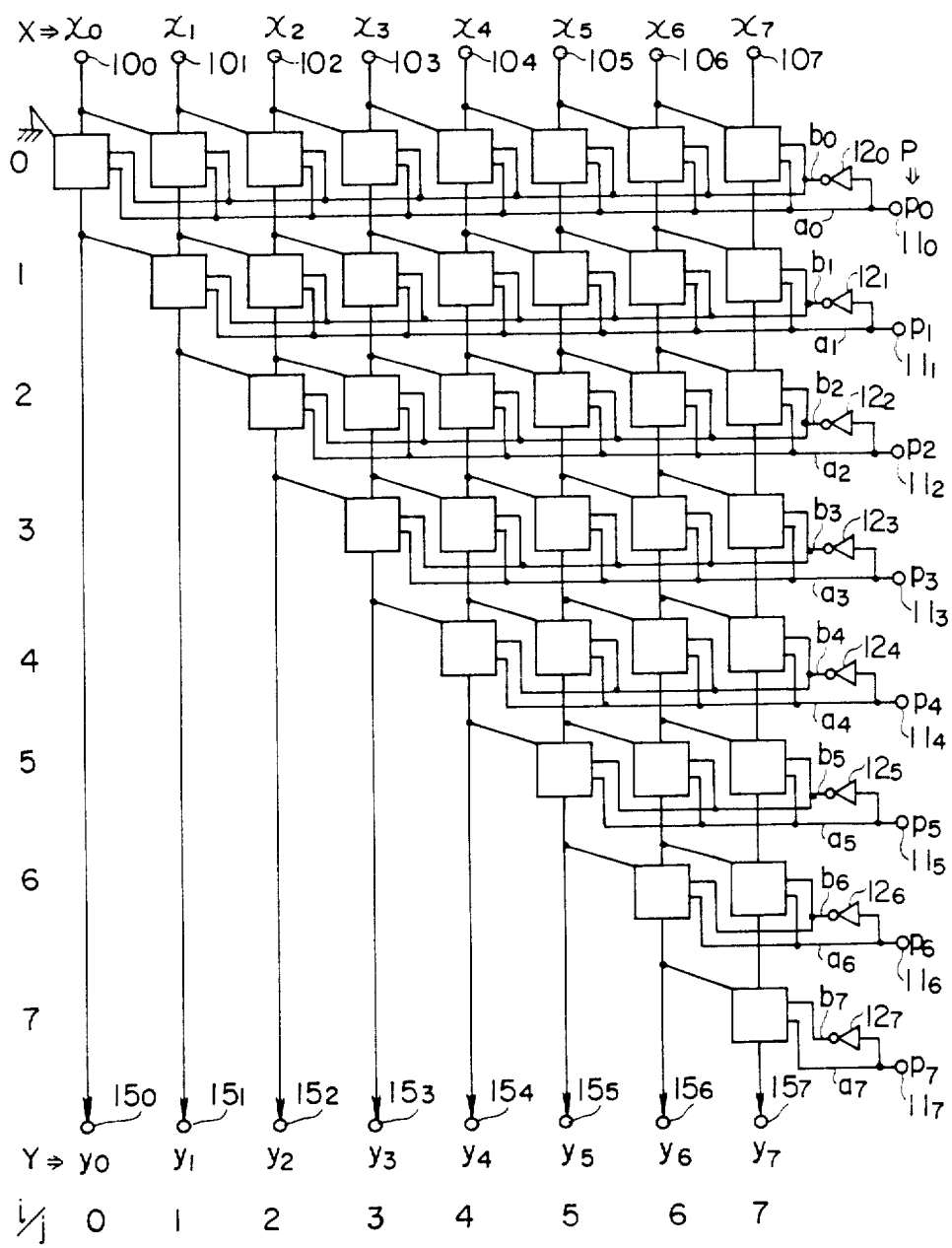
FIG. 39 is a wiring diagram of the data expanding circuit according to another embodiment of the invention.

Although the data transmitting means 13 are assumed to be provided in the embodiment described above, this is only for convenience of illustration. Since the data transmitting means 13 may be replaced by simple signal lines, as described earlier, the circuit shown in FIG. 35 may be modified to a configuration shown in FIG. 39.

The above description has been made on the assumption that the invention is applied to the processing of the image data or information. It should however be appreciated that other types of information can be processed according to the present invention.

Figure 43:
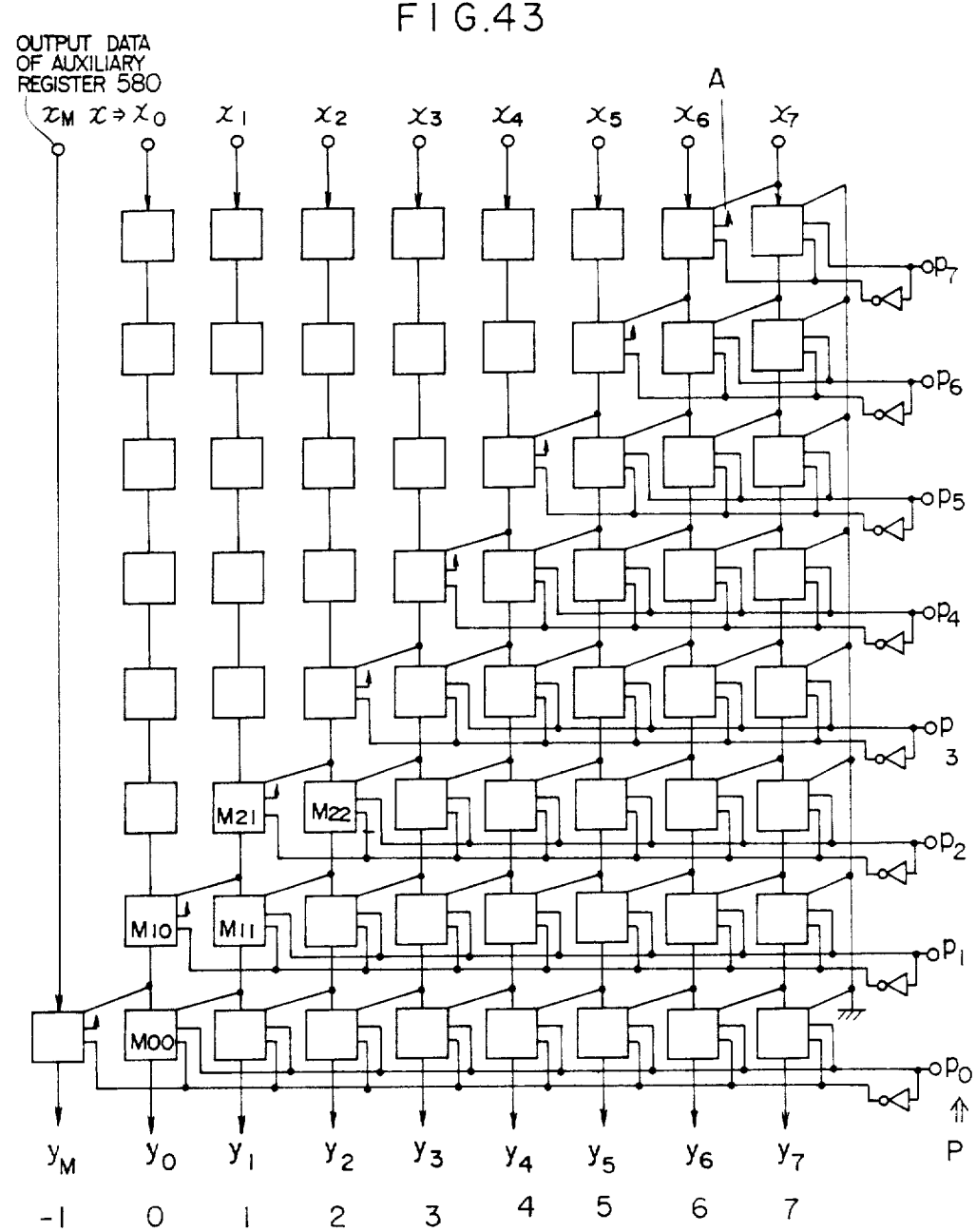
FIG. 43 is a circuit for illustrating the utilization of data stored in the auxiliary register for obtaining a logical sum in the contracting operation.

With the data contracting circuit construction shown in FIG. 23, only the original image data $x_0, x_2, x_6$ which correspond to the mapping (or reference masking) pattern values "1" are extracted, with the other original image data being lost. In order to effectively make use of the image data which would be lost otherwise, the circuit shown in FIG. 43 is so constructed that two data bits at the mapping pattern "1" are logically ORed with each other at the succeeding mapping pattern 0 so that the final data $x_{0,1}, x_{2,3,4,5}, x_{6,7}$ may be obtained. Here the notation $x_{i,j,k}$ represents the logical sum of the data $x_i, x_j$ and $x_k$. To realize this processing, the wiring for an element $M_{i,i-1}$ located on the left side of an element $M_{i,i}$ on the diametric line in the contraction circuit shown in FIG. 23 is changed as shown in FIG. 43, where, as described later, A represents a circuit point to which the logic "1" signal is applied. In the circuit shown in FIG. 23, the data at $M_{i+1,i-1}$ are stored as they are. However, in the circuit shown in FIG. 43, the data at $M_{i+1,i-1}$ is ORed with the data at $M_{i+1,i}$ in the processing when the mapping pattern is "0".

Next, an auxiliary register 580 which may be used in the expansion or contraction circuit according to the invention will be described.

Figure 2:
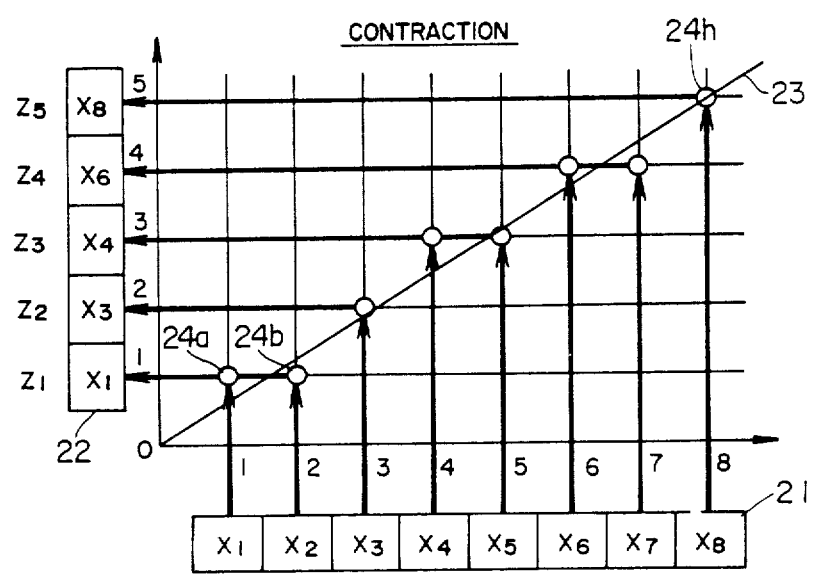
FIG. 2 is a view for illustrating a method for contracting image data.

In the expansion and contraction circuit 55 which is shown in FIG. 5 and constituted by the expansion circuit and contraction circuit, the number of data processed in a single processing corresponds to the number of "1" bits present in the mapping pattern in the case of the expansion processing, while the number of data processed is always equal to 8 in the case of the contraction processing, as will be seen from FIGS. 2 and 3. On the other hand, the number of data produced through a single processing is constantly eight in the case of the expansion processing, while the number of data in question corresponds to the number of "1" bits present in the mapping pattern in the case of contraction.

Figure 40:
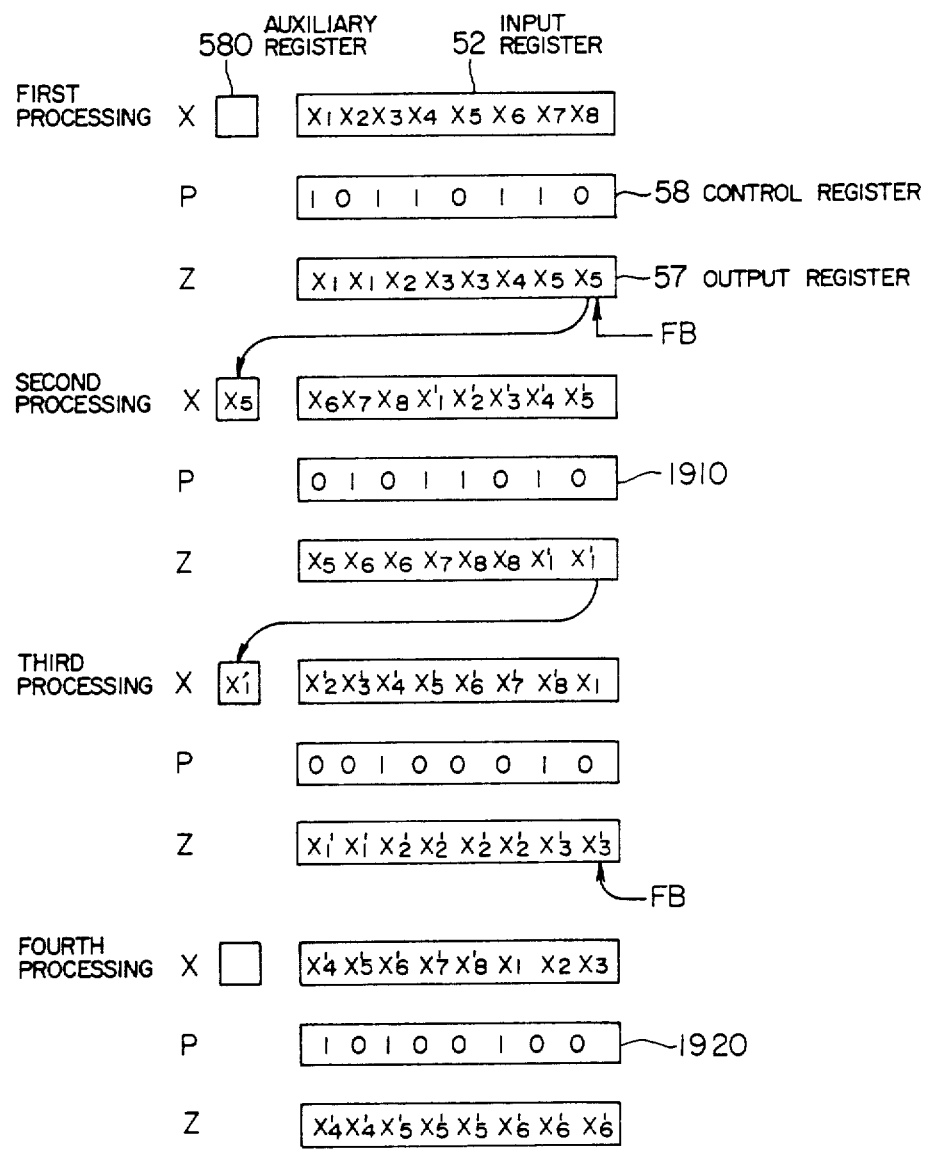
FIGS. 40 and 41 are charts for illustrating respective processes of expansion and contraction according to the present invention.

Referring to FIG. 40, the original image data stored in the input register 52 is shifted upon every processing to the left by a number corresponding to the number of "1" bits included in the mapping pattern (the number of "1" bits included in the mapping pattern will be hereinafter represented by NB), wherein the resulting empty bit positions are filled with the bits of the succeeding original image data. In the case of the expansion processing, data is renewed at the bit "1" of the mapping pattern, while the preceding data are copied at the bit "0" of the mapping pattern. Accordingly, when the leading data bit of the mapping pattern is "0", as illustrated in FIG. 40 by a reference numeral 1910, the final data $x_5$ which has been produced through the immediately preceding processing becomes necessary. To this end, the auxiliary register 580 for storing the required data bit in the data produced through the immediately preceding processing is provided on the left side to the input register 52, as is shown in FIG. 40. Since the data $x_5$ is the final pixel data FB generated through the preceding processing, the data FB is extracted with the aid of an arithmetic circuit 590 and loaded in the auxiliary register 580. The arithmetic circuit or unit 590 serves to arithmetically determine the data to be supplied to the auxiliary data register 580 in the expansion or contraction processing. Details of this arithmetic circuit will be described later or by referring to FIGS. 45 to 50. In contrast, when the leading bit of the mapping pattern is "1", as indicated in FIG. 40 by a reference numeral 1920, there arises no necessity for returning the final data bit FB to the auxiliary register 580.

Figure 41:
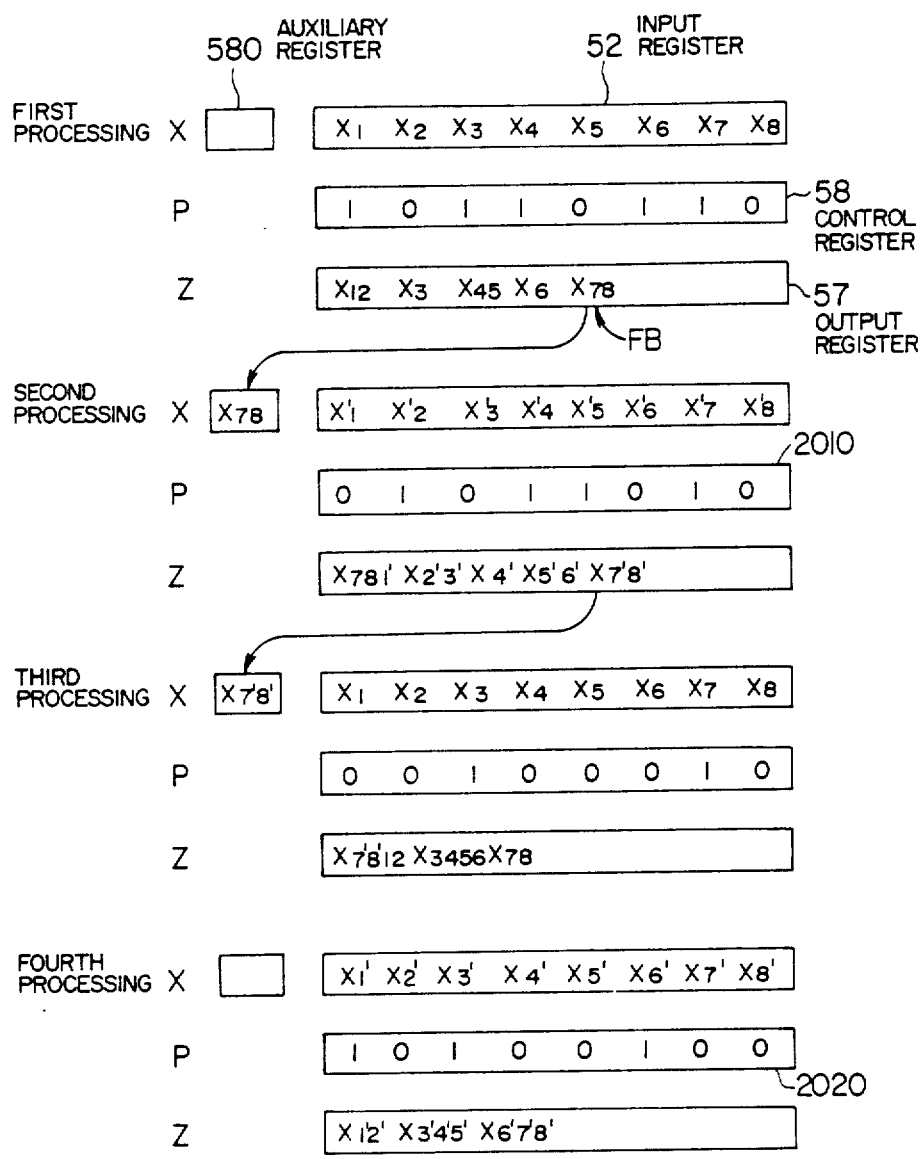

Referring to FIG. 41, in the case of the contraction processing, the original image data stored in the input register 52 are all referred to and utilized on an eight-bit basis upon every processing inclusive of the processing in which a logical sum is obtained. Accordingly, the original image data in the register 52 are all replaced by the fresh data upon every processing. However, when the logical sum is to be determined in the contraction processing, the data corresponding to the bit "1" of the mapping pattern is ORed with the data corresponding to the bit "0" of the mapping pattern. Accordingly, when the leading bit of the mapping pattern is "0", as indicated by reference numeral 2010, the final data bit FB contained in the data prepared through the preceding processing is required for realizing the logical OR-function. Under the circumstances, the final data bit FB is extracted by means of the arithmetic circuit 590 which will be described later with reference to FIG. 45, and stored in the auxiliary register 580. The number of data bits to be produced corresponds to NB (which represents the number of "1" bits included in the mapping pattern) plus 1(one). In the second and third processings illustrated in FIG. 41, NB is 4 and 2, respectively, while the number of the produced data is 5 and 3, respectively. In this connection, it should be mentioned that the leading data $x_{781}$, generated through the second processing illustrated in FIG. 41, is in fact a logical product of the final data $FB=x_{78}$ produced through the preceding processing and $x_1'$. Thus, $x_{78}$ should be replaced by $x_{781}'$.

In the case of the mapping pattern whose leading bit is "1", as denoted by a reference numeral 2020, there is no necessity for returning FB to the auxiliary register 580.

In summary, the arithmetic circuit 590 which will be described later plays no part when the leading bit of the mapping pattern is "1". In this case, data in the auxiliary register is indeterminate or indefinite. When the leading bit of the mapping pattern is "0" in the expansion processing, the eighth pixel data of those generated through the preceding processing is returned to the auxiliary register 580. When the leading bit of the mapping pattern is "0" in the contraction processing in which the OR-function is included, NB which represents the number of "1" bits contained in the mapping pattern which was referred to in the preceding processing is determined, and the (NB+1)-th pixel data among those produced through the preceding processing is returned to the auxiliary register 580, whereby upon completion of the currently performed processing, the final bit of the data resulted from the preceding processing is replaced by the leading bit of the data generated through the currently performed processing.

The counting of the number of "1" bits contained in the mapping pattern may be realized, for example, by shifting the mapping pattern bit by bit and counting the number of times when the carry is set.

Next, a concrete circuit configuration in which the auxiliary register 580 is made use of will be described.

Figure 42:
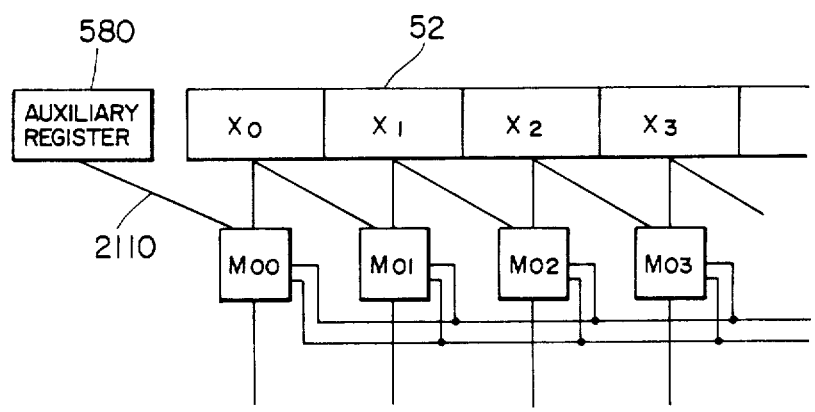
FIG. 42 is a circuit diagram for illustrating the utilization of data stored in an auxiliary register in the data expanding operation.

In the case of the expansion processing, the left input to the top left element $M_{00}$ shown in FIG. 35 is connected to the ground. This left input is disconnected from the ground and connected to the auxiliary register 580 as indicated by an input line 2110 to the element $M_{00}$ in FIG. 42.

In the contraction processing in which the OR-function is included, a circuit similar to the bottom left element $M_{00}$ shown in FIG. 23 is additionally provided on the left side of the latter and connected to the output $x_M$ of the auxiliary register 580, as is shown in FIG. 43 (where A represents a circuit point to which the logic "1" signal is applied). Then, the leading data $x_{781}'$ generated through the second processing shown in FIG. 41 appears at the output $y_M$ which is positioned on the left side to the output $y_0$. Accordingly, one bit position is additionally provided in the output register at the left, to store the output $y_M$. The processing of the generated data may be effected including this data $y_M$.

As described earlier, the leading data $x_{781}'$ generated through the second processing illustrated in FIG. 41 which is effected for the data contraction and includes the OR function represents the logical sum of the final bit $FB=x_{78}$ produced through the first processing and $x_1'$, and thus $x_{78}$ has to be replaced by $x_{781}'$. In this case, the number of data produced through the first processing was not five but in fact four. This fact can be indicated only by the leading bit of the mapping pattern for the second processing, thus involving a difficulty in the execution of the processing.

Figure 44:
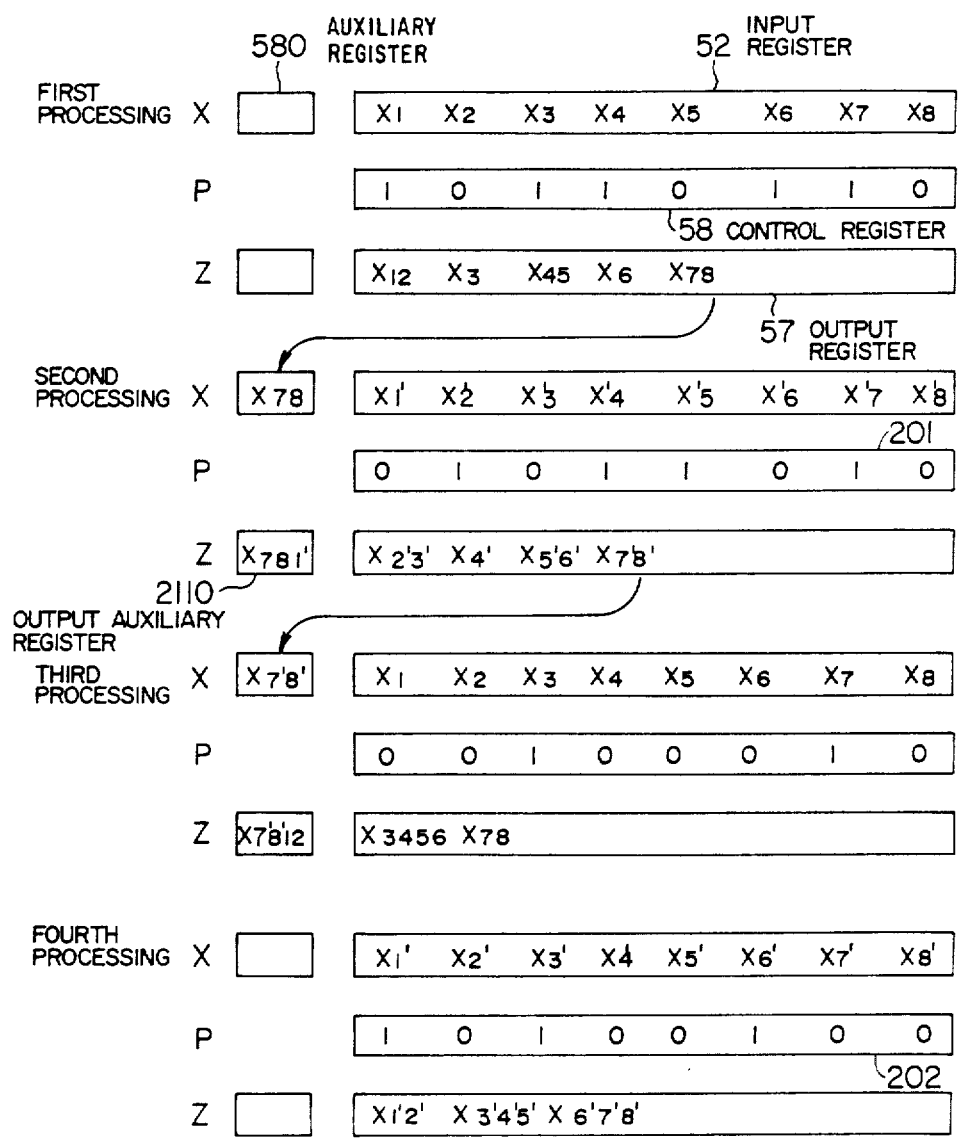
FIG. 44 is an explanatory diagram for illustrating stepwise the process of obtaining a logical sum in the contracting operation with the aid of the auxiliary output register.

With a view to overcoming the problem mentioned above, an output auxiliary register 2110 is provided on the left side to the output register 57 as shown in FIG. 44, wherein the data produced in correspondence to the leading bit of "1" of the mapping pattern are stored in the output auxiliary register 2110 for replacing the final data produced through the preceding processing by the data stored in the register 2110. More specifically, taking as an example the second processing illustrated in FIG. 44, the data $x_{78}$ in the auxiliary register 580 is ORed with $x_1'$, resulting in $x_{781}'$ which is then stored in the output auxiliary register 2110, whereby the final data $x_{78}$ produced through the first processing is replaced by $x_{78}'$. Since the number of data produced in the output register 57 equals to the number NB (i.e. 4 in the instant case) indicating the number of "1" bits included in the mapping pattern, the fourth data $x_{78'}$ is returned to the auxiliary register 580. When the leading data of the mapping pattern is "1", the number of data as generated is equal to NB. Accordingly, the NB-th data bit is returned to the auxiliary register 580. In this manner, by providing two auxiliary registers 580 and 2110, operations for the expansion processing, the contraction processing as well as the contraction processing including the OR function (also referred to contraction-OR processing) can be performed by using a common circuit.

In the foregoing, the flow of the processing has been elucidated on the assumption that the output auxiliary register 2110 is separately provided for convenience of description. It will however be appreciated that since the output auxiliary register is operated at the same timing as the output register 57, the former can be realized as an integral part of the latter.

In contrast, the data to be stored in the auxiliary register 580 is produced through the preceding processing. Accordingly, a storage means for storing this data is required to be provided independently of the input register.

Now, the arithmetic circuit 590 will be described. An exemplary circuit arrangement of this arithmetic unit is shown in the block diagram of FIG. 45. Referring to the figure, a selector 241 is controlled by control signals 242a or 242b which are changed over in dependence on the expansion processing or contraction-OR processing (i.e. contraction processing including the logical OR function), to select the eight data bits 243a of the data 51a generated by the expansion and contraction circuit 55 in the case of the expansion processing. On the other hand, in the case of the contraction-OR processing, the selector 241 responds to a decoded signal 247a outputted from a decoder 246 which is supplied with a signal 245a produced by a binary data counting circuit 244 and representing NB, which is the number of "1" bits included in the mapping pattern stored in the control register 58, to thereby select the NB-th data bit 243b of the generated data 51a.

Figure 45:
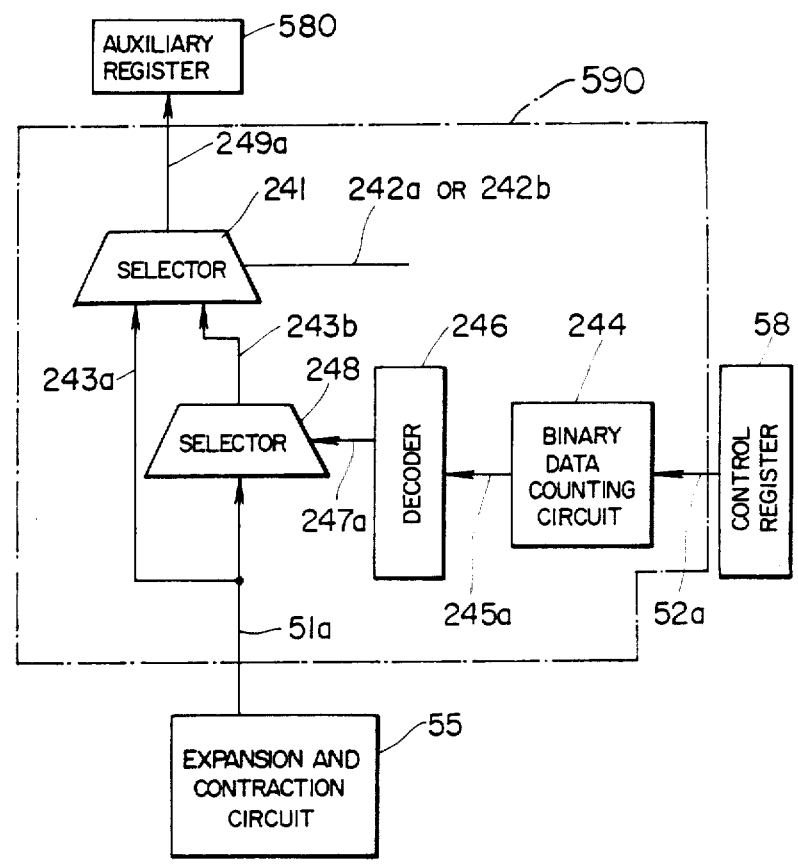
FIG. 45 is a block diagram showing the circuit arrangement of the arithmetic unit.
Figure 47:
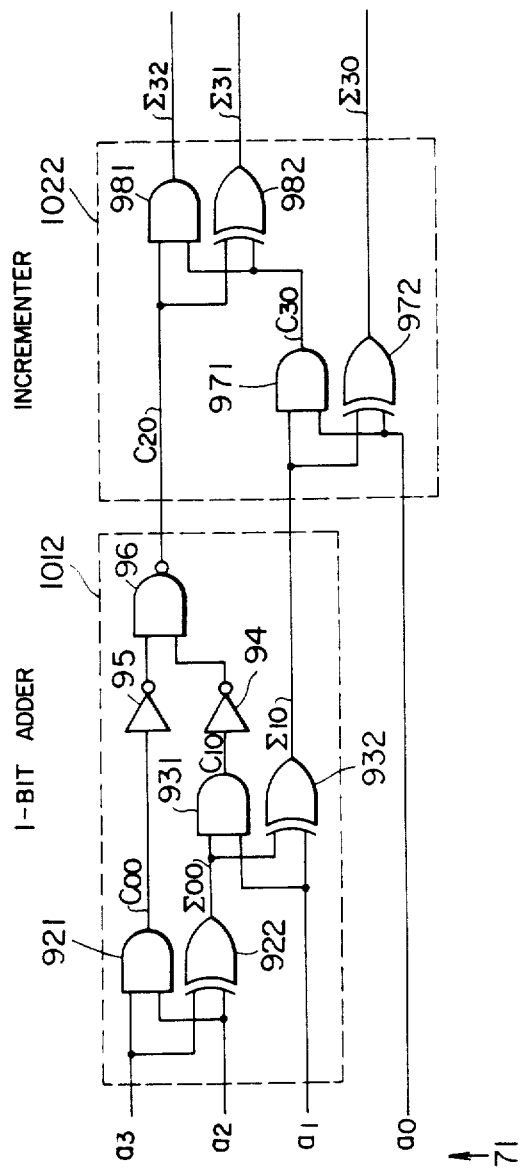
Figure 48:
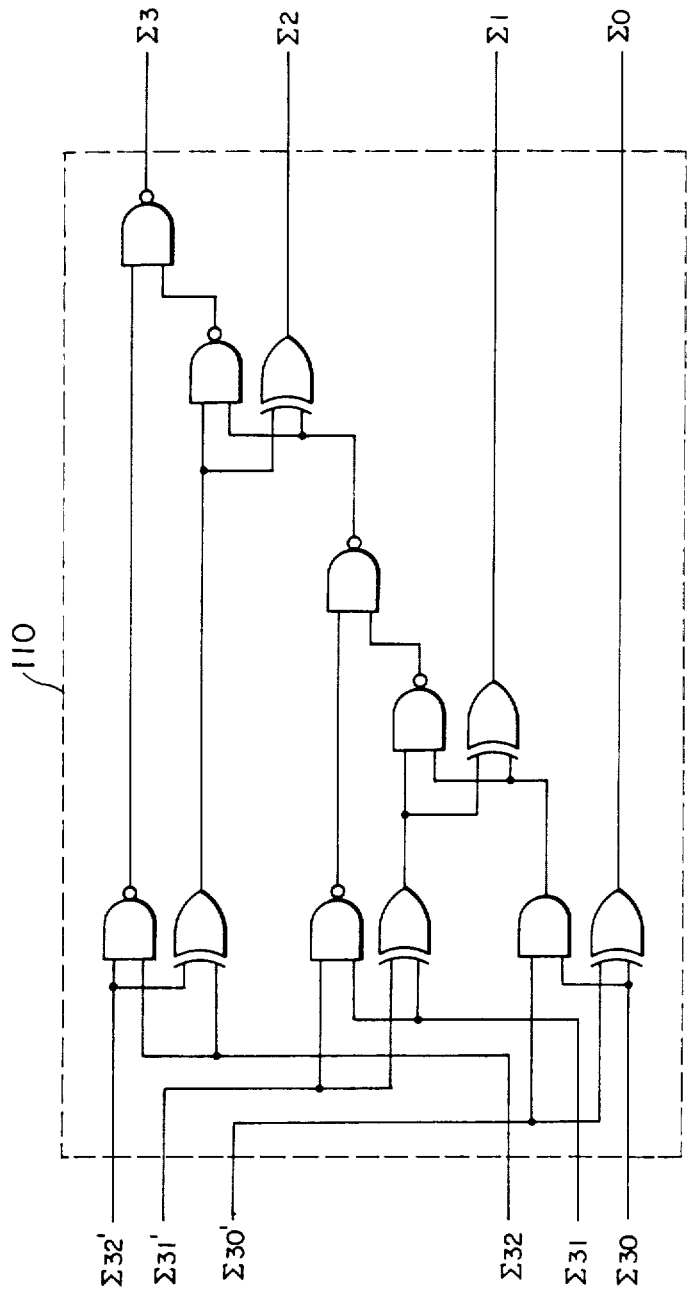

Next, the individual circuits represented by blocks in FIG. 45 will be described. FIGS. 46, 47 and 48 show an exemplary embodiment of the binary data counting circuit 244. FIG. 46 shows the same in a block diagram. The mapping pattern consisting of 8 bits is divided into two segments each of 4 bits. A pair of one-bit adders 1011 and 1012 provided at the first stage determine the number of "1" bits in the respective inputs each of 3 bits (i.e. $a_7$, $a_6$, $a_5$ for the adder 1011, and $a_3$, $a_2$, $a_1$ for the adder 1012), which is followed by the determination of the number of "1" bits included in 4 bits by incrementers 1021 and 1022, respectively. Finally, a three-bit adder 110 determines the number of "1" bits included in the mapping pattern of 8 bits, this number being outputted as the four-bit signal 245a. A circuit configuration of the one-bit adder 1012 and the incrementer 1022 for the four bits $a_3$, $a_2$, $a_1$, $a_0$ is shown in FIG. 47.

Details of operation will be described by referring to FIG. 47.

Two bits $a_3$ and $a_2$ of the 4-bit input data A ($a_3$, $a_2$, $a_1$, $a_0$) denoted by a numeral 71 are added by means of an adder constituted by an AND (logical product) circuit 921 and an EOR (Exclusive-OR) circuit 922, whereby a sum signal $\Sigma_{00}$ and a carry $C_{00}$ are produced. The sum signal $\Sigma_{00}$ and the bit $a_1$ of the input data 71 are added by an adder constituted by an AND circuit 931 and an EOR circuit 932, and as a result a sum signal $\Sigma_{10}$ and a carry signal $C_{10}$ are produced. The signals $C_{00}$ and $C_{10}$ are combined by a NAND circuit 96 to produce a carry signal $C_{20}$. The number of "1" bits included in three bits $a_3$, $a_2$, $a_1$ of the input data 71 is represented by the sum $\Sigma_{10}$ and the carry $C_{20}$. The sum signal $\Sigma_{10}$ and the bit $a_0$ of the input data 71 are added by an adder constituted by an AND circuit 971 and an EOR circuit 972, whereby a sum signal $\Sigma_{30}$ and a carry signal $C_{30}$ are produced. The carry signals $C_{30}$ and $C_{20}$ are added by an adder constituted by an AND circuit 981 and an EOR circuit 982, so that sum signals $\Sigma_{31}$ and $\Sigma_{32}$ are produced. These three bits $\Sigma_{30}$, $\Sigma_{31}$ and $\Sigma_{32}$ are added with another three bits derived from the input data of $a_4$, $a_5$, $a_6$, $a_7$ in a similar manner by a three-bit adder 110 shown in FIG. 48 to thereby produce data of four bits $\Sigma_0$, $\Sigma_1$, $\Sigma_2$ and $\Sigma_3$.

Figure 49:
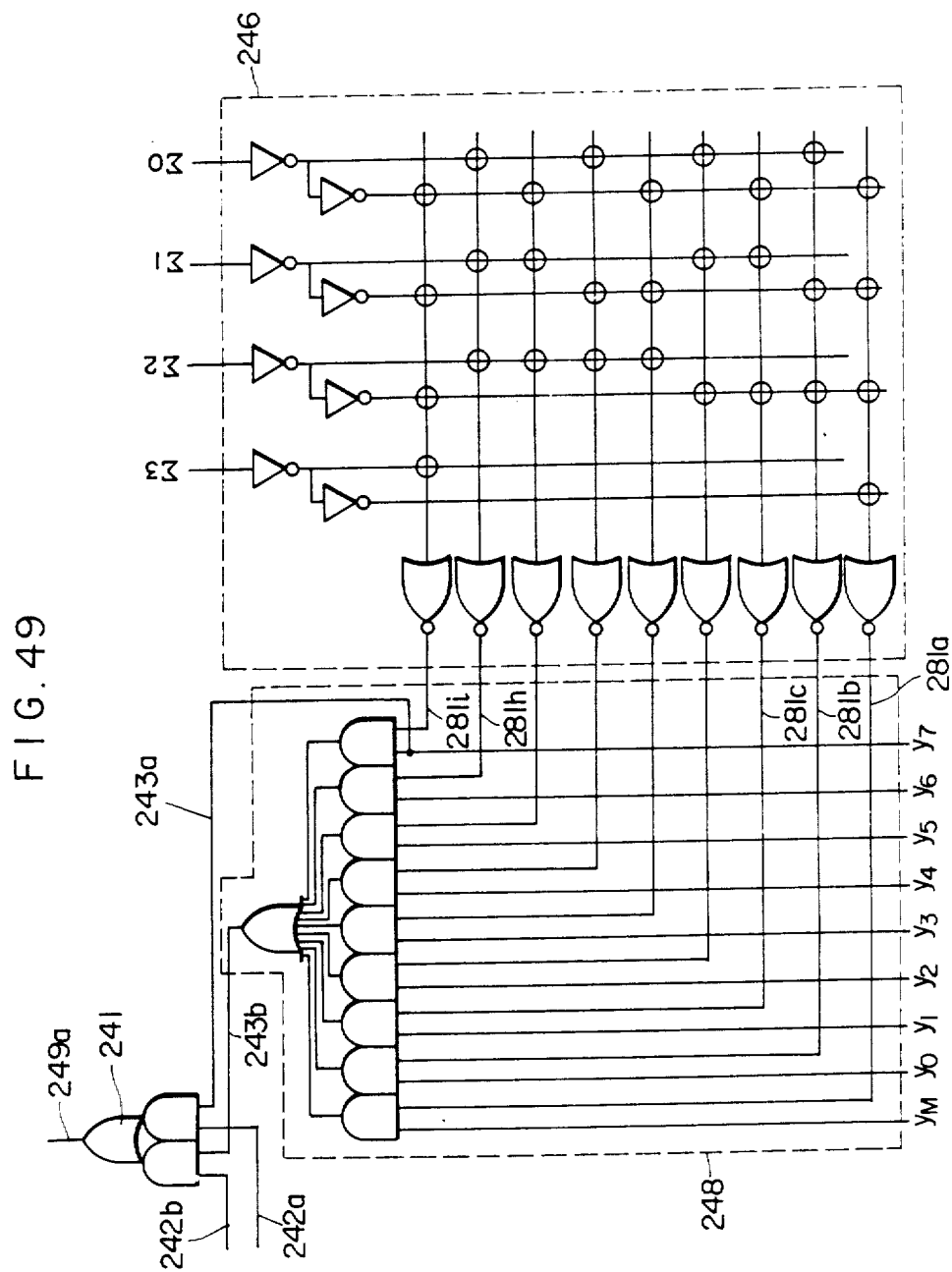
FIG. 49 is a circuit diagram showing the structure of the decoder 246 and the selectors 248 and 241.

FIG. 49 shows a circuit diagram of the decoder 246 and the selector 241. The meaning of symbols used in the decoder 246 is illustrated in FIG. 50. More specifically, the circuit configuration shown in 50A is equivalent to that shown in FIG. 50B. Referring to FIG. 49, $\Sigma_3$, $\Sigma_2$, $\Sigma_1$ and $\Sigma_0$ represent the number NB of "1" bits contained in the mapping pattern. When NB is 0 (zero), a signal 281a is logic "1", with the result that $y_M$ is outputted as the signal 243b. As the value of NB is increased any one of, $y_0$, $y_1$, ..., and $y_7$ is correspondingly outputted as the signal 243b. In the case of contraction-OR processing, the signal 242b is logic "1", while the signal 242a is "0", whereby the signal 243b is outputted on the line 249a to be subsequently stored in the auxiliary register 580. In the case of the expansion processing, the signal 242b is "0" and 242a is "1", whereby $y_7$ is constantly outputted on the line 249a to be stored in the auxiliary register.

What is claimed is:

1. A method for contracting image data, wherein a reference mask pattern comprising at least binary data ($P_1$, $P_2$, ..., $P_n$) which is applied to image data ($x_1$, $x_2$, ..., $x_n$) to be contracted (where n is an integer greater than 2) is provided, and wherein said image data ($x_1$, $x_2$, ..., $x_n$) to be contracted are moved within a matrix including n rows and n columns from the n-th row toward the first row, and when said reference mask pattern $P_i$ (where i is an integer in the range of $1 \leq i \leq n$) has a first value, the image data located at a position ($a_{i,i}$) of said matrix are discarded while the image data located at a position ($a_{i,j}$) (where $i+1 \leq j \leq n$) of said matrix are moved to a position ($a_{i-1, j-1}$) within said matrix, and when said reference mask pattern has a second value, the image data located at a position ($a_{i, j-1}$) of said matrix are moved to the position ($a_{i-1, j-1}$) of said matrix.

2. An apparatus for contracting an image, comprising a matrix A including n rows and n columns (where n is an integer greater than or equal to 2), data transmission means disposed at positions ($a_{k, l}$) of said matrix (where k and l are integers, respectively, defined by $2 \leq k \leq n$ and $k > l \geq 1$), and data selecting means disposed at positions ($a_{m, q}$) of said matrix (where m and q are integers, respectively, defined by $1 \leq m < n$ and $n \geq q \geq m$), wherein each data selecting means includes a logic element which directly receives an element $P_i$ (where $i \leq n$) of a reference mask pattern, wherein when the image data ($x_1$, $x_2$, ..., $x_n$) are moved from the n-th row toward the first row, said data transmitting means disposed at said n-th row send out image data (x) so that said image data (x) can be inputted to said data transmitting means or said data selecting means disposed on the (n−1)-th row, while said data transmitting means disposed on the r-th row (where r is an integer in the range of $2 \leq r \leq n-1$ send out the image data (x) so that said image data (x) can be inputted to said data transmitting means or said data selecting means disposed on the (r−1)-th row, and wherein said data selecting means disposed on the n-th row determines whether the image data ($x_n$) to be contracted is to be discarded or not in dependence on a control signal which corresponds to said reference mask pattern, while said data selecting means disposed at the position ($a_{m-1, q-1}$) of said matrix A determines in dependence on said control signal corresponding to said reference mask pattern whether the image data (x) outputted from said data selecting means disposed at the position ($a_{m, q}$) of said matrix or the image data (x) outputted from said data transmitting means or said data selecting means disposed at the position ($a_{m, q-1}$) of said matrix is to be received as input data.

3. An image contracting apparatus according to claim 6, wherein said data transmitting means are composed of wiring conductors.

4. A method for contracting an image, wherein a reference mask pattern comprising art least binary data ($P_1$, $P_2$, ..., $P_n$) which is applied to image data to be contracted ($x_1$, $x_2$, ..., $x_n$) (where n is an integer greater than 2) is provided, and wherein when said image data ($x_1$, $x_2$, ..., $x_n$) to be contracted are moved within a matrix A of n rows and n columns from the n-th row toward the first row, a logical arithmetic operation is performed on the image data $x_i$ located at a position ($a_{i, i}$) and the image data x located at a position ($a_{i, i-1}$) of said matrix, provided that said reference mask pattern ($P_i$) (where i is an integer in a range of $1 \leq i \leq n$) is of a first value, the result of said logical arithmetic operation being moved to a position ($a_{i-1}$, i−1), while image data located at a position ($a_{i, j}$) (where j is an integer in the range of $(i+1) \leq j \leq n$) of the matrix A and a position ($a_{i, u}$) (where u is an integer in the range of $1 \leq u < i-2$) of the matrix are moved, respectively, to positions ($a_{i-1, j-1}$) and ($a_{i-1, u}$) of the matrix, and when said reference mask pattern is of a second value, the image data located at a position ($a_{i, v}$) (where v is an integer in a range $1 \leq v \leq n$) of the matrix are moved to a position ($a_{i-1, v}$).

5. An apparatus for contracting an image, comprising a matrix A having n rows and n columns (where n is an integer greater than or equal to 2), data transmission means disposed at positions ($a_{k, l}$) of said matrix A (where k and l are integers given by $3 \leq k < n$ and $1 \leq l < k-1$), first data selecting means disposed at positions ($a_{m,q}$) of said matrix A (where m and q are integers given by $1 \leq m \leq n$ and $m \leq q$), each first data selecting means including a logic element which directly receives an element $P_i$ (where $i \leq n$) of a reference mask pattern, and second data selecting means disposed at positions ($x_{m,m-1}$, but excluding a position of $a_{1,0}$) of said matrix A, each second data selecting means including a logic element which directly receives an element $P_i$ (where $i \leq n$) of a reference mask pattern, wherein when the image data ($x_1, x_2, \ldots, x_n$) to be contracted are moved from the n-th row toward the first row of said matrix A, said data transmitting means disposed on the k-th row of said matrix A sends out the image data (x) so that said image data (x) can be inputted to the data transmitting means or the second data selecting means disposed on the (k−1)-th row of said matrix A, and wherein the first data selecting means disposed on the n-th column responds to a control signal corresponding to said reference mask pattern to thereby determine whether the image data ($x_n$) to be contracted is to be discarded or not, while the first data selecting means disposed at a position ($a_{m,q}$ excepting a position in the n-th column) of said matrix A responds to the control signal corresponding to said reference mask pattern to thereby determine whether the output image data (x) of the first data selecting means disposed at a position ($a_{m+1,q+1}$) of said matrix A or the output data (x) of the first or second data selecting means disposed at a position ($a_{m+1,q}$) of said matrix A is to be inputted, the second data selecting means disposed at a position ($a_{m,m-1}$) of said matrix A adds arithmetic means to the first data selecting means disposed at a position ($a_{m,q}$) of said matrix A, said arithmetic means performing an arithmetic operation on the output image data of the second data selecting means disposed at a position ($a_{m+1,m}$) of said matrix A and the output image data of the data transmitting means disposed at a position ($a_{m+1,m-1}$) of said matrix A, and said second data selecting means responding to the control signal corresponding to said reference mask pattern to thereby determine whether the output image data of said data transmitting means disposed at the position ($a_{m+1,m-1}$) of said matrix A or the output image data of said arithmetic means included in said second data selecting means is to be inputted.

6. An image contracting apparatus according to claim 5, wherein said data transmitting means are composed of wiring conductors.

7. A method for expanding an image, wherein a reference mask pattern comprising at least binary data ($P_m$) (where m is an integer $\geq 1$) which is applied to image data ($x_1, x_2, \ldots, x_n$) to be expanded (wherein n is an integer $\geq 1$) is provided, and wherein while said image data ($x_1, x_2, \ldots, x_n$) to be expanded are moved within a matrix of l rows and l' columns (where l and l' are integers in the respective ranges of $l > 2$ and $l' > 2$) in the direction from the first row toward the l-th row, when the reference mask ($P_i$) is of a first value (wherein i is an integer in the range of $1 \leq i \leq l$), the image data located at a position ($a_{i,j}$) of the matrix (where j is an integer in the range of $i \leq j < l$) are moved to a position ($a_{i+1,j+1}$) of the matrix and the image data x located at a position ($a_{i,k}$) of the matrix (where k is an integer in the range of $1 \leq k \leq i$) are moved to a position ($a_{i+1,k}$) of the matrix, and when the reference mask ($P_i$) is of a second value, the image data x located at a position $a_{i,p}$ (where p is an integer in the range $1 \leq p \leq l$) of the matrix A are moved to a position ($a_{i+1,p}$) of the matrix A.

8. An apparatus for expanding an image, comprising a matrix A having at least l rows and l' columns (wherein l and l' are integers in the respective ranges of $l \geq 2$ and $l' \geq 2$), data transmitting means disposed at positions ($a_{q,r}$) (where q and r are integers given by $2 \leq q < l$ and $q > r$) of said matrix A, data selecting means disposed at positions ($a_{s,t}$) (where s and t are integers given by $1 < s \leq l$ and $s \leq t \leq l'$) and at a position in the first row of said matrix A, wherein each data selecting means includes a logic element which directly receives an element $P_i$ (where $i \leq l$) of a reference mask pattern, wherein when the image data ($x_1, \ldots, x_n$) to be expanded (where n is an integer in the range of $n \geq 1$) are moved from the first row toward the l-th row of said matrix A, the data selecting means disposed at the position in the first row of said matrix A responds to a control signal corresponding to a reference mask pattern ($P_1$) to input one of the image data ($x_{u-1}$ and $x_u$ to be expanded (where u is an integer in the range of $1 \leq u \leq n$, and, when $u = 1$, $x_0$ is fixed to zero), the data selecting means disposed at the position ($a_{s,t}$) of said matrix A responds to the control signal corresponding to a reference mask pattern ($P_s$) to input the image data x from the data selecting means disposed at one of the positions ($a_{s-1,t-1}$) and ($a_{s-1,t}$) of said matrix A, and the data transmitting means disposed at the position ($a_{q,r}$) of said matrix A inputs the image data x from said data transmitting means or said data selecting means disposed at the position ($a_{q-1,r}$) of said matrix A.

9. An image expanding apparatus according to claim 8, wherein said data transmitting means are composed of signal lines.

10. An apparatus for contracting digital image data ($x_1, x_2, \ldots, x_n$) in response to a digital mask pattern ($P_1, P_2, \ldots, P_n$), comprising:

means, having a plurality of image input ports to receive the image data and having a plurality of mask input ports to receive the mask pattern, with each image input port corresponding to a respective column of an n×n matrix and with each mask input port corresponding to a respective row of the matrix, for moving the data along respective columns of the matrix in a ripple-through manner and for selectively replacing at least one image datum with an image datum from an adjacent column in response to the mask pattern, wherein said means includes a plurality of data selecting circuits, each corresponding to a respective position $a_{i,j}$ in the matrix, where $1 \leq i \leq n$ and $i \leq j \leq n$, wherein the data selecting circuits corresponding to positions $a_{i,j=i}$ along the diagonal of the matrix are connected to respective image input ports, wherein all the data selecting circuits except the data selecting circuit corresponding to the position $a_{i=j=1}$ are connected to a data selecting circuit in the same column and to a data selecting circuit in an adjacent column, wherein the data selecting circuit corresponding to positions in the same row of the matrix are each connected to the mask input port corresponding to that row; and wherein each data selecting circuit includes a logic element which directly receives an element $P_i$ of the mask pattern.

11. The apparatus of claim 10, wherein the circuitry of each data selection circuit is identical.

12. The apparatus of claim 11, wherein each data selection circuit comprises a pair of AND gates, and means for OR-ing the outputs of the AND gates.

* * * * *